(12) United States Patent
Kim et al.

(10) Patent No.: US 12,101,276 B2
(45) Date of Patent: Sep. 24, 2024

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seonwook Kim, Seoul (KR); Hyunsoo Ko, Seoul (KR); Suckchel Yang, Seoul (KR); Youngdae Lee, Seoul (KR); Seokmin Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 199 days.

(21) Appl. No.: 17/796,832

(22) PCT Filed: Feb. 15, 2021

(86) PCT No.: PCT/KR2021/001900
§ 371 (c)(1),
(2) Date: Aug. 1, 2022

(87) PCT Pub. No.: WO2021/162520
PCT Pub. Date: Aug. 19, 2021

(65) Prior Publication Data
US 2024/0031110 A1    Jan. 25, 2024

(30) Foreign Application Priority Data

Feb. 13, 2020   (KR) .......................... 10-2020-0017688
Aug. 4, 2020    (KR) .......................... 10-2020-0097374
(Continued)

(51) Int. Cl.
*H04L 5/00* (2006.01)
(52) U.S. Cl.
CPC ................................ *H04L 5/0091* (2013.01)

(58) Field of Classification Search
CPC . H04L 5/0091; H04L 1/00; H04L 5/00; H04L 5/001; H04L 5/0053; H04L 27/26;
(Continued)

(56) References Cited

U.S. PATENT DOCUMENTS

2021/0022096 A1*  1/2021  Rane .................... H04W 16/28
2021/0282228 A1   9/2021  Si et al.
(Continued)

FOREIGN PATENT DOCUMENTS

KR   10-2018-0136917 A   12/2018
KR   10-2019-0010507 A    1/2019
(Continued)

OTHER PUBLICATIONS

"Remaining issues on SS block design and indication method", LG Electronics Inc., 3GPP TSG RAN WG1 Meeting #90, Prague, Czech Republic Aug. 21-25, 2017, R1-1713121, 8 pages.
(Continued)

*Primary Examiner* — Kyaw Z Soe
(74) *Attorney, Agent, or Firm* — BRYAN CAVE LEIGHTON PAISNER LLP

(57) ABSTRACT

The present disclosure relates to: a method comprising: a step for receiving a synchronization signal/public broadcast channel (SS/PBCH) block within a plurality of SS/PBCH block candidates located on an unlicensed band; and a step for obtaining time synchronization on the basis of the SS/PBCH block, wherein on the basis of subcarrier spacing (SCS) of the SS/PBCH block being set to 240 kHz, the plurality of SS/PBCH block candidates are located in both a first half section and a second half section of a time window set for transmission of the SS/PBCH block; and a device therefor.

14 Claims, 35 Drawing Sheets

(30) Foreign Application Priority Data

Oct. 15, 2020 (KR) .................. 10-2020-0133310
Jan. 14, 2021 (KR) .................. 10-2021-0005608

(58) Field of Classification Search
CPC ............ H04L 5/0048; H04L 5/0094; H04L 27/26025; H04L 27/2666; H04J 11/00; H04J 11/0069; H04W 48/10; H04W 56/00; H04W 72/04; H04W 56/001; H04W 72/0446; H04W 72/30
See application file for complete search history.

(56) References Cited

U.S. PATENT DOCUMENTS

2022/0095372 A1* 3/2022 Cozzo .................. H04W 72/23
2022/0304064 A1* 9/2022 Yoshimura ........ H04W 74/0833

FOREIGN PATENT DOCUMENTS

| KR | 10-2019-0011699 A | 2/2019 |
| KR | 10-1999702 B1 | 7/2019 |
| WO | 2019/016987 A1 | 1/2019 |
| WO | 2019/194652 A1 | 10/2019 |

OTHER PUBLICATIONS

"Remaining Details on SS/PBCH block transmission", LG Electronics Inc., 3GPP TSG RAN WG1 Meeting #90bis, Prague, CZ, Oct. 9-13, 2017, R1-1717925, 7 pages.

"Summary of Discussions for Rel-15 NR mobility", Intel Corporation, 3GPP TSG RAN WG1 Meeting #94bis, Chengdu, China, Oct. 8-12, 2018, R1-1811652, p. 13 pages.

* cited by examiner (a) Carrier aggregation between L-band and U-band (b) Standalone U-band(s)

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is a National Stage Filing Under 35 U.S.C. 371 of International Application No. PCT/KR2021/001900 filed Feb. 15, 2021, which claims the benefit of Korean Application No. 10-2020-0017688, filed Feb. 13, 2020, Korean Application No. 10-2020-0097374, filed Aug. 4, 2020, Korean Application No. 10-2020-0133310, filed Oct. 15, 2020, Korean Application No. 10-2021-0005608, filed Jan. 14, 2021, the contents of which are all hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An aspect of the present disclosure is to provide a method and apparatus for efficiently transmitting and receiving a wireless signal.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to a first aspect of the present disclosure, there is provided a method of receiving a downlink signal by a user equipment (UE) in a wireless communication system supporting an unlicensed band. The method may include: receiving a synchronization signal/physical broadcast channel (SS/PBCH) block in a plurality of SS/PBCH block candidates located in the unlicensed band; and obtaining time synchronization based on the SS/PBCH block. Based on that a subcarrier spacing (SCS) of the SS/PBCH block is set to 240 kHz, the plurality of SS/PBCH block candidates may be located in both a first half and a second half of a time window configured for transmission of the SS/PBCH block.

According to a second aspect of the present disclosure, there is provided a UE configured to operate in a wireless communication system supporting an unlicensed band. The UE may include: at least one radio frequency (RF) unit; at least one processor; and at least one computer memory operably connected to the at least one processor and configured to, when executed, cause the at least one processor to perform operations. The operations may include: receiving a SS/PBCH block in a plurality of SS/PBCH block candidates located in the unlicensed band; and obtaining time synchronization based on the SS/PBCH block. Based on that an SCS of the SS/PBCH block is set to 240 kHz, the plurality of SS/PBCH block candidates may be located in both a first half and a second half of a time window configured for transmission of the SS/PBCH block.

According to a third aspect of the present disclosure, there is provided an apparatus for a UE. The apparatus may include: at least one processor; and at least one computer memory operably connected to the at least one processor and configured to, when executed, cause the at least one processor to perform operations. The operations may include: receiving a SS/PBCH block in a plurality of SS/PBCH block candidates located in the unlicensed band; and obtaining time synchronization based on the SS/PBCH block. Based on that an SCS of the SS/PBCH block is set to 240 kHz, the plurality of SS/PBCH block candidates may be located in both a first half and a second half of a time window configured for transmission of the SS/PBCH block.

According to a fourth aspect of the present disclosure, there is provided a computer-readable storage medium. The computer-readable storage medium may include at least one computer program configured to, when executed, cause at least one processor to perform operations. The operations may include: receiving a SS/PBCH block in a plurality of SS/PBCH block candidates located in the unlicensed band; and obtaining time synchronization based on the SS/PBCH block. Based on that an SCS of the SS/PBCH block is set to 240 kHz, the plurality of SS/PBCH block candidates may be located in both a first half and a second half of a time window configured for transmission of the SS/PBCH block.

According to a fifth aspect of the present disclosure, there is provided a method of transmitting a downlink signal by a base station in a wireless communication system supporting an unlicensed band. The method may include: configuring an SCS of an SS/PBCH block; and transmitting the SS/PBCH block in a plurality of SS/PBCH block candidates located in the unlicensed band. Based on that the SCS of the SS/PBCH block is set to 240 kHz, the plurality of SS/PBCH block candidates may be located in both a first half and a second half of a time window configured for the transmission of the SS/PBCH block.

According to a sixth aspect of the present disclosure, there is provided a base station configured to operate in a wireless communication system supporting an unlicensed band. The base station may include: at least one RF unit; at least one processor; and at least one computer memory operably connected to the at least one processor and configured to, when executed, cause the at least one processor to perform operations. The operations may include: configuring an SCS of an SS/PBCH block; and transmitting the SS/PBCH block in a plurality of SS/PBCH block candidates located in the unlicensed band. Based on that the SCS of the SS/PBCH block is set to 240 kHz, the plurality of SS/PBCH block candidates may be located in both a first half and a second half of a time window configured for the transmission of the SS/PBCH block.

According to an embodiment, in each of the first half and the second half, consecutive slots having no SS/PBCH block candidates defined therein may be located after consecutive slots having SS/PBCH block candidates defined therein.

According to an embodiment, each of the first half and the second half may include 40 slots. In each of the first half and the second half, consecutive slots having SS/PBCH block candidates defined therein may include: 1) 16 consecutive slots from a first slot; and 2) 16 consecutive slots from a twenty-first slot.

According to an embodiment, the following may be further included: receiving information on an interval Q between SS/PBCH blocks in a quasi-co-located (QCL) relationship among the plurality of SS/PBCH block candidates; receiving a bitmap indicating the SS/PBCH block transmitted by a base station among the plurality of SS/PBCH block candidates; and obtaining information on a transmission location of the SS/PBCH block from the bitmap except for one or more bits determined based on Q, where Q may be less than a number of SS/PBCH block candidates defined in the time window.

According to an embodiment, slots in which SS/PBCH block candidates having an SCS of 480 kHz are defined may be located within the time window in alignment with slots in which SS/PBCH block candidates having an SCS of 240 kHz are defined.

According to an embodiment, information on a channel access procedure (CAP) performed by a base station may be received. The CAP may include a first CAP that allows transmission regardless of whether a channel is idle or a second CAP that allows transmission only for an idle channel.

According to an embodiment, based on that the information includes information on the second CAP, the SS/PBCH block may be received in a part of SS/PBCH block candidates in a QCL relationship within the time window. Based on that the information includes information on the first CAP, the SS/PBCH block may be received in SS/PBCH block candidates each having an SS/PBCH block candidate index less than Q within the time window, where Q may denote an interval between the SS/PBCH block candidates in the QCL relationship within the time window.

Advantageous Effects

According to the present disclosure, a wireless signal may be transmitted and received efficiently in a wireless communication system.

According to the present disclosure, an opportunity of transmitting a synchronization signal/physical broadcast channel (SS/PBCH) block in an unlicensed band may increase.

According to the present disclosure, even though a base station fails in a channel access procedure (CAP), a user equipment (UE) may effectively receive an SS/PBCH block in an unlicensed band.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE)

is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive machine type communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
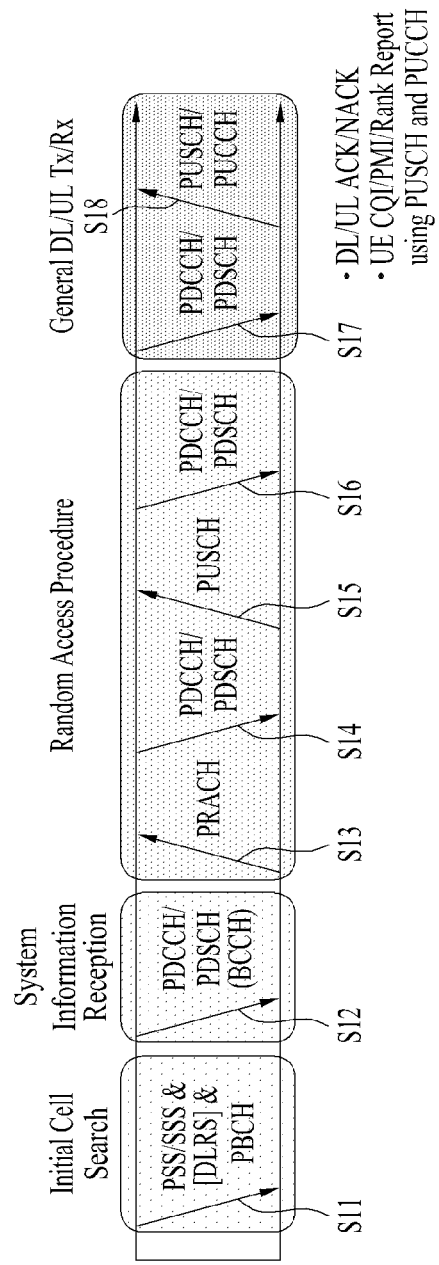
FIG. 1 illustrates physical channels used in a 3rd generation partnership project (3GPP) system as an exemplary wireless communication systems and a general signal transmission method using the same.

FIG. 1 illustrates physical channels used in a 3GPP NR system and a general signal transmission method using the same.

When powered on or when a UE initially enters a cell, the UE performs initial cell search involving synchronization with a BS in step S101. For initial cell search, the UE receives synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
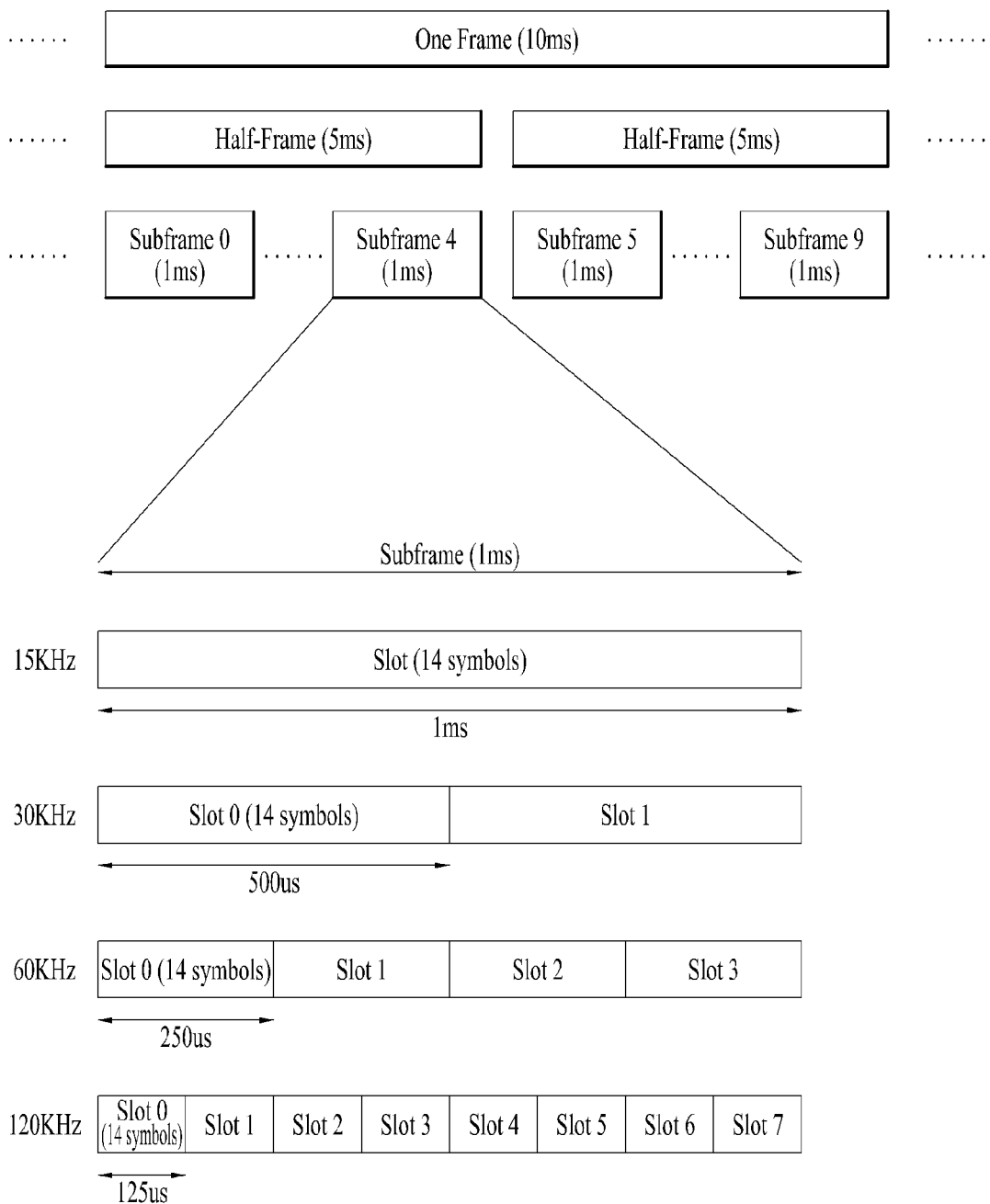
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 orthogonal frequency division multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame, u}_{slot}$: Number of slots in a frame
* $N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The frame structure is merely an example. The number of subframes, the number of slots, and the number of symbols in a frame may vary. In the NR system, different OFDM numerologies (e.g., SCSs) may be configured for a plurality of cells aggregated for one UE. Accordingly, the (absolute time) duration of a time resource including the same number of symbols (e.g., a subframe (SF), slot, or TTI) (collectively referred to as a time unit (TU) for convenience) may be configured to be different for the aggregated cells. A symbol may be an OFDM symbol (or CP-OFDM symbol) or an SC_FDMA symbol (or a discrete Fourier transform-spread-OFDM (DFT-s-OFDM) symbol). In NR, various numerologies (or SCSs) are supported to support various 5G services. For example, with an SCS of 15 kHz, a wide area in traditional cellular bands is supported, while with an SCS of 30 kHz/60 kHz, a dense urban area, a lower latency, and a wide carrier bandwidth are supported. With an SCS of or higher, a bandwidth larger than 24.25 GHz is be supported to overcome phase noise. An NR frequency band may be defined by two types of frequency ranges, FR1 and FR2. FR1 and FR2 may be configured as described in Table 3. FR2 may refer to millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3:
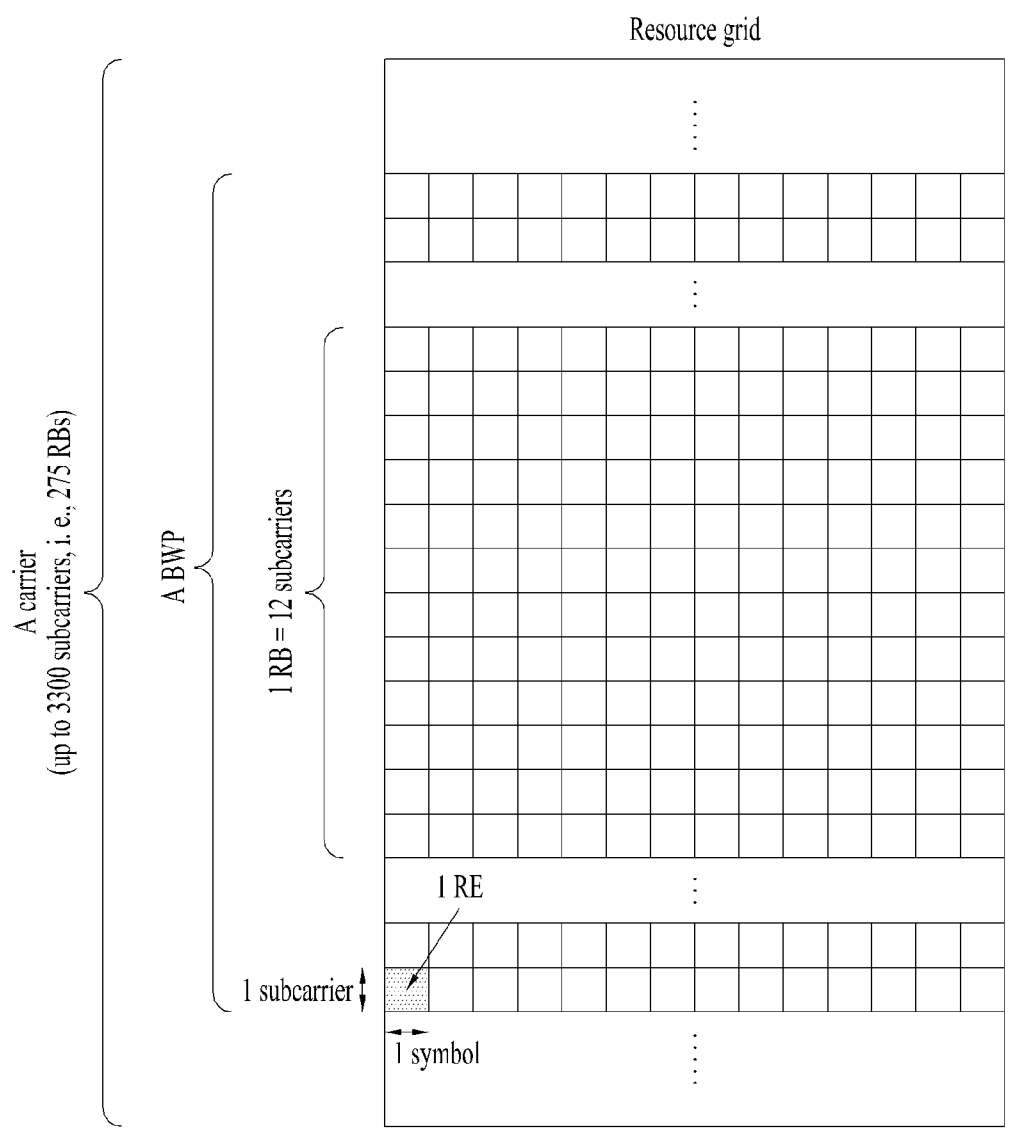
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols.

A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
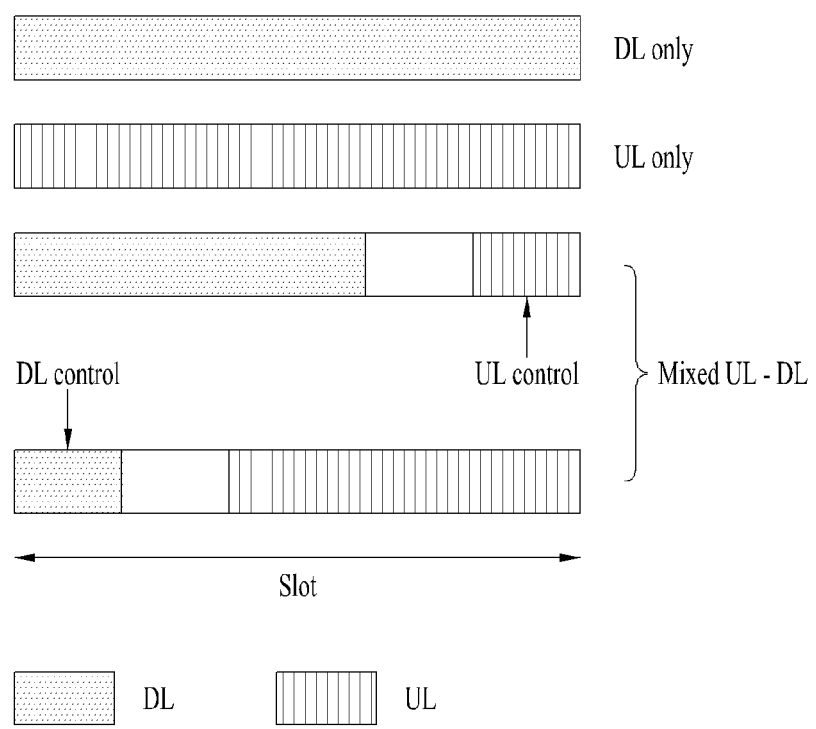
FIG. 4 illustrates exemplary mapping of physical channels in a slot.

FIG. 4 illustrates exemplary mapping of physical channels in a slot. In the NR system, a frame is characterized by a self-contained structure in which all of a DL control channel, DL or UL data, and a UL control channel may be included in one slot. For example, the first N symbols of a slot may be used for a DL control channel (e.g., PDCCH) (hereinafter, referred to as a DL control region), and the last M symbols of the slot may be used for a UL control channel (e.g., PUCCH) (hereinafter, referred to as a UL control region). Each of N and M is an integer equal to or larger than 0. A resource area (referred to as a data region) between the DL control region and the UL control region may be used for transmission of DL data (e.g., PDSCH) or UL data (e.g., PUSCH). A guard period (GP) provides a time gap for switching between a transmission mode and a reception mode at the BS and the UE. Some symbol at the time of switching from DL to UL may be configured as a GP.

The PDCCH carries downlink control information (DCI). For example, the PCCCH (i.e., DCI) carries a transmission format and resource allocation of a downlink shared channel (DL-SCH), resource allocation information about an uplink shared channel (UL-SCH), paging information about a paging channel (PCH), system information present on the DL-SCH, resource allocation information about a higher layer control message such as a random access response transmitted on a PDSCH, a transmit power control command, and activation/release of configured scheduling (CS). The DCI includes a cyclic redundancy check (CRC). The CRC is masked/scrambled with different identifiers (e.g., radio network temporary identifier (RNTI)) according to the owner or usage of the PDCCH. For example, if the PDCCH is for a specific UE, the CRC will be masked with a UE identifier (e.g., cell-RNTI (C-RNTI)). If the PDCCH is for paging, the CRC will be masked with a paging-RNTI (P-RNTI). If the PDCCH is for system information (e.g., a system information block (SIB)), the CRC will be masked with a system information RNTI (SI-RNTI). If the PDCCH is for a random access response, the CRC will be masked with a random access-RNTI (RA-RNTI).

Table 4 lists PDCCH usages and transport channels. The transport channels are related to data delivered on a PDSCH/PUSCH scheduled by a PDCCH.

TABLE 4

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| C-RNTI | Dynamically scheduled unicast transmission | UL-SCH, DL-SCH |
| SFI(Slot Format Indication)-RNTI | Slot Format Indication on the given cell | N/A |

The modulation scheme for the PDCCH is fixed (e.g., quadrature phase shift keying (QPSK), and one PDCCH includes 1, 2, 4, 8, or 16 control channel elements (CCEs). One CCE includes 6 resource element groups (REGs). One REG is defined by one OFDMA symbol and one (P)RB. The PDCCH is transmitted in a control resource set (CORESET). The CORESET corresponds to a physical resource/parameter set used to deliver the PDCCH/DCI in a BWP. For PDCCH reception, a UE may monitor (e.g., blind-decode) a set of PDCCH candidates in the CORESET. A PDCCH candidate is CCE(s) that the UE monitors for PDCCH reception/detection. PDCCH monitoring may be performed in one or more CORESETs of an active DL BWP in each active cell configured with PDCCH monitoring. A set of PDCCH candidates monitored by the UE is defined as a PDCCH search space (SS) set. The SS set may be a common search space (CSS) set or a UE-specific search space (USS) set.

Table 5 lists PDCCH SSs.

TABLE 5

| Search Space | Type | RNTI | Use Case |
|---|---|---|---|
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | Group signaling |
| UE Specific | UE Specific | C-RNTI, or MCS-C-RNTI, or CS-RNTI(s) | UE signaling (e.g., PDSCH/PUSCH) |

Figure 5:
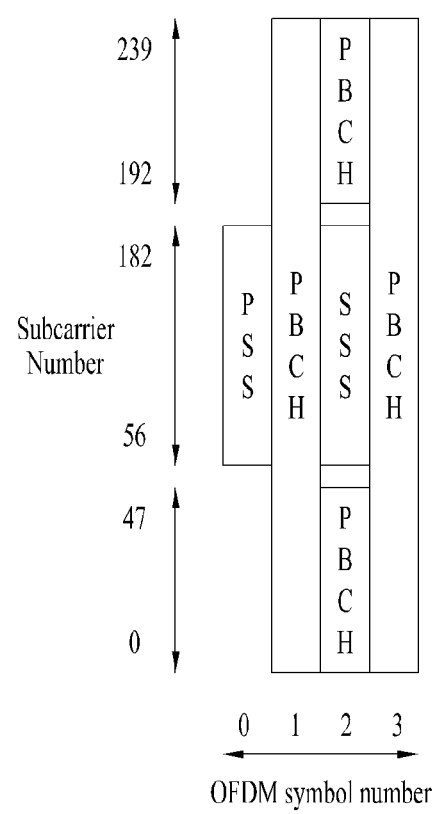
FIG. 5 illustrates the structure of a synchronization signal block (SSB)

FIG. 5 illustrates the structure of an SSB. A UE may perform cell search, system information acquisition, beam alignment for initial access, DL measurement, and so on based on an SSB. The term SSB is interchangeably used with an SS/PBCH block.

Referring to FIG. 5, the SSB is made up of four consecutive OFDM symbols, each carrying a PSS, a PBCH, an SSS/PBCH, or a PBCH. Each of the PSS and the SSS includes one OFDM symbol by 127 subcarriers, and the PBCH includes 3 OFDM symbols by 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, and three data REs exist between DMRS REs.

Figure 6:
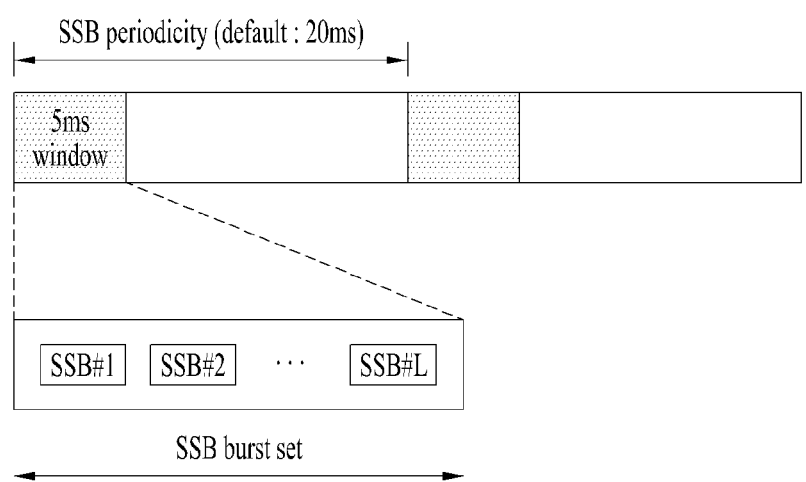
FIG. 6 illustrates exemplary SSB transmission.

FIG. 6 illustrates exemplary SSB transmission. Referring to FIG. 6, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L-1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

During initial cell selection, the UE may assume that a half-frame including an SSB is repeated at a cycle of 20 ms. The UE may check the presence of a CORESET for a Type0-PDCCH CSS based on a master information block (MIB). The MIB includes information/parameters related to reception of SystemInformationBlockType1 (SIB1), and the MIB is transmitted over a PBCH of the SSB.

The Type0-PDCCH CSS is a kind of PDCCH search space and is used to transmit a PDCCH scheduling a system information (SI) message. When the Type0-PDCCH CSS exists, the UE may determine: (i) one or more consecutive symbols and a plurality of consecutive RBs included in a CORESET; and (ii) a PDCCH occasion (i.e., a time-domain location for PDCCH reception), based on information in the MIB (e.g., pdcch-ConfigSIB1). Specifically, pdcch-ConfigSIB1 is 8-bit information, (i) the one or more consecutive symbols and the plurality of consecutive RBs included in the CORESET are determined based on 4 most significant bits (MSBs) (see Tables 13-1 to 13-10 of 3GPP TS 38.213), and (ii) the PDCCH occasion is determined based on 4 least significant bits (LSBs) (see Tables 13-11 to 13-15 of 3GPP TS 38.213).

Figure 7:
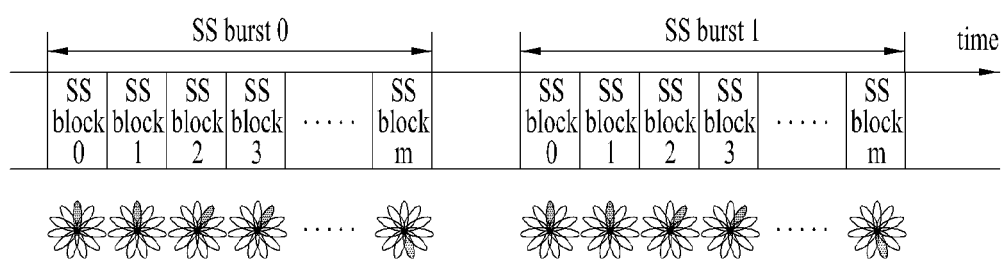
FIG. 7 illustrates exemplary multi-beam transmission of SSBs.

FIG. 7 illustrates exemplary multi-beam transmission of SSBs. Beam sweeping refers to changing the beam (direction) of a wireless signal over time at a transmission reception point (TRP) (e.g., a BS/cell) (hereinbelow, the terms beam and beam direction are interchangeably used). An SSB may be transmitted periodically by beam sweeping. In this case, SSB indexes are implicitly linked to SSB beams. An SSB beam may be changed on an SSB (index) basis. The maximum transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, Max number of beams=4
For frequency range from 3 GHz to 6 GHz, Max number of beams=8
For frequency range from 6 GHz to 52.6 GHz, Max number of beams=64
Without multi-beam transmission, the number of SSB beams is 1.

Figure 8:
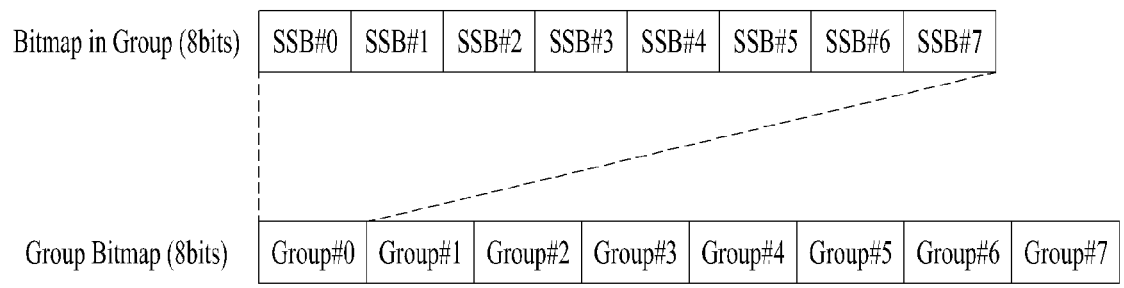
FIG. 8 illustrates an exemplary method of indicating an actually transmitted SSB.

FIG. 8 illustrates an exemplary method of indicating an actually transmitted SSB, SSB_tx. Up to L SSBs may be transmitted in an SSB burst set, and the number/positions of actually transmitted SSBs may be different for each BS/cell. The number/positions of actually transmitted SSBs are used for rate-matching and measurement, and information about actually transmitted SSBs is indicated as follows.

If the information is related to rate-matching, the information may be indicated by UE-specific RRC signaling or remaining minimum system information (RMSI). The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 7. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH/PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Figure 9:
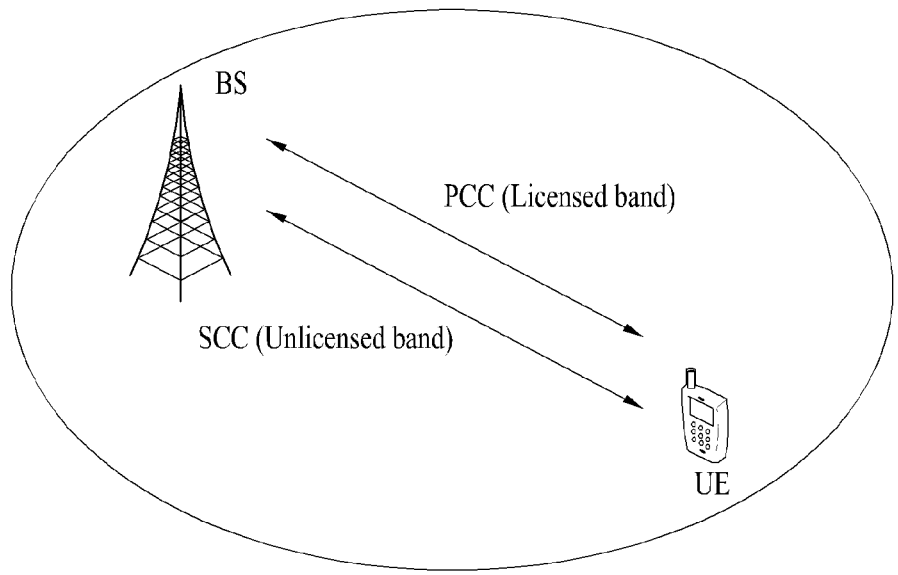
FIG. 9 illustrates a wireless communication system supporting an unlicensed band.
Figure 9:
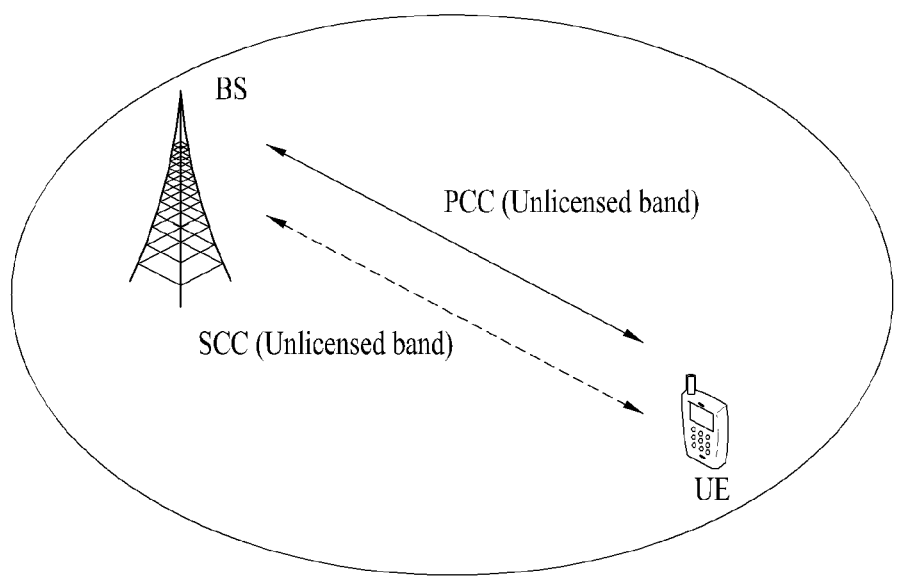

FIG. 9 illustrates a wireless communication system supporting an unlicensed band. For the convenience of description, a cell operating in a licensed band (hereinafter, referred to as L-band) is defined as an LCell, and a carrier of the LCell is defined as a (DL/UL) licensed component carrier (LCC). In addition, a cell operating in an unlicensed band (hereinafter, referred to as a U-band) is defined as a UCell, and a carrier of the UCell is defined as a (DL/UL) unlicensed component carrier (UCC). The carrier of a cell may refer to the operating frequency (e.g., center frequency) of the cell. A cell/carrier (e.g., CC) may be collectively referred to as a cell.

When carrier aggregation (CA) is supported, one UE may transmit and receive signals to and from a BS in a plurality of cells/carriers. When a plurality of CCs are configured for one UE, one CC may be configured as a primary CC (PCC) and the other CCs may be configured as secondary CCs (SCCs). Specific control information/channel (e.g., CSS PDCCH or PUCCH) may be configured to be transmitted and received only on the PCC. Data may be transmitted in the PCC/SCC. FIG. 11(a) illustrates signal transmission and reception between a UE and a BS in an LCC and a UCC (non-standalone (NSA) mode). In this case, the LCC may be configured as a PCC, and the UCC may be configured as an SCC. When a plurality of LCCs are configured for the UE, one specific LCC may be configured as a PCC, and the remaining LCCs may be configured as SCCs. FIG. 11(a) corresponds to LAA of a 3GPP LTE system. FIG. 11(b) illustrates signal transmission and reception between a UE and a BS in one or more UCCs without any LCC (SA mode). In this case, one of the UCCs may be configured as a PCC, and the remaining UCCs may be configured as SCCs. Both the NSA mode and the SA mode may be supported in the unlicensed band of the 3GPP NR system.

Figure 10:
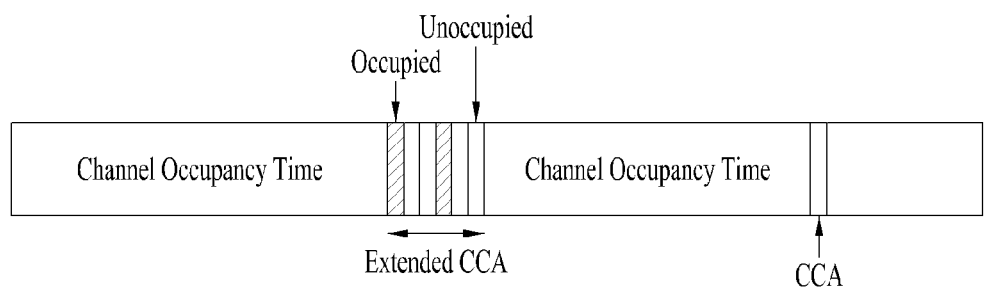
FIG. 10 illustrates a method of occupying resources in an unlicensed band.

FIG. 10 illustrates an exemplary method of occupying resources in an unlicensed band. According to regional regulations for an unlicensed band, a communication node should determine whether other communication node(s) is using a channel in the unlicensed band, before signal transmission. Specifically, the communication node may determine whether other communication node(s) is using a channel by performing carrier sensing (CS) before signal transmission. When the communication node confirms that any other communication node is not transmitting a signal, this is defined as confirming clear channel assessment (CCA). In the presence of a CCA threshold predefined by higher-layer signaling (RRC signaling), when the communication node detects energy higher than the CCA threshold in the channel, the communication node may determine that the channel is busy, and otherwise, the communication node may determine that the channel is idle. For reference, the WiFi standard (e.g., 801.11ac) specifies a CCA threshold of −62 dBm for a non-WiFi signal and a CCA threshold of −82 dBm for a WiFi signal. When determining that the channel is idle, the communication node may start signal transmission in a UCell. The above-described series of operations may be referred to as a listen-before-talk (LBT) or channel access procedure (CAP). LBT and CAP may be interchangeably used.

Embodiments

The following symbols/abbreviations/terms are used in this document.
PDCCH: Physical Downlink Control CHannel
PDSCH: Physical Downlink Shared CHannel
PUSCH: Physical Uplink Shared CHannel
CSI Channel state information
RRM: Radio resource management
RLM: Radio link monitoring
DCI: Downlink Control Information
CAP Channel Access Procedure
Ucell: Unlicensed cell
TBS: Transport Block Size
SLIV: Starting and Length Indicator Value (The SLIV is a field that indicates the starting symbol index and the number of symbols in a slot for a PDSCH and/or PUSCH, and the SLIV is carried on a PDCCH scheduling the corresponding PDSCH and/or PUSCH.)
BWP: BandWidth Part (The BWP may be composed of consecutive RBs in the frequency domain and correspond to one numerology (e.g., SCS, CP length, slot/mini-slot duration). In addition, a plurality of BWPs may be configured on one carrier (the number of BWPs per carrier may also be limited), but the number of active BWPs (e.g., one) may be limited in some carriers.)
CORESET: COntrol REsourse SET (The CORESET means a time frequency resource region capable of transmitting a PDCCH, and the number of CORESETs per BWP may be limited.)
REG: Resource Element Group
SFI: Slot Format Indicator (The SFI is an indicator that indicates the DL/UL direction at the symbol level in a specific slot(s), and the SFI is transmitted over a group-common PDCCH.)
COT Channel Occupancy Time
SPS: Semi-Persistent Scheduling
PLMN ID: Public Land Mobile Network identifier As more and more communication devices require high communication capacities, efficient use of limited frequency bands becomes an important issue in next wireless communication systems. In cellular communication systems including the LTE/NR system, a method of using unlicensed bands such as the 2.4 GHz band, which are widely used in the conventional Wi-Fi system, or unlicensed bands such as the 5 GHz and 60 GHz bands, which are newly attracting attention, for traffic offloading is currently discussed. As described above, in unlicensed bands, each communication node needs to perform the LBT operation. That is, each communication node needs to perform channel sensing before transmitting a signal in order to confirm that other communication nodes do not perform signal transmission. The eNB/gNB or UE of the LTE/NR system also need to perform LBT for signal transmission in an unlicensed band (referred to as a U-band for convenience). In addition, when the eNB/gNB or UE of the LTE/NR system transmits a signal in a U-band, other communication nodes operating in Wi-Fi (or Wireless Gigabit Alliance (WiGig) such as 802.11ad/ay) also need to perform LBT to avoid causing interference.

For 3GPP Release-15 (Rel-15) NR systems, operations in a band below 52.6 GHz are defined. In a future release, a discussion is underway to operate the NR system in licensed and/or unlicensed bands of 60/70 GHz.

The present disclosure proposes SS/PBCH block transmission methods for initial access in U-bands of 60/70 GHz. Specifically, the present disclosure proposes methods of increasing SS/PBCH block transmission opportunities in consideration of CAP-based operations in U-bands. Although the methods proposed in the present disclosure are described based on operation in U-bands, the methods may be applied to operation in licensed bands depending on the proposal. In addition, the term "unlicensed band" may be interchanged with the term "shared spectrum".

In the NR system, millimeter wave (mmWave) bands (e.g., above 7.125 or 24 MHz and up to 52.6 GHz) is defined as frequency range 2 (FR2), and the SCS of an SS/PBCH block in FR2 may be 120 or 240 kHz.

Figure 11:
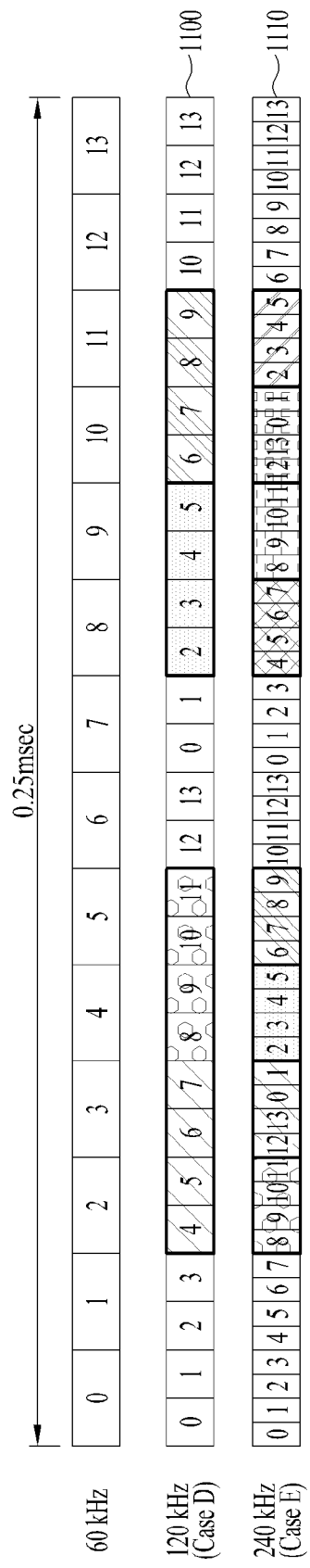
FIG. 11 and FIGS. 12(a) to 12(c) illustrate locations of synchronization signal/physical broadcast channel (SS/PBCH) block candidates when the subcarrier spacing (SCS) of an SS/PBCH block is set to 120 or 240 kHz.

FIG. 11 illustrates positions of SS/PBCH block candidates when the SCS of an SS/PBCH block is set to 120 or 240 kHz. According to embodiments, the term "SS/PBCH block candidate" may be interchanged with the following terms: candidate SS/PBCH block, SSB candidate, and candidate SSB.

Specifically, as shown in FIG. 11, up to 4 or 8 SS/PBCH blocks may be transmitted within 0.25 msec (e.g., two slots 1100 for the 120 kHz SCS or four slots 1110 for the 240 kHz SCS). For example, for the 120 kHz SCS, SS/PBCH block (candidate) index 'n' may be transmitted in symbol #4/5/6/7 of the first slot, and SS/PBCH block (candidate) index 'n+1' may be transmitted in symbol #8/9/10/11 of the first slot. SS/PBCH block (candidate) index 'n+2' may be transmitted in symbol #2/3/4/5 of the second slot, and SS/PBCH block (candidate) index 'n+3' may be transmitted in symbol #6/7/8/9 of the second slot. In this case, symbol #4/5/6/7 may mean symbols with symbol indices of 4/5/6/7 in a slot or fifth/sixth/seventh/eighth symbols in the slot. Herein, transmission of an SS/PBCH block (candidate) index may mean that an SS/PBCH block is transmitted in an SS/PBCH block candidate with the corresponding SS/PBCH block (candidate) index. For the SS/PBCH block, it is preferable that transmission is guaranteed at regular intervals. However, in U-band operation, since transmission is allowed only when the CAP is successful, a plurality of transmission candidates (e.g., a plurality of SS/PBCH block candidates) may be configured for one SS/PBCH block within a predefined window duration (hereinafter, S_window). Accordingly, even if the BS fails to transmit the SS/PBCH block in a specific SS/PBCH block candidate due to CAP failure, the BS may increase the transmission probability of the SS/PBCH block by performing the CAP in other SS/PBCH block candidates. Therefore, a plurality of SS/PBCH block candidates may have the same SS/PBCH block index. In the present disclosure, the term "SS/PBCH block candidate index" may be interchanged with the term "SS/PBCH block index" according to the context.

For the 240 kHz SCS, SS/PBCH block (candidate) index 'n' may be transmitted in symbol #8/9/10/11 of the first slot, SS/PBCH block (candidate) index 'n+1' may be transmitted in symbol #12/13 of the first slot and symbol #0/1 of the second slot, SS/PBCH block (candidate) index 'n+2' may be transmitted in symbol #2/3/4/5 of the second slot, and SS/PBCH block (candidate) index 'n+3' may be transmitted in symbol #6/7/8/9 of the second slot. SS/PBCH block (candidate) index 'n+4' may be transmitted in symbol #4/5/6/7 of the third slot, SS/PBCH block (candidate) index 'n+5' may be transmitted in symbol #8/9/10/11 of the third slot, SS/PBCH block (candidate) index 'n+6' may be transmitted in symbol #12/13 of the third slot and symbol #0/1 of the fourth slot, and SS/PBCH block (candidate) index 'n+7' may be transmitted in symbol #2/3/4/5 of the fourth slot.

Figure 12A:
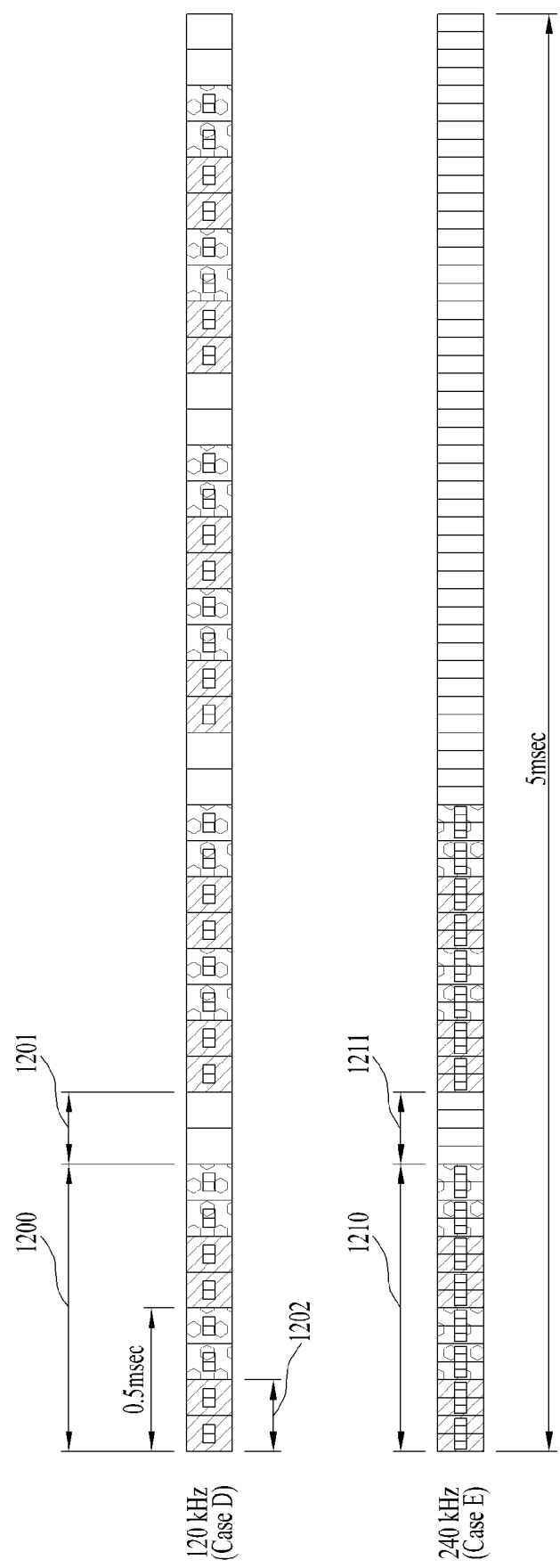
Figure 12B:
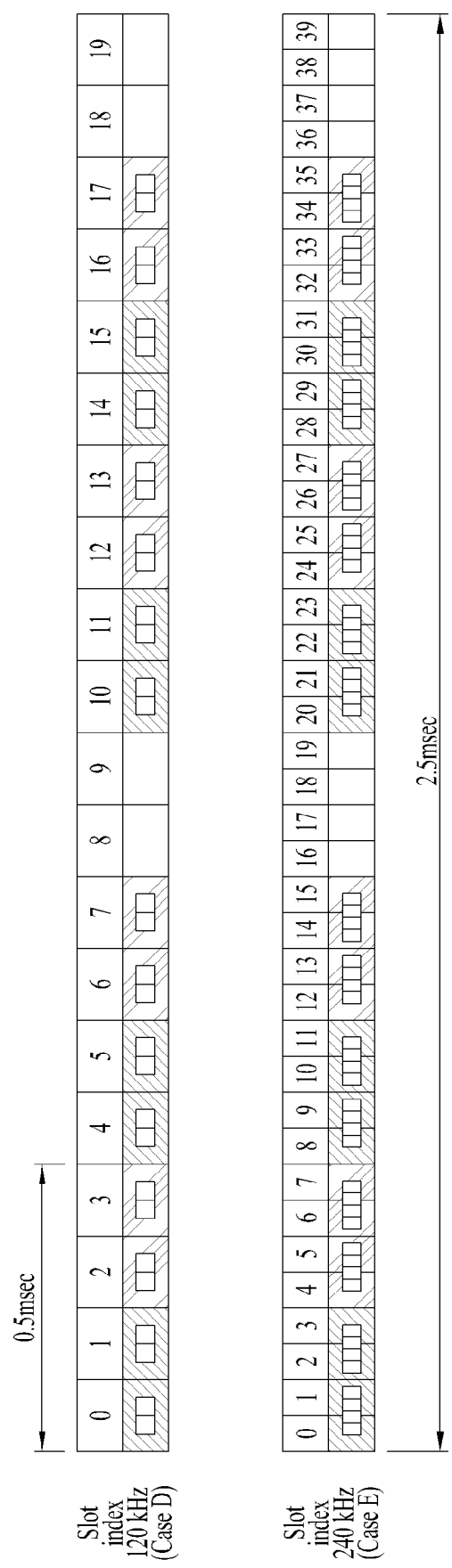
Figure 12C:
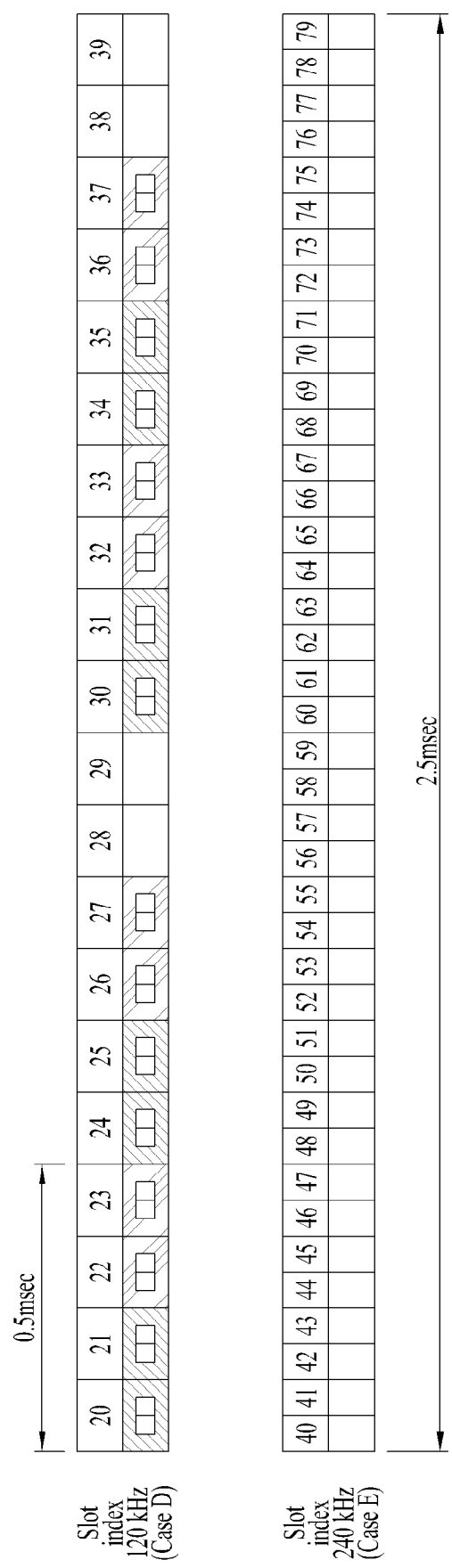

FIG. 11 illustrates SS/PBCH block transmission depending on each SCS at the symbol level in the time domain. FIGS. 12(a) to 12(c) illustrates SS/PBCH block transmission depending on each SCS at the slot level in the time domain (in the conventional 3GPP Rel-15 NR system). Hereinafter, a window capable of SS/PBCH block transmission is defined as an S_window, and the S_window is assumed to be a window of 5 msec. However, depending on embodiments, the duration of the S_window may be set to other values (e.g., 0.5 msec, 1/2/3/4 msec, etc.) by the BS. Referring to FIG. 12(a), the 5 msec window may include a total of 40 slots for the 120 kHz SCS. SS/PBCH blocks may be transmitted in 8 consecutive slots 1200, and a gap of two slots 1201 (e.g., slots #8 and #9) may exist between 8 consecutive slots (e.g., slots #0 to #7 1200 or slots #10 to #17). In this case, as in the 120 kHz SCS case 1100 shown in FIG. 11, a maximum of four SS/PBCH blocks may be transmitted in two slots (e.g., slots #0 and #1 1202, slots #2 and #3, slots #4 and #5, and slots #6 and #7) among the 8 consecutive slots (e.g., slots #0 to #7) capable of SS/PBCH block transmission. Similarly, the 5 msec window may include a total of 80 slots for the 240 kHz SCS. SS/PBCH blocks may be transmitted in 16 consecutive slots 1210, and a gap of four slots 1211 (e.g., slots #16 to #19) may exist between 16 consecutive slots (e.g., slots #0 to #15 1210 and slots #20 to #35). In this case, as in the 240 kHz SCS case of FIG. 11, a maximum of 8 SS/PBCH blocks may be transmitted in four slots (e.g., slots #0 to 3 slots #4 to #7, slots #8 to #11, and slots #12 to #15) among the 16 consecutive slots 1210 capable of SS/PBCH block transmission (e.g., slots #0 to #15). That is, for the 120 kHz SCS and 240 kHz SCS, the maximum number of SS/PBCH block (candidate) indices allowed within the 5 msec window may be limited to 64. Which SS/PBCH blocks are transmitted among the maximum of 64 SS/PBCH block (candidate) indices may be configured by cell-specific signaling or UE-specific RRC signaling.

Even if the NR system is extended to operate in frequency bands of 60/70 GHz (for convenience, the 60/70 GHz band is hereinafter referred to as frequency range 3 (FR3)), the SCS of an SS/PBCH block may be applied as 120 or 240 kHz as defined in FR2. The present disclosure proposes methods of increasing SS/PBCH block transmission opportunities in U-bands in the above situation. In addition, the present disclosure proposes methods of obtaining a serving cell timing, obtaining a quasi-co-located (QCL) relationship between SS/PBCH blocks, or notifying actually transmitted SS/PBCH block (candidate) indices among a maximum of 64 SS/PBCH block candidates in the above situation. In this case, obtaining the serving cell timing may include obtaining information about the timing of the serving cell, and in some embodiments, it may be referred to as acquisition of time synchronization of the serving cell. For example, the timing information may include information about a timing boundary such as a frame, a subframe, a slot, and a symbol, but the timing information is not limited thereto. In addition, obtaining the QCL relationship between SS/PBCH blocks may mean obtaining information on SS/PBCH blocks in the QCL relationship among a plurality of SS/PBCH blocks. Further, the actually transmitted SS/PBCH block candidate index may mean the SS/PBCH block candidate index related to an SS/PBCH block actually transmitted by the BS.

In the present disclosure, when two SS/PBCH blocks are in the QCL relationship, the UE may assume that the two SS/PBCH blocks have the same (large-scale) channel characteristics (e.g., average gain, Doppler shift, Doppler spread, average delay, delay spread, spatial Rx parameter, etc.).

Although the methods proposed in the present disclosure are described based on operation in U-bands, the methods may be applied to operation in licensed bands depending on the proposal. In addition, the term "unlicensed band" may be interchanged with the term "shared spectrum".

1) Receiver (Entity A; For Example, UE)

[Method #1] Method of Increasing SS/PBCH Block Transmission Opportunities

Figure 13A:
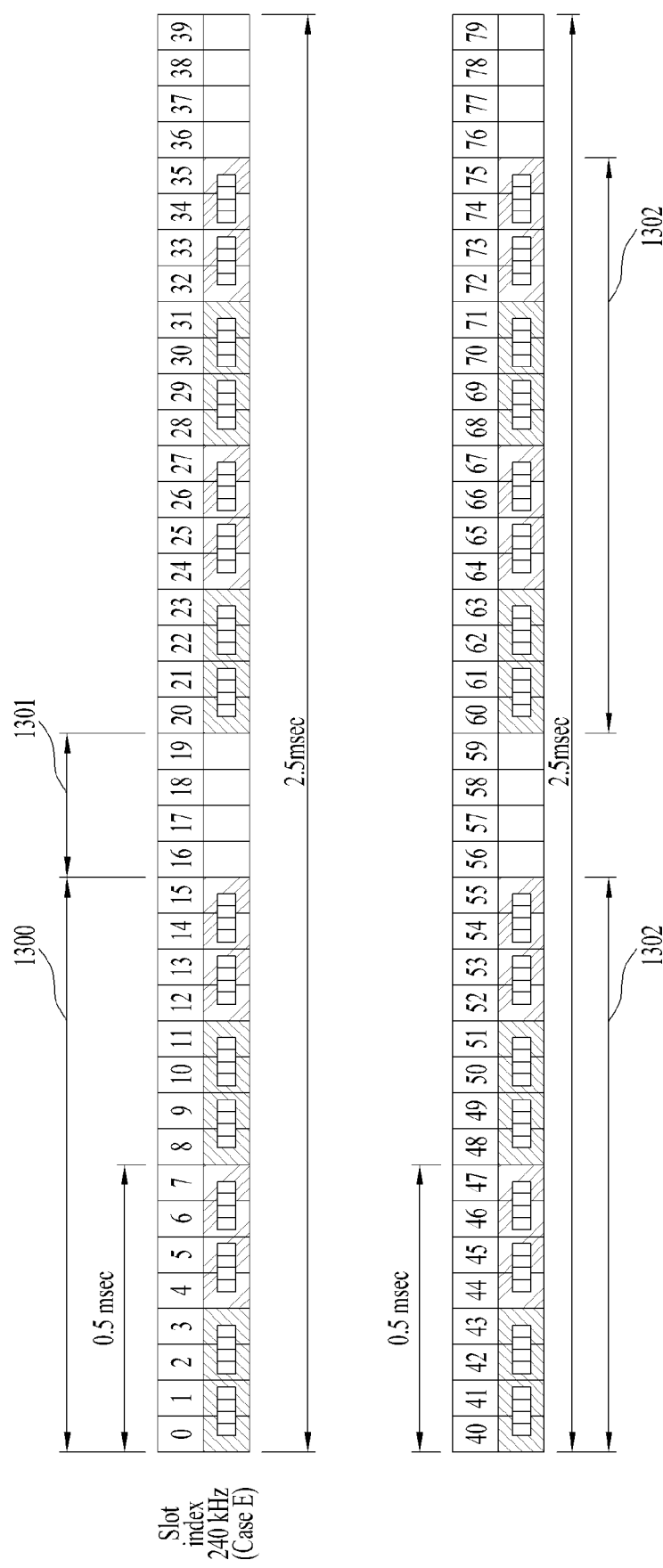
FIGS. 13(a) to 13(c) illustrate locations of SS/PBCH block candidates according to proposed methods.

If SS/PBCH block transmission is allowed even in a slot in which the SS/PBCH block transmission is not allowed (see FIGS. 12(a) to 12(c)), SS/PBCH block transmission opportunities may increase. For example, for an SCS of 240 kHz, the following rule may be applied: transmission of an SS/PBCH block burst is allowed in 16 consecutive slots 1300, and the SS/PBCH block burst transmission is not allowed in next 4 consecutive slots 1301 as shown in FIG. 13(a). Hereinafter, the SS/PBCH block burst may be understood to have the same meaning as the aforementioned SSB burst. That is, transmission of additional SS/PBCH blocks may be allowed in slot indices #40 to #55 1302 and slot indices #60 to #75 1303. In this case, a method of transmitting SS/PBCH blocks at the slot level every 0.25 msec may be the same as in FIG. 11. Hereinafter, the transmission method is referred to as "CASE 1" for convenience. In addition, SS/PBCH block (candidate) indices range from #0 to #127, and each SS/PBCH block (candidate) index may be linked to an SS/PBCH block at a single location.

Figure 13B:
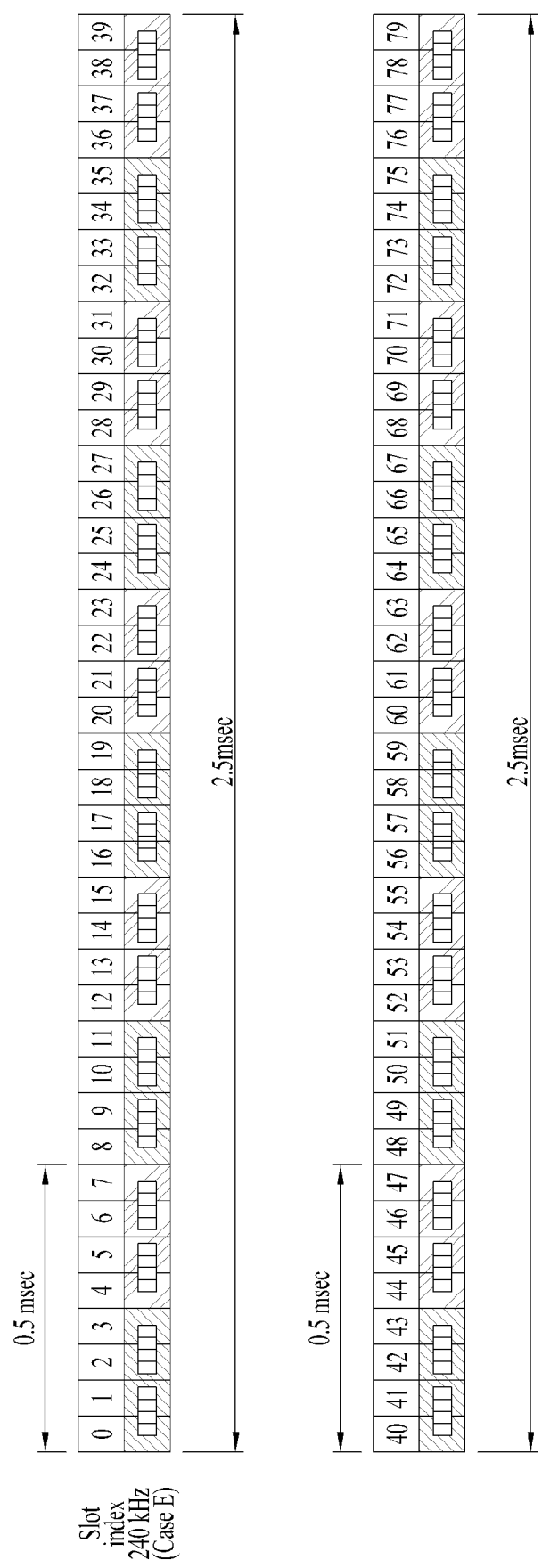

As another example, for an SCS of 240 kHz, SS/PBCH block transmission may be allowed in all slots within a window of 5 msec without considering slot(s) in which transmission of an SS/PBCH block burst is not allowed, as shown in FIG. 13(b). In this case, a method of transmitting SS/PBCH blocks at the slot level every 0.25 msec may be the same as in FIG. 11. When the slot 1301 in which the SS/PBCH block transmission is not allowed is defined as shown in FIG. 13(a), the UE may be allowed to perform UL transmission such as a PRACH or a PUCCH in the slot 1301 in which the SS/PBCH block transmission is not allowed, thereby improving system performance However, considering that for the U-band operation, a transmitting node needs to complete the CAP before actually performing transmission, it may be advantageous to allow SS/PBCH blocks to be transmitted in as many consecutive slots as possible. Hereinafter, for convenience, the transmission method is referred to as "CASE 2". In this case, SS/PBCH block (candidate) indices range from #0 to #159, and each SS/PBCH block (candidate) index may be linked to an SS/PBCH block at a single location.

Figure 13C:
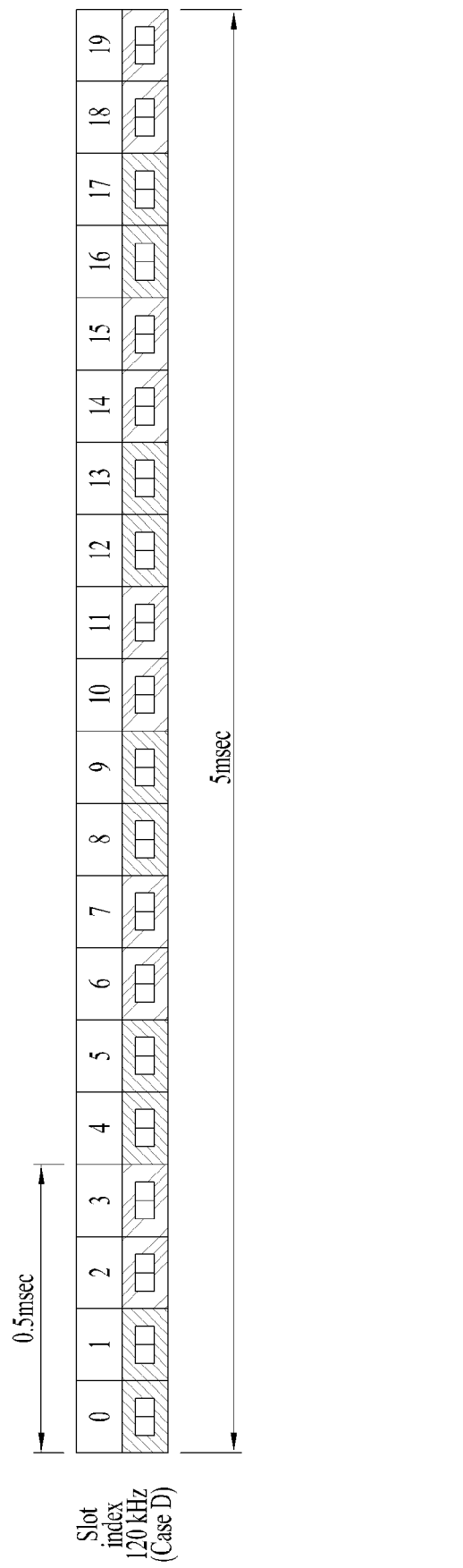

As another example, for the 120 kHz SCS, SS/PBCH block transmission may be allowed in all slots (within a window of 5 msec) without considering slot(s) in which transmission of an SS/PBCH block burst is not allowed as shown in FIG. 13(c). In this case, a method of transmitting SS/PBCH blocks at the slot level every 0.25 msec may be the same as in FIG. 11. Considering that for the U-band operation, a transmitting node needs to complete the CAP before actually performing transmission, it may be advantageous to allow SS/PBCH blocks to be transmitted in as many consecutive slots as possible as shown in FIG. 13(b). Hereinafter, the transmission method is referred to as "CASE 3" for convenience. In this case, SS/PBCH block (candidate) indices range from 0 to 79, and each SS/PBCH block (candidate) index may be linked to an SS/PBCH block at a single location.

[Method #2] Method of Obtaining Cell Timing Information by Applying [Method #1]

In the conventional 3GPP Rel-15 NR system, SS/PBCH block transmission may be allowed in a slot (or symbol) in which the SS/PBCH block transmission is not allowed as in [Method #1]. Hereinafter, there is provided a method by which the UE obtains information on a cell timing (e.g., timing boundaries of a frame/subframe/slot/symbol, etc.) related to a detected SS/PBCH block from signals and/or PBCH payloads in the SS/PBCH block when the UE attempts cell identification (e.g., cell identification for initial access, cell selection, RRM measurement, etc.) based on SS/PBCH block detection in a slot (or symbol) where transmission is newly allowed.

In 3GPP Rel-15 NR, up to 64 SS/PBCH blocks may be transmitted within a window of 5 msec as shown in FIGS. 12(a) to 12(c), and different combinations of {PBCH DMRS sequence index and PBCH payload information} may be defined for each of the 64 SS/PBCH block (candidate) indices. Specifically, 64 SS/PBCH blocks may be grouped in units of 8 consecutive SS/PBCH blocks in the time domain, 8 SS/PBCH blocks included in each group may be identified by 8 PBCH DMRS sequence indices, and 8 groups may be identified by three bits in the PBCH payload.

The UE may acquire cell timings related to additionally transmitted SS/PBCH blocks according to the following specific methods.

Option 1: Use of additional PBCH payload
Option 2: Use of additional PBCH DMRS sequences
Option 3: Use of information on phase shift of PBCH DMRS
Option 4: Use of information on location of RE to which PBCH DMRS is mapped
Option 5: Use of additional DL RS transmission
Hereinafter, specific methods for applying each option to "CASE 1" defined in FIG. 13(a) will be described.

Option 1 (use of additional PBCH payload): 1-bit information in the PBCH payload may be used to distinguish the first 64 SS/PBCH block (candidate) indices and the latter 64 SS/PBCH block (candidate) indices in FIG. 13(a). For example, the 1-bit information may be a spare 1 bit of an MIB, or all or a part of a specific field (which is currently used) may be reinterpreted therefor. If the 1-bit value is '0', the UE may obtain a cell timing related to one of the first 64 SS/PBCH block (candidate) indices. If the 1-bit value is '1', the UE may obtain a cell timing related to one of the latter 64 SS/PBCH block (candidate) indices.

Option 2 (use of additional PBCH DMRS sequences): To distinguish the first 64 SS/PBCH block (candidate) indices and the latter 64 SS/PBCH block (candidate) indices in FIG. 13(a), the number of PBCH DMRS sequences may increase to 16. That is, for PBCH DMRS sequence indices of #0 to #7, the UE may acquire a cell timing related to one of the first 64 SS/PBCH block (candidate) indices (as in the prior art), and for PBCH DMRS sequence indices of #8 to #15, the UE may acquire a cell timing related to one of the latter 64 SS/PBCH block (candidate) indices. Alternatively, if the detected PBCH DMRS sequence index is N (e.g., N is one of 8 to 15), the UE may recognize, as the actual cell timing, a value obtained by adding 2.5 msec to a cell timing related to one of the first 64 SS/PBCH block (candidate) indices (as in the prior art) where the PBCH DMRS sequence index is 'N−8'.

Option 3 (use of information on phase shift of PBCH DMRS): To distinguish the first 64 SS/PBCH block (candidate) indices and the latter 64 SS/PBCH block (candidate) indices in FIG. 13 (a), the phase offset between an SSS and a PBCH DMRS in the first half may be set different from the phase offset between an SSS and a PBCH DMRS in the second half. For example, transmission may be performed as follows: the phase offset between the SSS and PBCH DMRS in the first half is 0° (that is, the phases of the SSS and PBCH DMRS are set to be the same), and the phase offset between the SSS and PBCH DMRS in the second half is 180° (that is, the phases of the SSS and PBCH DMRS are set to be different from each other). That is, if the phase offset between an SSS and a PBCH DMRS in the detected SS/PBCH block is estimated to be 0°, the UE may acquire a cell timing related to one of the first 64 SS/PBCH block (candidate) indices (as in the prior art). Alternatively, if the phase offset between the SSS and the PBCH DMRS is estimated to be 180°, the UE may acquire a cell timing related to one of the latter 64 SS/PBCH block (candidate) indices. Alternatively, in some embodiments, if the phase offset between the detected SSS and PBCH DMRS is 180°, the UE may recognize, as the actual cell timing, a value obtained by adding 2.5 msec to a cell timing related to one of the first 64 SS/PBCH block (candidate) indices having a phase offset of 0°.

Option 4 (use of information on location of RE to which PBCH DMRS is mapped): As shown in Table 6 below, the RE position of a PBCH DMRS is determined by the value of a cell ID. In this case, the value of v in Table 6 is defined as v-shift. For example, to distinguish the first 64 SS/PBCH block (candidate) indices and the latter 64 SS/PBCH block (candidate) indices in FIG. 13(a), the RE position of a PBCH DMRS in the first half may be defined by the value of v-shift as in the prior art, and the RE position of a PBCH DMRS in the latter half may be defined by $v=(N_{ID}^{Cell}+a) \bmod 4$, where the value of a may be predefined. For example, the value of a may be any integer (e.g., 2) except for a multiple of 4. That is, if the RE position of a PBCH DMRS in the detected SS/PBCH block is determined by $v=(N_{ID}^{Cell}+a) \bmod 4$, the UE may acquire a cell timing related to one of the first 64 SS/PBCH block (candidate) indices (as in the prior art). If the RE position of the PBCH DMRS is determined by $v=(N_{ID}^{Cell}+a) \bmod 4$, the UE may acquire a cell timing related to one of the latter 64 SS/PBCH block (candidate) indices.

Option 5 (use of additional DL RS transmission): For example, to distinguish the first 64 SS/PBCH block (candidate) indices and the latter 64 SS/PBCH block (candidate) indices in FIG. 13(a), DL RS #1 may be transmitted in the first half, and DL RS #2 may be transmitted in the second half. It may be predefined that each of DL RS #1 and DL RS #2 has a resource location time division multiplexed (TDMed) and/or frequency division multiplexed (FDMed) with a linked SS/PBCH block, and different sequences may be defined for the two RSs. That is, if it is determined that DL RS #1 linked to the detected SS/PBCH block is transmitted, the UE may obtain a cell timing corresponding to one of the first 64 SS/PBCH block (candidate) indices (as in the prior art). If it is determined that DL RS #2 is transmitted, the UE may obtain a cell timing related to one of the last 64 SS/PBCH block (candidate) indices.

[Method #3] Method of Informing SS/PBCH Blocks in QCL Relationship

When the UE performs cell identification based on a plurality of SS/PBCH blocks which are received within the same S_window or different S_windows, a method for informing whether the corresponding SS/PBCH blocks are in the QCL relationship may be required. In this case, an interval at which the UE is capable of assuming the QCL relationship for SS/PBCH block (candidate) indices existing in the S_window may be signaled, and the corresponding value (e.g., value indicating the interval between SS/PBCH blocks in the QCL relationship) may be defined as QCL_para. That is, when the SS/PBCH block (candidate) index detected in S_window #1 is N, and when the SS/PBCH block (candidate) index detected in S_window #2, which is next to S_window #1, is M, if (N mod QCL_para) and (M mod QCL_para) are the same, the UE may assume that the

TABLE 7.4.3.1-1

7.4.3 SS/PBCH block
7.4.3.1 Time-frequency structure of an SS/PBCH block

In the time domain, an SS/PBCH block consists of 4 OFDM symbols, numbered in increasing order from 0 to 3 within the SS/PBCH block, where PSS, SSS, and PBCH with associated DM-RS are mapped to symbols as given by Table 7.4.3.1-1.
In the frequency domain, an SS/PBCH block consists of 240 contiguous subcarriers with the subcarriers numbered in increasing order from 0 to 239 within the SS/PBCH block. The quantities k and l represent the frequency and time indices, respectively, within one SS/PBCH block. The UE may assume that the complex-valued symbols corresponding to resource elements denoted as 'Set to 0' in Table 7.4.3.1-1 are set to zero. The quantity v in Table 7.4.3.1-1 is given by $v = N_{ID}^{cell} \bmod 4$. The quantity $k_{SSB}$ is the subcarrier offset from subcarrier 0 in common resource block $N_{CRB}^{SSB}$ to subcarrier 0 of the SS/PBCH block, where $N_{CRB}^{SSB}$ is obtained from the higher-layer parameter offsetToPointA and the 4 least significant bits of $k_{SSB}$ are given by the higher-layer parameter ssb-SubcarrierOffset and for SS/PBCH block type A the most significant bit of $k_{SSB}$ is given by $\bar{a}_{A+5}$ in the PBCH payload as defined in subclause 7.1.1 of [4, TS 38.212]. If ssb-SubcarrierOffset is not provided, $k_{SSB}$ is derived from the frequency difference between the SS/PBCH block and Point A.

Resources within an SS/PBCH block for PSS, SSS, PBCH, and DM-RS for PBCH.

| Channel or signal | OFDM symbol number/ relative to the start of an SS/PBCH block | Subcarrier number k relative to the start of an SS/PBCH block |
| --- | --- | --- |
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v | two SS/PBCH blocks are in the QCL relationship. As described above, a value of the SS/PBCH block candidate index obtained by performing a modulo operation of QCL_para may be defined as the SS/PBCH block index.

For the QCL_para value, candidate values are predefined for QCL_para, and a specific value to be actually applied by the UE among the candidate values may be signaled as the QCL_para value. In this case, the candidate values may have a divisor relationship with 64. For example, {64, 32, 16, 8} (or {64, 32}) may be predefined as candidate values, and a specific value among the candidate values may be configured as the QCL_para value. After the QCL_para value is configured, the QCL-para value may be signaled according to at least one of the following methods. Accordingly, one or more SS/PBCH blocks having the same QCL relationship (e.g., up to 64/QCL_para SS/PBCH blocks) may be configured/transmitted in the S_window.

Option A (use of additional PBCH payload, cell-specific RRC signaling, or UE-dedicated RRC signaling): For example, candidate values for QCL_para may be predefined as {64, 32, 16, 8}, and a specific value among the candidate values may be signaled by two bits of a PBCH payload, cell-specific RRC signaling, or UE-dedicated RRC signaling. For example, the PBCH payload may be spare bits of a PBCH, or all or a part of a specific field used in the prior art may be reinterpreted.

Option B (use of additional PBCH DMRS sequences): For example, the number of PBCH DMRS sequences may increase to 16. For example, for PBCH DMRS sequence indices of #0 to #7, the UE recognizes the QCL_para value as 64. For PBCH DMRS sequence indices of #8 to #15, the UE may recognize the QCL_para value as 32.

Option C (use of information on phase shift of PBCH DMRS): For example, if the phase offset between an SSS and a PBCH DMRS in the first half is 0°, the UE recognizes the QCL_para value as 64. If the phase offset between the SSS and PBCH DMRS is 180°, the UE may recognize the QCL_para value as 32.

Option D (use of information on location of RE to which PBCH DMRS is mapped): For example, if the RE position of a PBCH DMRS in the detected SS/PBCH block is determined by $v=N_{ID}^{Cell}$ mod 4, the UE recognizes the QCL_para value as 64. If the RE position of the PBCH DMRS is determined by $v=(N_{ID}^{Cell}+a)$ mod 4, the UE may recognize the QCL_para value as 32.

Option E (use of additional DL RS transmission): For example, if it is determined that DL RS #1 linked to the detected SS/PBCH block is transmitted, the UE recognizes the QCL_para value as 64. If it is determined that DL RS #2 is transmitted, the UE may recognize the QCL_para value as 32.

[Method #4] Method of Informing SS/PBCH Block Index Actually Transmitted by BS when Number of SS/PBCH Blocks Capable of Being Transmitted is Less than 64

Hereinafter, a method of informing the UE of an SS/PBCH block index actually transmitted by the BS (e.g., the SS/PBCH block index corresponding to an SS/PBCH block actually transmitted by the BS) when the number of SS/PBCH blocks capable of being transmitted is less than 64 (=K) as in [Method #3] is proposed. Specifically, when it is possible to inform the presence/absence of each group (each group is linked with 8 SS/PBCH block (candidate) indices) through an 8-bit bitmap, the UE may ignore information bits after a K/8-th bit of the 8-bit bitmap or expect that the information bits after the K/8-th bit are signaled as 0. In this case, informing the presence or absence of each group may mean informing whether an SS/PBCH block is actually transmitted in each group. Alternatively, when it is possible to inform the presence/absence of each SS/PBCH block index through a 64-bit bitmap, the UE may ignore information bits after a K-th bit of the 64-bit bitmap or expect to that the information bits after the K-th bit are signaled as 0. In this case, informing the presence or absence of each SS/PBCH block index may mean informing whether each SS/PBCH block candidate index corresponds to an actually transmitted SS/PBCH block.

When up to 64 SS/PBCH blocks are capable of being transmitted, which of the 64 SS/PBCH blocks is actually transmitted may be signaled based on a combination (16 bits in total) of an RRC parameter groupPresence (8-bit bitmap) and an RRC parameter inOneGroup (8-bit bitmap) on an ServingCellConfigCommonSIB IE (refer to FIG. 8). In this case, each bit of groupPresence may represent 8 consecutive SS/PBCH block indices. Specifically, the first bit of groupPresence may represent SS/PBCH block candidate indices #0 to #7, and the second bit of groupPresence may represent SS/PBCH block indices #8 to #15. In addition, an n-th bit of inOneGroup may represent an n-th SS/PBCH block index in each group. Specifically, the first bit of inOneGroup may represent index #0/8/16/24/32/40/48/56, which is the first SS/PBCH block index in each group. For example, if it is signaled that groupPresence is '1100000' and inOneGroup is '00110000', it may mean that SS/PBCH blocks with index #2/3/10/11 are actually transmitted among a total of 64 SS/PBCH block indices.

However, if the number of SS/PBCH blocks capable of being transmitted is less than 64 (=K) (e.g., QCL_para) as in [Method #3], information of some bits of groupPresence may be invalid. For example, if K is 32 (e.g., QCL_para=32), the number of SS/PBCH block indices included in each group may be maintained as 8. In this case, only four LSBs (first four bits or leftmost four bits) of groupPresence or four MSBs thereof may be valid. In addition, the remaining four bits may be invalid, or '0' may be signaled for the remaining four bits. Alternatively, the UE may ignore the remaining four bits or expect that the remaining four bits are signaled as '0'. This may be generalized as follows: for K less than 64, the number of SS/PBCH block indices included in each group may be maintained as 8, only (8/64*K) LSBs (i.e. first (8/64*K) bits or leftmost (8/64*K) bits) or (8/64*K) MSBs of groupPresence may be valid, and the remaining (8-8/64*K) bits may not be valid. Alternatively, the UE may ignore the remaining (8-8/64*K) bits or expect that the remaining (8-8/64*K) bits are signaled as '0'.

Alternatively, if K is less than 64, the number of SS/PBCH block indices included in each group may be configured different from that when K is 64, and GroupPresence and/or inOneGroup may be interpreted based on the number of SS/PBCH block indices, which is differently configured. For example, if K is 32, the number of SS/PBCH block indices included in each group may be set to 2, and the presence or absence of each group may be signaled through a 16-bit bitmap obtained by combining groupPresence and inOneGroup. In this case, as a grouping method, two consecutive SS/PBCH block indices may be paired (e.g., SS/PBCH block indices #0 and #1 may be set as the first group), or SS/PBCH block indices with an interval of 16 may be paired (SS/PBCH block indices #0 and #16 may be set as the first group, and SS/PBCH block indices #1 and #17 may be set as the second group). As another example, if K is 16, the number of SS/PBCH block indices included in each group may be set to 1, and the presence or absence of each SS/PBCH block index may be signaled through a 16-bit bitmap obtained by combining groupPresence and inOneGroup. As another example, if K is 8 (e.g., QCL_para=8), the presence or absence of each SS/PBCH block index may be signaled through the 8-bit bitmap of inOneGroup. In this case, groupPresence may not be signaled, or groupPresence may be all signaled as '0'. Alternatively, the UE may ignore signaled groupPresence or expect groupPresence is signaled as a specific value (e.g., all '0' values). Alternatively, if K is 8 (e.g., QCL_para=8), the presence or absence of each SS/PBCH block index may be signaled through the 8-bit bitmap of groupPresence. In this case, inOneGroup may not be signaled, or inOneGroup may be all signaled as '0'. Alternatively, the UE may ignore signaled inOneGroup or expect that inOneGroup is signaled as a specific value (e.g., all '0' values).

Meanwhile, for UE-dedicated RRC signaling, if a maximum of 64 SS/PBCH blocks is capable of being transmitted (K=64), a 64-bit full bitmap may be transmitted without considering signaling overhead. However, when the number of SS/PBCH blocks capable of being transmitted is less than 64 (=K), the size (or bit width) of the corresponding bitmap may be set to K bits. Alternatively, only K LSBs (i.e. first K bits or leftmost K bits) or K MSBs of the corresponding bitmap may be valid, and the remaining (64-K) bits may not be valid, or the remaining (64-K) bits may be signaled as '0'. Alternatively, the UE may ignore the remaining (64-K) bits of the corresponding bitmap or expect that the remaining (64-K) bits of the corresponding bitmap are signaled as '0'.

Figure 14:
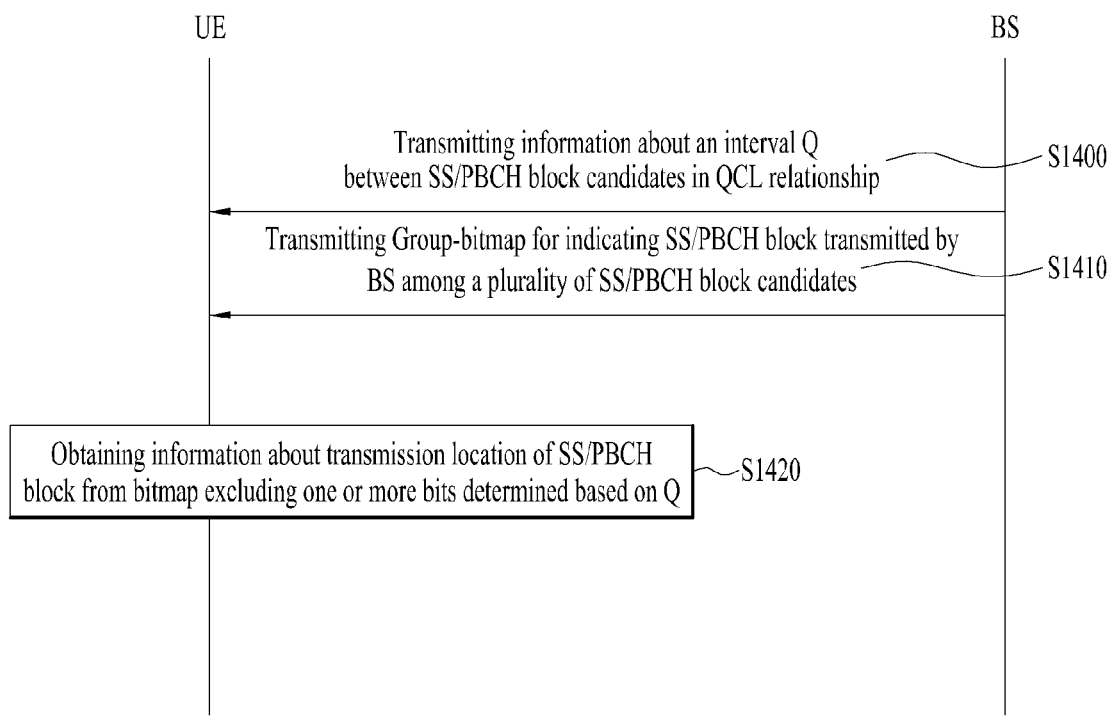
FIG. 14 is a flowchart illustrating operations of a base station (BS) and a user equipment (UE) according to proposed [Method #4]

FIG. 14 is a flowchart illustrating operations of a BS and a UE according to an embodiment of [Method #4].

Referring to FIG. 14, the BS may transmit information on an interval Q between SS/PBCH blocks in the QCL relationship among a plurality of SS/PBCH block candidates to the UE (S1400). In this case, Q may mean the maximum number of SS/PBCH blocks capable of being transmitted within a time window. Q may be defined as the number of (consecutive) SS/PBCH block candidates, which may be smaller than the number of SS/PBCH block candidates defined in the time window. In addition, Q may correspond to QCL_para of [Method #3] or K of [Method #4] as described above.

The BS may transmit a bitmap indicating an actually transmitted SS/PBCH block among a plurality of SS/PBCH blocks to the UE (S1410). In this case, the bitmap may indicate the location of the SS/PBCH block actually transmitted by the BS. For example, the bitmap may include a bitmap indicating whether SS/PBCH blocks are actually transmitted in each group when the plurality of SS/PBCH block candidates defined within the time window are divided into a plurality of groups. Specifically, if 64 SS/PBCH block candidates are defined within the time window and the 64 SS/PBCH block candidates are grouped in units of 8 SS/PBCH block candidates, whether SS/PBCH blocks are transmitted in each group may be indicated by an 8-bit bitmap.

The UE may obtain information on the transmission location of the actually transmitted SS/PBCH block from the bitmap except for one or more bits determined based on Q. When the information on Q is received, one or more bits of the bitmap may be recognized as invalid bits because only a maximum of Q SS/PBCH blocks may be transmitted within the time window. For example, when Q is set to 32, bits after a Q/8-th bit of the 8-bit bitmap may be invalid bits. Accordingly, the UE may ignore information bits after the Q/8-th bit of the 8-bit bitmap or expect that all information bits after the Q/8-th bit is signaled as a specific value (e.g., '0'). That is, the UE may obtain information on the transmission location of the actually transmitted SS/PBCH block from the 8-bit bitmap except for the Q/8-th bit and subsequent bits.

In addition, in some embodiments, the bitmap indicating the actually transmitted SS/PBCH block may refer to a combination of a bitmap (e.g., groupPresence parameter) for indicating information on each group and a bitmap (e.g., inOneGroup parameter) for indicating information on each SS/PBCH block candidate in a group.

[Method #5] Method of Informing Whether [Method #1] to [Method #4] Proposed Above are Applied Even if the BS provides services in FR3, whether the proposed methods including [Method #1], [Method #2], [Method #3], and/or [Method #4] are applied may be determined depending on the BS or depending on whether the BS serves in a U-band (for example, whether SS/PBCH blocks are transmitted in the U-band). In this case, to inform whether the proposed methods are applied or not, a synchronization raster in which SS/PBCH blocks are capable of being transmitted may be defined differently.

For example, synchronization raster set #1 (e.g., a set related to licensed bands) and a synchronization raster set #2 (e.g., a set related to U-bands) may be defined in FR3. In this case, different frequency offsets and/or different intervals may be configured for synchronization raster set #1 and synchronization raster set #2. If the UE detects an SS/PBCH block based on a synchronization raster belonging to synchronization raster set #1, the UE may recognize that the SS/PBCH block is the same SS/PBCH block as FR2 (see FIGS. 12(a) to 12(c)). In this case, the same SS/PBCH block as FR2 may mean an SS/PBCH block defined in FR2. For example, the same SS/PBCH block as FR2 may mean an SS/PBCH block transmitted as shown in FIGS. 12(a) to 12(c). On the other hand, if the UE detects an SS/PBCH block based on a synchronization raster included in synchronization raster set #2, the UE may recognize that the SS/PBCH block is an enhanced SS/PBCH block in FR3 (which is different from that in FR2) as in the proposed methods including [Method #1], [Method #2], [Method #3], and/or [Method #4]. In this case, the enhanced SS/PBCH block in FR3 may mean an SS/PBCH block to which at least one of [Method #1] to [Method #4] is applied. For example, the enhanced SS/PBCH block in FR3 may mean an SS/PBCH block transmitted as shown in FIGS. 13(a) to 13(c).

[Method #5-1] Method of Configuring Different Synchronization Raster Depending on SCS For example, an SS/PBCH block with an SCS of 480 and/or 960 kHz may be introduced in consideration of coexistence with the WiGig system with a bandwidth of 2 GHz (approximately, 2.16 GHz) and a 4096 fast Fourier transform (FFT) size (assumed in the Rel-15 NR system). The WiGig system is an example of a wireless communication system operating in an unlicensed frequency band of 60 GHz or higher. In this case, a different synchronization raster may be defined depending on the SCS in consideration of the complexity of a cell detection/identification process that the UE needs to perform in the corresponding frequency band. In addition, considering that the maximum frequency bandwidth varies depending on the SCS, the number of synchronization rasters may be defined differently depending on the SCS within a specific frequency band. For example, the number of synchronization rasters in which an SS/PBCH block with the 960 kHz SCS is capable of being located within the channel bandwidth of WiGig (e.g., 2.16 GHz) may be 1, and the number synchronization rasters in which an SS/PBCH block with the 120 kHz SCS is capable of being located therein may be 5. A total of 6 rasters may be located at different positions. For example, referring to FIG. 15, the SS/PBCH block with the 120 kHz SCS may be located in synchronization rasters {A, C, D, E, F}, and the SS/PBCH block with the 960 kHz SCS may be located in synchronization raster B. Each of the 6 synchronization raster {A, B, C, D, E, F} may have a different location. Accordingly, when the UE attempts to detect an SS/PBCH block in one of the synchronization rasters {A, C, D, E, F}, the UE may assume only the 120 kHz SCS. When the UE attempts to detect an SS/PBCH block in synchronization raster B, the UE may assume only the 960 kHz SCS.

Figure 16:
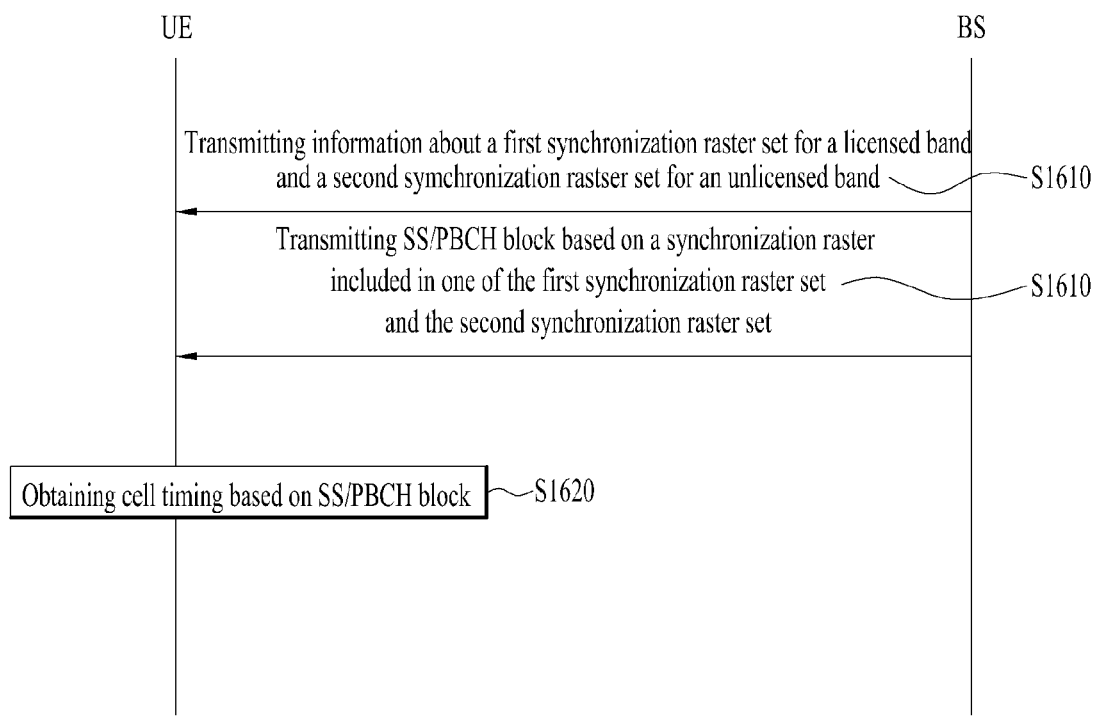
FIG. 16 is a flowchart illustrating operations of a BS and a UE according to proposed [Method #5]

FIG. 16 is a flowchart illustrating operations of a BS and a UE according to an embodiment of [Method #5].

Referring to FIG. 16, the BS may transmit information on a first synchronization raster set and a second synchronization raster set for a U-band to the UE (S1600). In this case, the first synchronization raster set and the second synchronization raster set may correspond to synchronization raster set #1 and synchronization raster set #2, respectively. The first synchronization raster set may include one or more synchronization rasters configured for a licensed band, and the second synchronization raster set may include one or more synchronization rasters configured for the U-band. In this case, different frequency offsets and/or intervals may be configured for the first synchronization raster set and the second synchronization raster set.

The BS may transmit an SS/PBCH block to the UE based on a synchronization raster included in the first synchronization raster set or the second synchronization raster set (S1610). The UE may acquire a cell timing based on the received SS/PBCH block (S1620). In this case, the UE may recognize the SS/PBCH block differently depending on which synchronization raster set the received SS/PBCH block is based on. For example, if the received SS/PBCH block is an SS/PBCH block based on a synchronization raster included in the first synchronization raster set, the UE may recognize the received SS/PBCH block as an SS/PBCH block transmitted as shown in FIGS. 12(a) to 12(c). Alternatively, if the received SS/PBCH block is an SS/PBCH block based on a synchronization raster included in the second synchronization raster set, the UE may recognize the received SS/PBCH block as an SS/PBCH block to which at least one of [Method #1] to [Method #4] is applied. In this case, the SS/PBCH block to which at least one of [Method #1] to [Method #4] is applied may include an SS/PBCH block transmitted as shown in FIGS. 13(a) to 13(c).

Additionally, the second synchronization raster set configured for the U-band may include synchronization rasters configured differently depending on the SCS. For example, as in [Method #5-1], a synchronization raster for an SCS of 120 kHz and a synchronization raster for an SCS of 960 kHz may be configured differently within the channel bandwidth of WiGig operating in U-bands. For example, as shown in FIG. 16, the synchronization raster for the 120 kHz SCS may include 5 synchronization rasters {A, C, D, E, F}, and the synchronization raster for the 960 kHz SCS may include one synchronization raster, synchronization raster B. In this case, the synchronization rasters configured differently depending on the SCS may have different locations. Accordingly, if an SS/PBCH block is detected in one of the synchronization rasters {A, C, D, E, F}, the UE may recognize the SCS of the corresponding SS/PBCH block as 120 kHz. If an SS/PBCH block is detected in synchronization raster B, the UE may recognize the SCS of the corresponding SS/PBCH block as 960 kHz.

[Method #6] Symbol Position of SS/PBCH Block with SCS of 480 and/or 960 kHz

As described above, an SS/PBCH block with an SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). Hereinafter, the (OFDM) symbol position of the SS/PBCH block with the 480 and/or 960 kHz SCS is proposed. The UE may expect that the SS/PBCH block with 480 and/or 960 kHz SCS is transmitted at the proposed (OFDM) symbol position. Hereinafter, a design based on the following three approaches is proposed regarding the symbol position of the SS/PBCH block with the 480 and/or 960 kHz SCS.

Figure 17A:
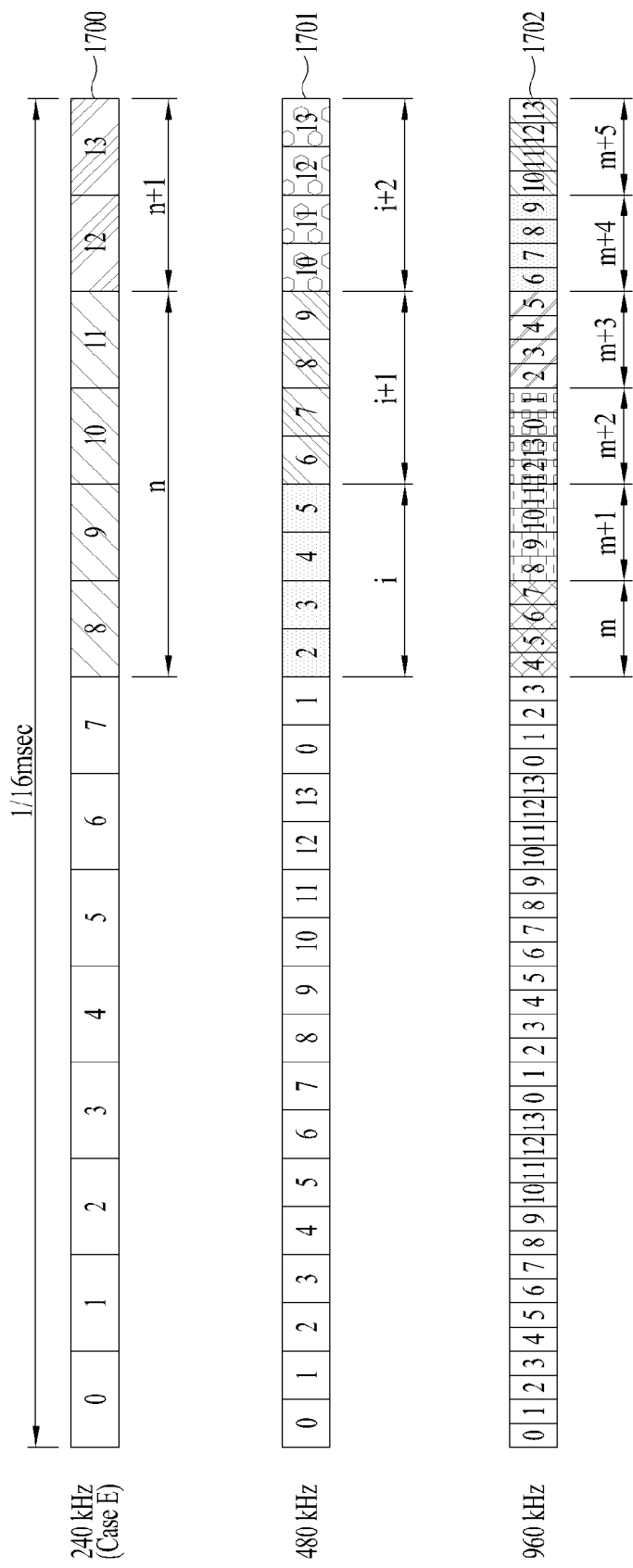
FIGS. 17(a) to 21 are diagrams for explaining the transmission location of an SS/PBCH block having a SCS of 480/960 kHz according to proposed methods.
Figure 17B:
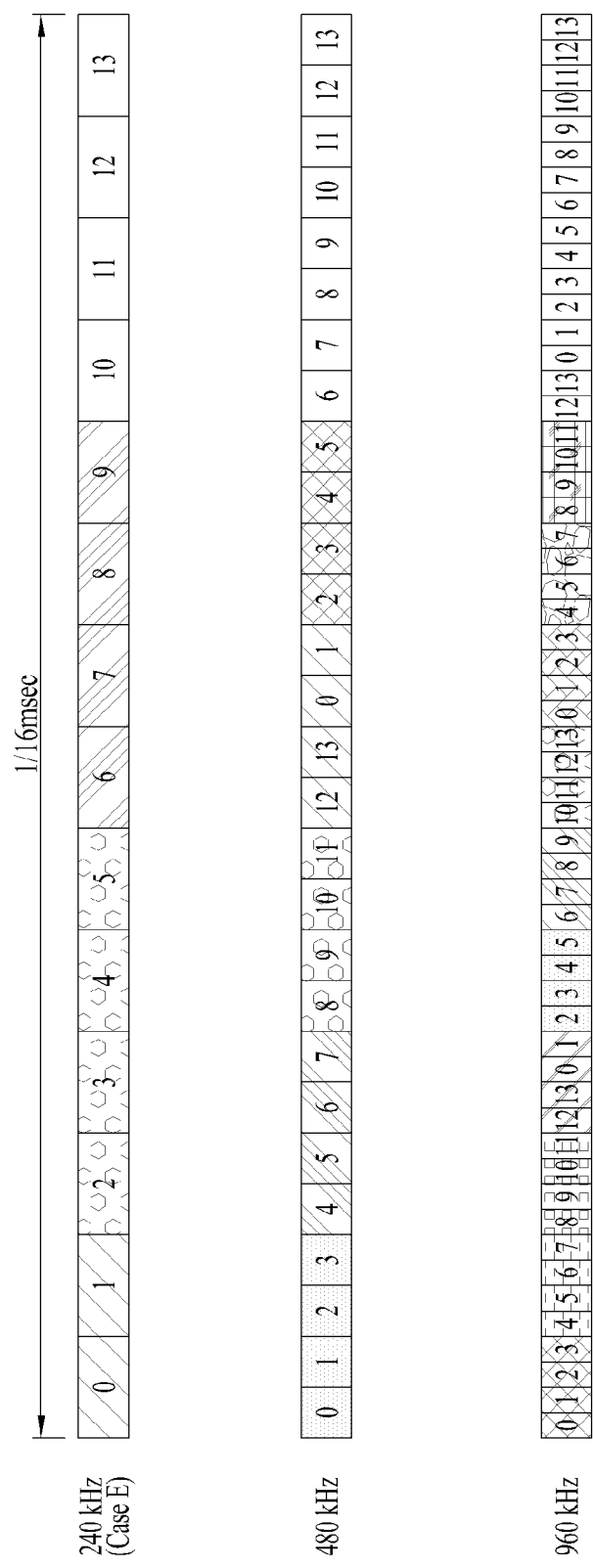

Approach 1: The symbol position of an SS/PBCH block with the 480/960 kHz SCS may be determined such that it is aligned with the predefined symbol position of an SS/PBCH block with the 120/240 kHz SCS. According to Approach 1, even if the SS/PBCH block is transmitted with the 480 or 960 kHz SCS and the SCS of a DL/UL control/data channel/signal transmitted/received on a carrier/BWP including the corresponding SS/PBCH block is 120 or 240 kHz, it has the advantage of easy multiplexing. For example, as shown in FIGS. 17(a) and 17(b), an SS/PBCH block may be configured with the 480/960 kHz SCS. FIG. 17(a) shows an SS/PBCH block configuration (or SS/PBCH block pattern) depending on each SCS within a p-th 1/16 msec time window, and FIG. 17(b) illustrates an SS/PBCH block pattern depending on each SCS within a (p+1)-th 1/16 msec time window next to that of FIG. 17(a). Specifically, referring to FIG. 11 and FIG. 17 (a), for an SS/PBCH block with the 240 kHz SCS 1700, SS/PBCH block (candidate) index 'n' may be defined/transmitted in symbol #8/9/10/11 of the first slot, and a part of SS/PBCH block (candidate) index 'n+1' may be defined/transmitted in symbol #12/13 of the first slot. In addition, referring to FIG. 17(a), for an SS/PBCH block with the 480 kHz SCS 1701, SS/PBCH block (candidate) index 'i' may be defined/transmitted in symbol #2/3/4/5 of the second slot, SS/PBCH block (candidate) index 'i+1' may be defined/transmitted in symbol #6/7/8/9 of the second slot, and SS/PBCH block (candidate) index 'i+2' may be defined/transmitted in symbol #10/11/12/13 of the second slot within the same 1/16 msec time window according to the symbol position of the SS/PBCH block with the 240 kHz SCS. In addition, for an SS/PBCH block with the 960 kHz SCS 1702, SS/PBCH block (candidate) index 'm' may be defined/transmitted in symbol #4/5/6/7 of the third slot, SS/PBCH block (candidate) index 'm+1' may be defined/transmitted in symbol #8/9/10/11 of the third slot, SS/PBCH block (candidate) index 'm+2' may be defined/transmitted in symbol #12/13 of the third slot and symbol #0/1 of the fourth slot, SS/PBCH block (candidate) index 'm+3' may be defined/transmitted in symbol #2/3/4/5 of the fourth slot, SS/PBCH block (candidate) index 'm+4' may be defined/transmitted in symbol #6/7/8/9 of the fourth slot, and SS/PBCH block (candidate) index 'm+5' may be defined/transmitted in symbol #10/11/12/13 of the fourth slot within the same 1/16 msec time window according to the symbol position of the SS/PBCH block with the 240 kHz SCS.

Approach 2: One of predefined SS/PBCH block patterns may be applied to the 480 and/or 960 kHz SCS. As described above, the time position of an SSB candidate (or SS/PBCH block candidate) in an SSB burst set may be defined depending on the SCS as in Case A to Case E. The predefined SS/PBCH block patterns may include SS/PBCH block patterns according to Case A to Case E described above. In each case, the starting symbol index of the SSB candidate (or SS/PBCH block candidate) may be given as follows. In this case, n is an integer greater than or equal to 0 and may have a different value for each case.

Figure 18A:
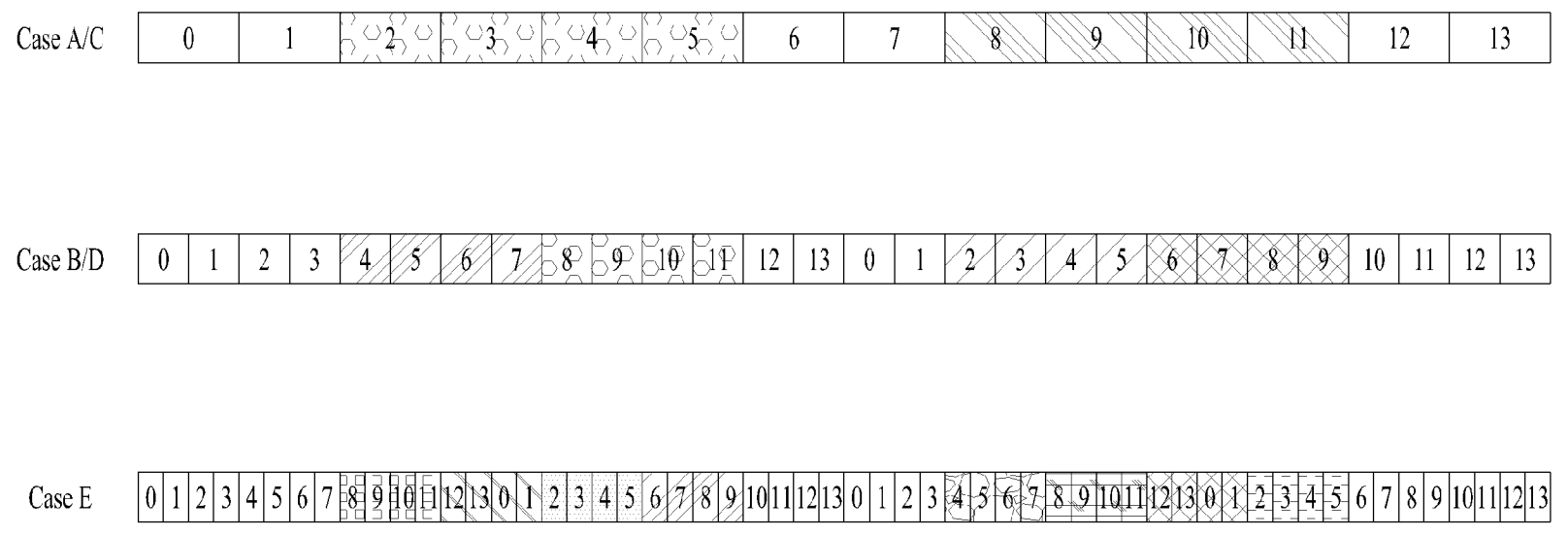

Case A/C: {2, 8}+14*n
Case B/D: {4, 8, 16, 20}+28*n
Case E: {8, 12, 16, 20, 32, 36, 40, 44}+56*n FIG. 18(a) illustrates SS/PBCH block patterns according to each case (Case A to Case E). According to Approach 2, one of the SS/PBCH block patterns shown in FIG. 18(a) may be applied to the SS/PBCH block with the 480 and/or 960 kHz SCS. In Approach 2, it may be assumed that an SS/PBCH block, CORESET #0, and an initial active DL/UL BWP at least have the same SCS. In this case, since a plurality of DL signals/channels have the same SCS, Approach 2 has the advantage of easily implementing a UE that simultaneously receives the plurality of DL signals/channels.

Figure 18B:
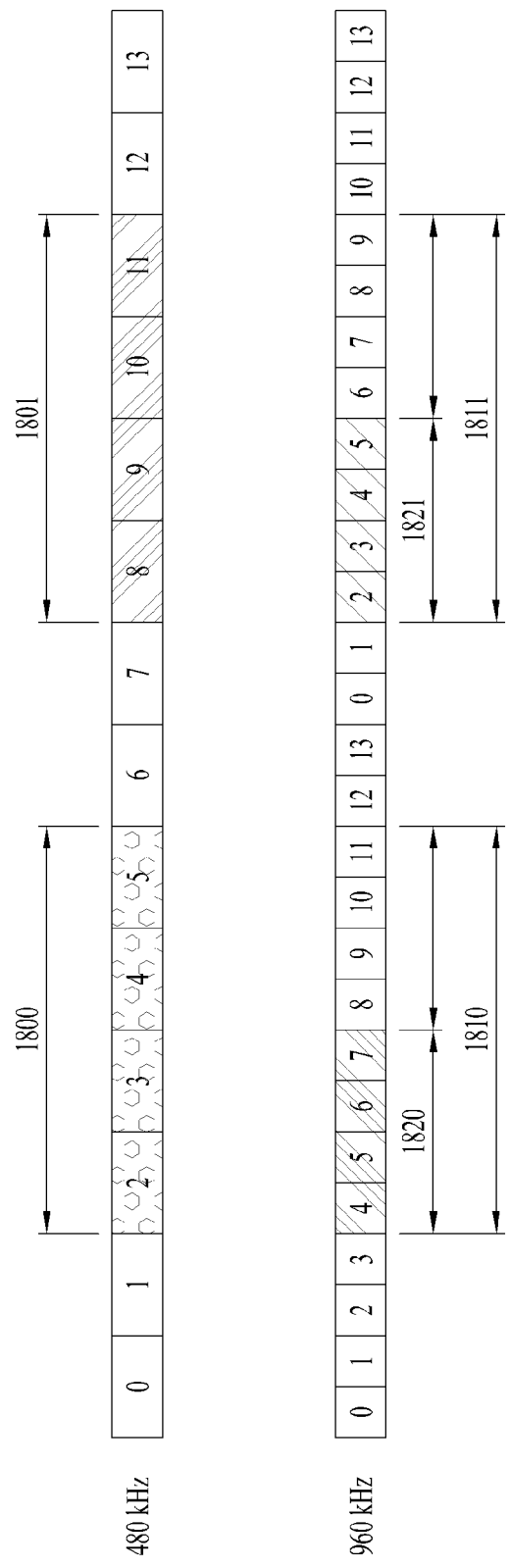

Approach 2-1: For the 480 kHz SCS, one of predefined SS/PBCH block patterns may be applied as shown in FIG. 18(a). For the 960 kHz SCS, it may be determined that only one SS/PBCH block with the 960 kHz SCS is located within the transmission period of the SS/PBCH block with the 480 kHz SCS in consideration of a scalable design. For example, for the 480 kHz SCS, an existing SS/PBCH block pattern such as Case A or Case C may be applied. Referring to FIG. 18(b), an SS/PBCH block may be located in four specific consecutive symbols (e.g., symbols #4/5/6/7) 1820 among symbols #4/5/6/7/8/9/10/11 1810 in a slot of the 960 kHz SCS, which correspond to symbols #2/3/4/5 1800 in a slot of the 480 kHz SCS. That is, when the SS/PBCH block with the 480 kHz SCS is transmitted in symbol #2/3/4/5 1800 in the 480 kHz SCS slot, only one SS/PBCH block with the 960 kHz SCS may be located within symbols #4 to #11 1810 in the 960 kHz SCS slot, which correspond to the transmission period of the SS/PBCH block with the 480 kHz SCS. Similarly, referring to FIG. 18(b), an SS/PBCH block may be located in four specific consecutive symbols (e.g., symbols #2/3/4/5) 1821 among symbols #2/3/4/5/6/7/8/9 1811 in a slot of the 960 kHz SCS, which correspond to symbols #8/9/10/11 1801 in a slot of the 480 kHz SCS.

Figure 19:
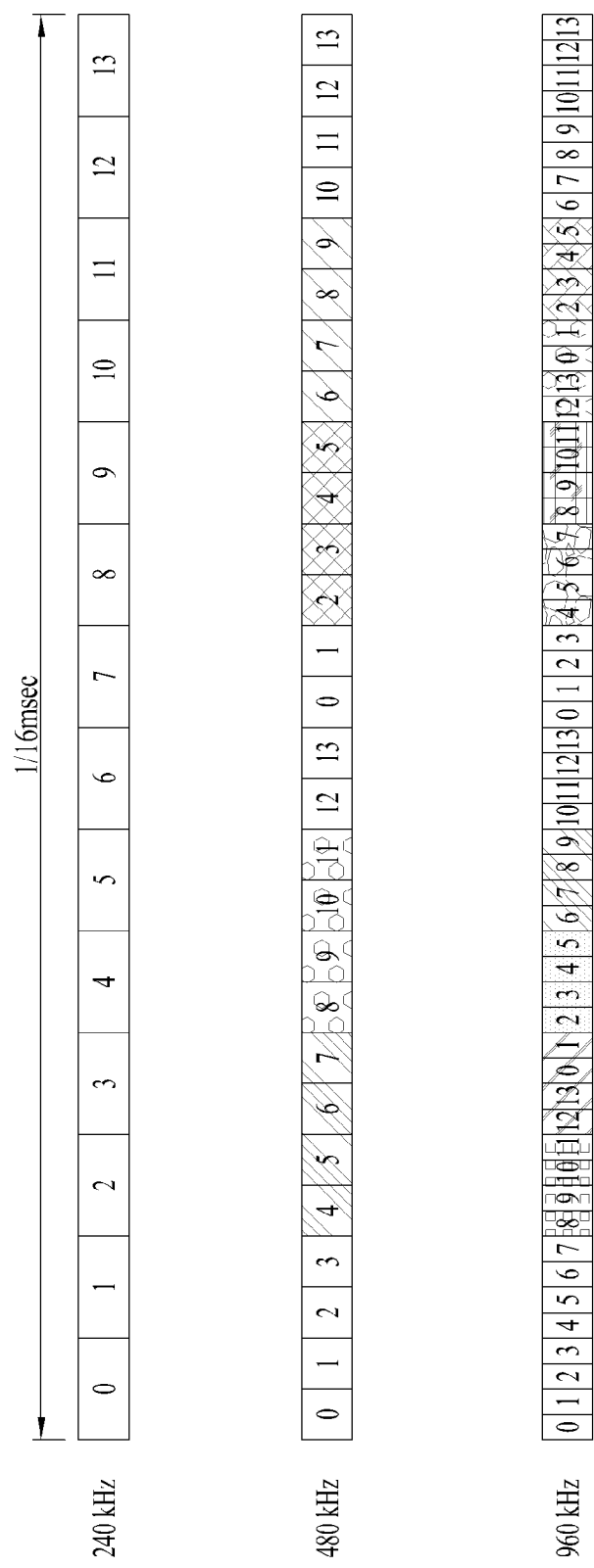

Approach 3: To define an SS/PBCH block pattern for the 120/240 kHz SCS, a method of configuring an SCS of 60 kHz as a reference SCS in consideration of coexistence between different SCSs and defining an SS/PBCH block pattern for the 120/240 kHz SCS based on the reference SCS may be similarly applied. For example, for the 480/960 kHz SCS, the symbol position of a 480/960 kHz SS/PBCH block may be determined based on a separate reference SCS rather than the 60 kHz SCS. In this case, for example, an SCS of 240 kHz may be configured as the separate reference SCS as shown in FIG. 19. According to Approach 3, an SS/PBCH block may not coexist with a DL/UL control/data channel/signal that is based on an SCS smaller than (or equal to) the reference SCS and transmitted/received on a carrier/BWP including the SS/PBCH block. Approach 3 has the advantage of reusing an existing SS/PBCH block pattern.

[Method #7] Slot in which SS/PBCH Block with 480 and/or 960 kHz SCS is Transmitted An SS/PBCH block with an SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). Hereinafter, the slot position of the SS/PBCH block with the 480 and/or 960 kHz SCS is proposed. The UE may expect that the SS/PBCH block with 480 and/or 960 kHz SCS is transmitted at the proposed slot position.

Figure 20:
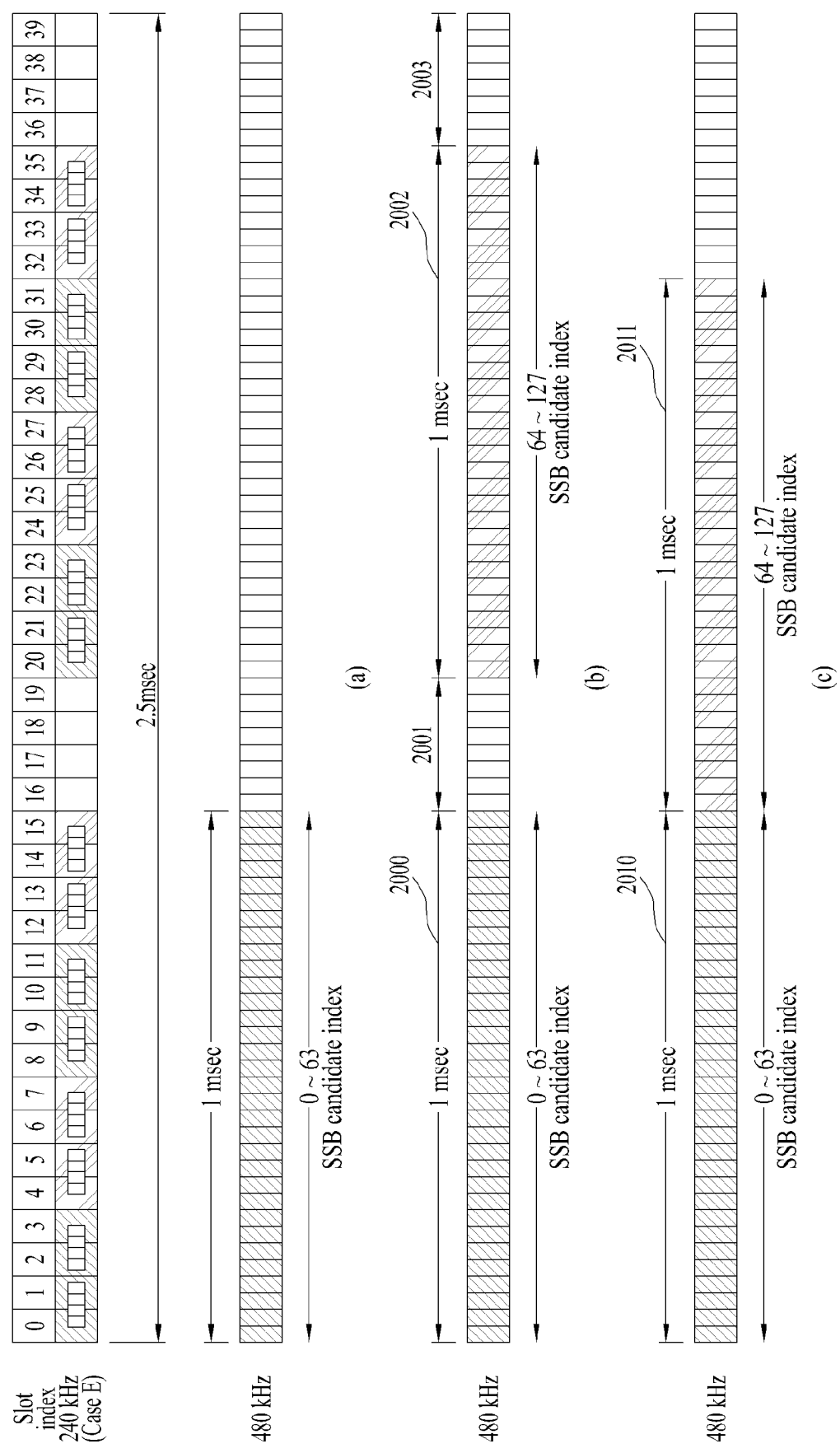

For the SS/PBCH block with the 480 kHz SCS, if the location of the SS/PBCH block in each slot (or slot group) based on the three approaches proposed in [Method #6] is applied to adjacent slots (or slot groups), a maximum of 64 SS/PBCH blocks may be transmitted for 1 msec (e.g., in 32 slots) as shown in FIG. 20(a). That is, referring to FIG. 20(a), 64 SS/PBCH block candidates (or SSB candidates) may exist within 1 msec, and the SS/PBCH block candidates may be indexed from #0 to #63 in order of time (SS/PBCH block candidate indexing).

In this case, a slot in which the SS/PBCH block is transmitted may be extended by applying [Method #1] as shown in FIG. 20(b) or FIG. 20(c) (hereinafter, for convenience, such a slot is referred to as a slot for the SS/PBCH block). For example, as shown in FIG. 20(b), the slot position of an additional SS/PBCH block may be determined by equally applying slot gaps considered for SS/PBCH blocks with the 120/240 kHz SCS. Accordingly, slots for SS/PBCH blocks with the 480 kHz SCS (or slots in which SS/PBCH block candidates are defined) are aligned with slots for SS/PBCH blocks with the 240 kHz SCS within the S_window. Specifically, referring to FIG. 20(b), transmission of SS/PBCH blocks is allowed in 32 consecutive slots 2000 corresponding to 1 msec, and transmission of SS/PBCH blocks is not allowed in next 8 slot gaps 2001. In addition, when [Method #1] is applied, transmission of SS/PBCH blocks is allowed in 32 consecutive slots 2002 located next to the 8 slot gaps 2001, and transmission of SS/PBCH blocks is not allowed in next 8 slot gaps 2003. Alternatively, the slot position of an additional SS/PBCH block may be determined without any slot gaps as shown in FIG. 20(c) in consideration of a structure capable of perform transmission without an additional CAP in U-bands. Specifically, referring to FIG. 20(c), when [Method #1] is applied, there may be no slot gap between slots 2011 for additional SS/PBCH blocks and slots 2000 for predefined SS/PBCH blocks, and thus, opportunities for transmitting SS/PBCH blocks in consecutive slots may increase.

In addition, when [Method #2] is applied, 64 or more SS/PBCH block candidate indices may be defined and signaled. When [Method #3] is applied, the QCL relationship between the SS/PBCH block candidate indices may be defined and signaled. When [Method #4] is applied, information about actually transmitted SS/PBCH blocks may be received.

Figure 21:
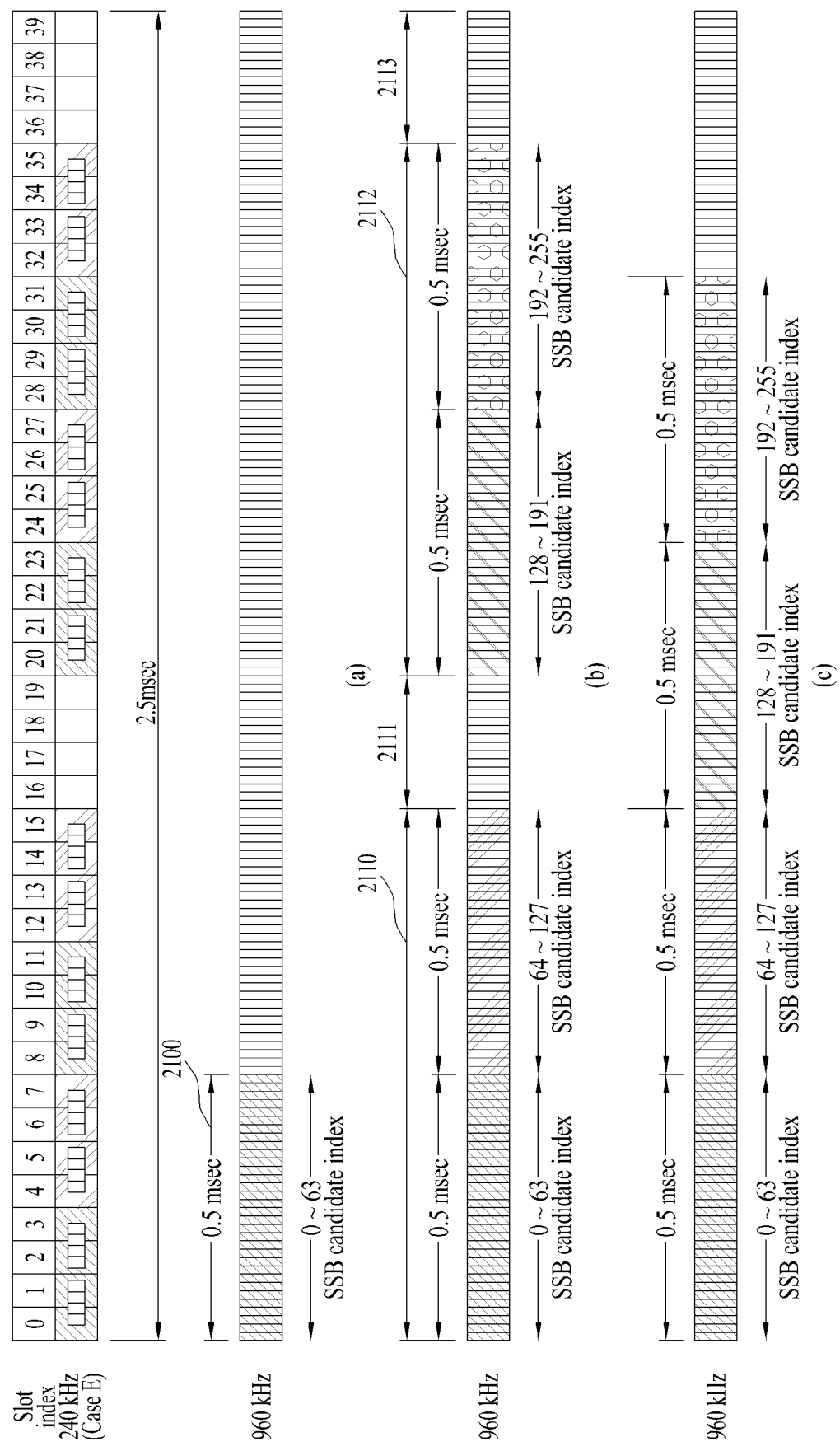

For the SS/PBCH block with the 960 kHz SCS, if the location of the SS/PBCH block in each slot (or slot group) based on the three approaches proposed in [Method #6] is applied to adjacent slots (or slot groups), a maximum of 64 SS/PBCH blocks may be transmitted for msec (e.g., in 32 slots) 2100 as shown in FIG. 21(*a*). Alternatively, according to Approach 2-1 proposed in [Method #6], since one SS/PBCH block is transmitted in one slot, a maximum of 64 SS/PBCH blocks may be transmitted for 1 msec (e.g., in 64 slots).

In this case, a slot in which the SS/PBCH block is transmitted may be extended by applying [Method #1] as shown in FIG. 21(*b*) or FIG. 21(*c*). For example, as shown in FIG. 21(*b*), the slot position of an additional SS/PBCH block may be determined by equally applying slot gaps considered for SS/PBCH blocks with the 120/240 kHz SCS. Specifically, referring to FIG. 21(*b*), transmission of up to 128 SS/PBCH blocks is allowed in 64 consecutive slots 2110 corresponding to 1 msec, and transmission of SS/PBCH blocks is not allowed in next 16 slot gaps 2111. When [Method #1] is applied, transmission of SS/PBCH blocks is allowed in 64 consecutive slots 2112 located next to the 16 slot gaps 2111, and transmission of SS/PBCH blocks is not allowed in next 16 slot gaps 2113 again. Alternatively, the slot position of an additional SS/PBCH block may be determined without any slot gaps as shown in FIG. 21(*c*) in consideration of a structure capable of transmitting without an additional CAP in U-bands.

In addition, when [Method #2] is applied, 64 or more SS/PBCH block candidate indices may be defined and signaled. When [Method #3] is applied, the QCL relationship between the SS/PBCH block candidate indices may be defined and signaled. When [Method #4] is applied, information about actually transmitted SS/PBCH blocks may be received.

In the above proposed methods, SS/PBCH blocks with different SS/PBCH block (candidate) indices may have the QCL relationship. In particular, it may be preconfigured/predefined that SS/PBCH blocks with N consecutive SS/PBCH block (candidate) indices (with no symbol gap) are in the QCL relationship. For example, for the 960 kHz SCS SS/PBCH block in FIG. 19, if N is 4, it may be defined or configured that SS/PBCH blocks with four consecutive SS/PBCH block candidate indices from symbol #8 of the first slot are in the QCL relationship. Alternatively, if N is 2, it may be defined or configured that SS/PBCH blocks with the first or last two indices among four consecutive SS/PBCH block candidate indices from symbol #8 of the first slot are in the QCL relationship. In this case, consecutive SS/PBCH blocks in the QCL relationship may be configured by cell-common RRC signaling such as an MIB, an SIB, etc.

For the 960 kHz SCS (or higher), considering a beam switching interruption time (BST), which is about 100 ns, the BST may be greater than the CP length. Therefore, for the 960 kHz SCS (or when the CP length is shorter than the BST for an SCS of 960 kHz or higher), it may be configured/defined that SS/PBCH blocks with N consecutive SS/PBCH block (candidate) indices without a symbol gap are in the QCL relationship. Similarly, even for the SS/PBCH block with the 480 kHz SCS, it may be configured/defined that SS/PBCH blocks with N consecutive SS/PBCH block (candidate) indices (without a symbol gap) are in the QCL relationship.

For reference, in conventional NR-U (for example, a system operating in a shared spectrum (or U-bands) less than 60 GHz and having an SCS of 240 kHz or lower), it may be configured/defined that SS/PBCH blocks with inconsecutive SS/PBCH block (candidate) indices are in the QCL relationship. For example, it is assumed that SSB(s) (or SS/PBCH block(s)) with the same value of $(N_{DM-RS}^{PBCH} \bmod N_{SSB}^{QCL})$ are in the QCL relationship, where $N_{DM-RS}^{PBCH}$ denotes the index of a DMRS sequence of a PBCH of an SSB, and $N_{SSB}^{QCL}$ may be provided by (i) ssbPositionQCL-Relationship. If (ii) ssbPositionQCL-Relationship is not provided, $N_{SSB}^{QCL}$ may be obtained from an MIB of an SSB based on Table 7. Table 7 shows a mapping relationship between a combination of subCarrierSpacingCommon and the LSB of ssb-SubcarrierOffset and $N_{SSB}^{QCL}$. The value of $N_{SSB}^{QCL}$ may be indicated by the combination of subCarrierSpacingCommon value and the LSB of ssb-SubcarrierOffset.

TABLE 7

| subCarrierSpacingCommon | LSB of ssb-SubcarrierOffset | $N_{SSB}^{QCL}$ |
|---|---|---|
| scs15or60 | 0 | 1 |
| scs15or60 | 1 | 2 |
| scs30or120 | 0 | 4 |
| scs30or120 | 1 | 8 |

Herein, ssbSubcarrierSpacingCommon indicates the SCS of RMSI only when operating without a shared spectrum. The UE assumes that the number of SSBs transmitted on a serving cell within a discovery burst transmission window is not greater than $N_{SSB}^{QCL}$. The UE may determine the SSB index as $(N_{DM-RS}^{PBCH} \bmod N_{SSB}^{QCL})$ or $(r \bmod N_{SSB}^{QCL})$, where i denotes a candidate SSB index (SSB candidate index or SS/PBCH block candidate index). Accordingly, one or more candidate SSBs may correspond to one SSB index. Candidate SSBs corresponding to the same SSB index are in the QCL relationship.

For the 960 kHz SCS (or when the CP length is shorter than the BST for an SCS of 960 kHz or higher), at least one symbol gap may be expected between SS/PBCH block (candidate) indices in different QCL relationships. For example, if an SS/PBCH block corresponding to SS/PBCH block (candidate) index 'm+1', an SS/PBCH block corresponding to SS/PBCH block (candidate) index 'm+2', and an SS/PBCH block corresponding to SS/PBCH block (candidate) index 'm+3' are capable of being transmitted in symbol #8/9/10/11 of the first slot, symbol #12/13 of the first slot and symbol #0/1 of the second slot, and symbol #2/3/4/5 of the second slot, respectively, SS/PBCH block (candidate) index 'm+1' and SS/PBCH block (candidate) index 'm+3' may not be in the QCL relationship. If N is 1, the UE may not expect transmission of the SS/PBCH block corresponding to SS/PBCH block (candidate) index 'm+2'. On the other hand, for the 480 kHz SCS (or when the CP length is longer than the BST for an SCS of 480 kHz or lower), the UE may expect transmission of the SS/PBCH block corresponding to SS/PBCH block (candidate) index 'm+2' in the same situation.

[Method #8] Method of Receiving Signaling of LBT Scheme Performed by BS

The UE may receive signaling of an LBT scheme performed by the BS for DL signal/channel transmission (during a specific period). When the signaled LBT scheme is a scheme in which transmission is allowed without determination of whether the channel is idle or busy, if the UE receives SS/PBCH blocks from the corresponding BS (during the corresponding period), the UE may assume that SS/PBCH blocks in the QCL relationship is transmitted only once within the S_window.

The BS (operating in a specific U-band of FR3) may be allowed to perform transmission without determining whether the channel is idle or busy in a specific situation (for example, in the following cases: when the interference level is low, when the frequency of collisions is determined to be low because the probability of success of DL transmission is high, when the transmission frequency is low, and when the transmission power is low). For convenience, an LBT scheme that allows transmission without determining whether the channel is idle/busy is named LBT scheme A, and an LBT scheme that allows transmission only when the channel is determined to be idle is named LBT scheme B. In this case, the BS may indicate to the UE whether the LBT scheme performed by the BS is LBT scheme A or LBT scheme B through higher layer signaling or (UE-specific or group-common) DCI. For example, the higher layer signaling may include cell-specific RRC signaling, UE-specific RRC signaling, or a medium access control (MAC) control element (CE). Alternatively, as in [Method #5], the UE may recognize whether the LBT scheme performed by the BS is LBT scheme A or LBT scheme B based on a synchronization raster in which an SS/PBCH block is capable of being transmitted. For example, when an SS/PBCH block based on a synchronization raster belonging to synchronization raster set #1 is detected, the UE may recognize that the LBT scheme performed by the BS for the SS/PBCH block is LBT scheme A. On the other hand, when an SS/PBCH block based on a synchronization raster belonging to synchronization raster set #2 is detected, the UE may recognize that the LBT scheme performed by the BS for the SS/PBCH block is LBT scheme B. In the following, indication of a specific LBT scheme may mean that the specific LBT scheme is explicitly configured/indicated by higher layer signaling or that the UE implicitly knows the specific LBT scheme based on the synchronization raster.

For example, if LBT scheme B is indicated, a plurality of transmission opportunities may be given to SS/PBCH blocks in the QCL relationship within the S_window as in FIG. 13(a) and the proposed methods. For example, for an SCS of 240 kHz, if SS/PBCH block (candidate) indices #0 to #127 are defined within a window of 5 msec as shown in FIG. 13(a) and if the value of QCL_para is 64, SS/PBCH block (candidate) index #N (e.g., N<64) and SS/PBCH block (candidate) index #(N+64) may have the QCL relationship within the 5 msec window. Alternatively, when the SS/PBCH block (candidate) index defined within the 5 msec window is represented by M (e.g., 0≤M≤127), SS/PBCH block candidate indices with the same value of (M mod 64) value may be in the QCL relationship. By providing an opportunity for transmitting SS/PBCH blocks with the same beam twice within the 5 msec window, it is possible to compensate for the LBT failure of the BS. In addition, the UE may assume that some of the SS/PBCH blocks in the QCL relationship are transmitted from the BS, depending on the LBT success/failure of the BS.

Accordingly, when the UE performs measurement such as RLM/RRM on SS/PBCH blocks (in the S_window), the UE may perform the measurement in the entire period of the S_window. For example, to perform RLM for a specific SS/PBCH block (candidate) index, the UE may use all SS/PBCH block (candidate) indices having the QCL relationship with the specific SS/PBCH block (candidate) index. In this case, the specific SS/PBCH block (candidate) may include an SS/PBCH block from which an MIB is obtained. In addition, the RLM may include estimation of path loss (PL) of a PUSCH/SRS (sounding reference signal) based on the SS/PBCH block. In this case, the UE may calculate the PL based on RS resources obtained from SS/PBCH (candidate) block(s) having the same SS/PBCH block index as that used for obtaining the MIB.

On the other hand, if LBT scheme A is indicated, the UE may assume that only a specific number (QCL_para) of SS/PBCH blocks are transmitted (within the S_window). For example, in FIG. 13(a), if QCL_para is 64, the UE may expect reception of only SS/PBCH blocks corresponding to SS/PBCH block (candidate) indices #0 to #63. Since the BS uses LBT scheme A, the BS may always transmit a DL signal such as an SS/PBCH block regardless of whether the channel is idle. For this reason, when the UE performs measurement such as RLM/RRM on SS/PBCH blocks (in the S_window), the UE may perform the measurement only in a specific (compressed) period within the S_window and may not perform the measurement in the remaining period, thereby reducing the power consumption. For example, the UE may calculate PL based on only RS resources obtained from an SS/PBCH block used to obtain an MIB. If LBT scheme A is indicated, LBT scheme A may be valid for a specific period, and the specific period may be predefined or preconfigured. For example, the corresponding specific period may be defined or configured as a period (e.g., 1 sec) in which SIB information is capable of varying.

In addition, the LBT scheme may be indicated by higher layer signaling (e.g., RRC signaling such as a MeasObjectNR information element (IE)) not only for a serving cell but also for a neighbor cell. For example, if LBT scheme A is indicated for a neighbor cell, the UE may perform RRM measurement for the neighbor cell only in QCL_para SS/PBCH blocks within the S_window (e.g., starting from the start of the S_window) and may not perform RRM measurement in other periods.

In addition, a method for the UE to monitor a Type0-PDCCH CSS set may vary according to the indicated LBT scheme. When LBT scheme B is indicated, the UE may assume that Type0-PDCCH CSS sets corresponding to all SS/PBCH block (candidate) indices in the QCL relationship with a specific SS/PBCH block (candidate) index (within the S_window) may be transmitted. On the other hand, when LBT scheme A is indicated, the UE may assume that only a Type0-PDCCH CSS set corresponding to one of a plurality of SS/PBCH block (candidate) indices in the QCL relationship with the specific SS/PBCH block (candidate) index (within the S_window) may be transmitted (for example, the one SS/PBCH block (candidate) index may be the first SS/PBCH block (candidate) index in the QCL relationship with the specific SS/PBCH block (candidate) index within the S_window). The first SS/PBCH block (candidate) index in the QCL relationship with the specific SS/PBCH block (candidate) index in the S_window may mean first QCL_para SS/PBCH blocks in the S_window.

In addition, a PDSCH reception method may vary according to the indicated LBT scheme. For example, when LBT scheme B is indicated, the UE may assume no PDSCH is mapped to resources (e.g., RBs) for all SS/PBCH block (candidate) indices in the QCL relationship with a specific SS/PBCH block (candidate) index (in the S_window). For example, although a codeword carried on a PDSCH is generated in consideration of the amount of all resources (e.g., RBs) allocated for PDSCH transmission, if resources (e.g., RBs) allocated for the PDSCH transmission overlap with resources (e.g., RBs) for an SS/PBCH block (candidate) in the QCL relationship with the specific SS/PBCH block (candidate), no PDSCH may be mapped to the overlapping resources. In this case, the specific SS/PBCH block (candidate) index may include an SS/PBCH block (candidate) index, which is actually transmitted and such a notification is provided by the BS to the UE (see FIG. 9).

On the other hand, when LBT scheme A is indicated, the UE may assume that although no PDSCH is mapped to resources (e.g., RBs) for one of a plurality of SS/PBCH block (candidate) indices in the QCL relationship with the specific SS/PBCH block (candidate) index (in the S_window) (for example, the one SS/PBCH block (candidate) index may be the first SS/PBCH block (candidate) index in the QCL relationship with the specific SS/PBCH block (candidate) index within the S_window), but a PDSCH may be mapped to resources (e.g., RBs) for the remaining SS/PBCH block (candidate) indices in the QCL relationship. Accordingly, when PDSCH resources (e.g., RBs) overlap with the resources (e.g., RBs) for the remaining SS/PBCH block (candidate) indices in the QCL relationship, the PDSCH may be mapped to all resources (e.g., RBs) allocated for the PDSCH.

In addition, a PDSCH time domain resource allocation (TDRA) method may vary according to the indicated LBT scheme. Before receiving a specific TDRA table from the BS, the UE may be scheduled with a PDSCH based on a default TDRA table. In this case, the default TDRA table may be defined differently depending on whether shared spectrum access operation is performed. For example, when LBT scheme B is indicated, the UE may be scheduled with the PDSCH based on the default TDRA table defined for the shared spectrum access operation before receiving the specific TDRA table from the BS. On the other hand, when LBT scheme A is indicated, the UE may be scheduled with the PDSCH based on a default TDRA table defined for other operations rather than shared spectrum access before receiving the specific TDRA table from the BS. Each TDRA table may include a plurality of columns, and each column may include at least one of the following: (1) a DMRS symbol index in a slot, (2) a PDSCH mapping type, (3) a PDCCH-to-PDSCH slot offset, (4) a PDSCH starting symbol in a slot, and (5) the number of PDSCH symbols.

Figure 22:
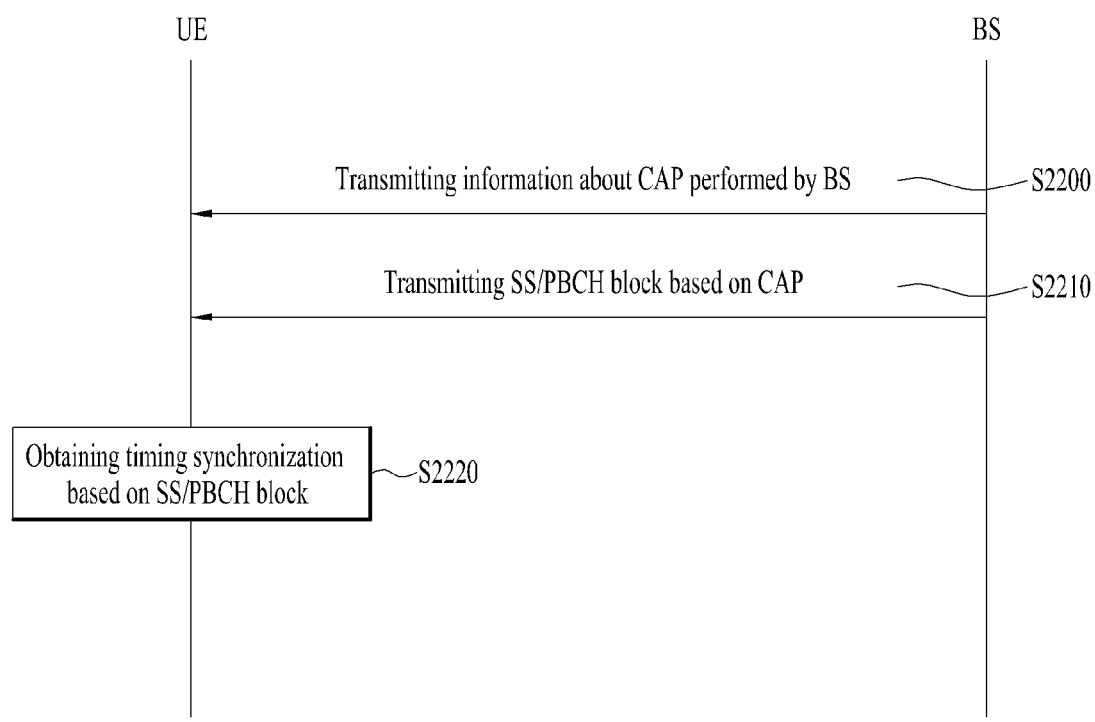
FIG. 22 is a flowchart illustrating operations of a BS and a UE according to proposed [Method #8]

FIG. 22 is a flowchart illustrating operations of a BS and a UE according to [Method #8] proposed above.

Referring to FIG. 22, the BS may transmit information on a CAP (or LBT) performed by the BS (S2200). In this case, the CAP performed by the BS may include: a first CAP in which transmission is allowed regardless of whether the channel is idle; or a second CAP in which transmission is allowed only when the channel in idle. For example, the first CAP may correspond to LBT scheme A described above, and the second CAP may correspond to LBT scheme B described above. The information on the CAP may be transmitted to the UE through higher layer signaling or DCI.

The BS may transmit an SS/PBCH block to the UE based on the performed CAP (S2210). When the BS performs the first CAP, the BS may transmit the SS/PBCH block regardless of whether the channel is idle. When the BS performs the second CAP, the BS may check whether the channel is idle and transmit the SS/PBCH block only when the channel is idle.

The UE may acquire time synchronization based on the received SS/PBCH block (S2220). When receiving the SS/PBCH block, the UE may differently recognize the transmission of the SS/PBCH block depending on the CAP performed by the BS. For example, when the second CAP is performed, a plurality of transmission opportunities may be given to SS/PBCH blocks in the QCL relationship within the aforementioned S_window because the BS is capable of transmitting SS/PBCH blocks only when the channel is idle. Accordingly, the UE may expect that some of the SS/PBCH blocks in the QCL relationship will be transmitted by the BS. However, when the first CAP is performed, one transmission opportunity may be given to SS/PBCH blocks in the QCL relationship within the S_window because the BS is capable of transmitting SS/PBCH blocks regardless of whether the channel is idle. Accordingly, the UE may expect that SS/PBCH block transmission is performed only on SS/PBCH block candidates having SS/PBCH block candidate indices smaller than QCL_para (or SS/PBCH block candidates of which the number is equal to QCL_para).

[Method #9] Method of Configuring SS/PBCH Blocks with Multiple Numerologies in One Cell SS/PBCH blocks having different numerologies in one cell may be configured (for each BWP). For example, reception of an SS/PBCH block with an SCS of 120 kHz may be configured in initial BWP #0, and reception of an SS/PBCH block with an SCS of 480 kHz (or 960 kHz) may be configured in BWP #1. When the UE switches to BWP #0 while performing RRM measurement based on the SS/PBCH block with the 480 kHz SCS (or 960 kHz SCS) configured in BWP #1, the QCL relationship may be configured between SS/PBCH block indices with the 120 kHz SCS and SS/PBCH block indices with the 480 kHz SCS (or 960 kHz SCS) so that the UE is allowed to continue to perform the RRM measurement. For example, SS/PBCH block (candidate) index n with the 120 kHz SCS and SS/PBCH block (candidate) index m with the 480 kHz SCS (or 960 kHz SCS) may be configured to be in the QCL relationship. Alternatively, it may be regulated that the QCL relationship is capable of being assumed for the same SS/PBCH block (candidate) index.

Considering the implementation complexity when the UE assumes a plurality of SCSs in initial access, the number of SCSs to be applied to SS/PBCH blocks in the initial access may be minimized. For example, only the 120 kHz SCS may be limitedly applied to SS/PBCH blocks in the initial access. On the other hand, after the initial access, the 480 or 960 kHz SCS may be configured for a dedicated BWP other than the initial BWP (depending on whether UE supports the dedicated BWP). If the UE needs to receive the SS/PBCH block with the 120 kHz SCS for RRM measurement in the dedicated BWP other than the initial BWP, there is a disadvantage that the UE needs to frequently change the numerology to perform the RRM measurement. Considering this disadvantage, the SS/PBCH block with the 480 and/or 960 kHz SCS may be defined for other purposes other than the initial access (e.g., RRM measurement, RLM, candidate beam detection, beam failure detection, beam management, etc.). In this case, an SS/PBCH block having a different SCS per BWP may be configured in the same cell. For example, reception of the SS/PBCH block based on the 120 kHz SCS may be configured for BWP #0, and reception of the SS/PBCH block based on the 480 kHz SCS (or 960 kHz SCS), which is the same as the numerology configured for BWP #1, may be configured for BWP #1.

The UE may perform the RRM measurement, RLM, candidate beam detection, beam failure detection, beam management, etc. based on SS/PBCH block reception. During BWP switching, the UE needs to continuously perform the RRM measurement, RLM, candidate beam detection, beam failure detection, beam management, etc., which are performed based on a specific SS/PBCH block (candidate) index, in order to maintain the performance. To support this operation, it may be necessary to establish the QCL relationship between SS/PBCH block (candidate) indices based on different numerologies, which are configured in the same cell. According to a predefined rule, the UE may assume that SS/PBCH block (candidate) index n with the 120 kHz SCS and SS/PBCH block (candidate) index n with the 480 kHz SCS (or 960 kHz SCS) are in the QCL relationship and different indices are not in the QCL relationship. Alternatively, it may be configured by RRC signaling that the QCL relationship is established between SS/PBCH block (candidate) index n with 120 kHz SCS and SS/PBCH block (candidate) index m with the 480 kHz SCS (or 960 kHz SCS).

In addition, the UE may assume that the value of ssb-PositionsInBurst (see Table 8) obtained from RRC signaling such as SIB1 in the initial access is equally applied the SS/PBCH block (candidate) index with the 120 kHz SCS and the SS/PBCH block (candidate) index with 480 kHz SCS (or 960 kHz SCS)

on a U-band (S2300). Specifically, SS/PBCH block candidates in which an SS/PBCH block is capable of being transmitted may be defined within a time window configured for SS/PBCH block transmission, and the UE may receive an SS/PBCH block transmitted on some of the SS/PBCH block candidates defined within the time window. In this case, the time window may be set to a duration of 5 msec (e.g., half frame), but the time window is not limited thereto. That is, the time window may have other values configured by the BS. The time window may correspond to the S_window described above in [Method #1].

The positions of the plurality of SS/PBCH block candidates defined within the time window may be determined differently depending on the SCS of the SS/PBCH block. Specifically, based on that the SCS of the SS/PBCH block is set to 240 kHz, the plurality of SS/PBCH block candidates may be located in both the first half and the second half of the time window. In this case, the first half and the second half of the time window may mean a first time period and a second time period, respectively, when the time window is divided into two time periods having the same size. For example, if the time window is set to 5 msec, the first half and the second half may mean a first half period of 2.5 msec

TABLE 8

For operation with shared spectrum channel access, a UE assumes that transmission of SS/PBCH blocks in a half frame is within a discovery burst transmission window that starts from the first symbol of the first slot in a half-frame.
The UE can be provided per serving cell by DiscoveryBurst-WindowLength a duration of the discovery burst transmission window. If DiscoveryBurst-WindowLength is not provided, the UE assumes that the duration of the discovery burst transmission window is a half frame. For a serving cell, the UE assumes that a periodicity of the discovery burst transmission window is same as a periodicity of half frames for receptions of SS/PBCH blocks in the serving cell.
The UE assumes that one or more SS/PBCH blocks indicated by ssb-PositionsInBurst may be transmitted within the discovery burst transmission window and have candidate SS/PBCH blocks indexes corresponding to SS/PBCH block indexes provided by ssb-PositionsInBurst.
If MSB k, k ≥ 1, of ssb-PositionsInBurst is set to 1, the UE assumes that SS/PBCH block(s) within the discovery burst transmission window with candidate SS/PBCH block index(es) corresponding to SS/PBCH block index equal to k − 1 may be transmitted;
if MSB k is set to 0, the UE assumes that the SS/PBCH block(s) are not transmitted.

For example, when only SS/PBCH blocks corresponding to indices #0 to #31 among 64 SS/PBCH block (candidate) indices are actually transmitted and SS/PBCH blocks corresponding to indices #32 to #63 are not transmitted, the UE may assume that the above configuration is equally applied to SS/PBCH blocks with the 120 kHz SCS configured in the (initial) BWP and SS/PBCH blocks with the 480 kHz SCS (or 960 kHz SCS) configured in the (dedicated) BWP. Alternatively, the parameter ssb-PositionsInBurst indicating which SS/PBCH block (candidate) index is transmitted among the 64 SS/PBCH block (candidate) indices may be configured separately depending on the BWP (or the SCS of the SS/PBCH block).

In the proposed methods, RRM measurement may be extended to RLM, candidate beam detection, beam failure detection, and beam management, and the same methods may be applied to measurement of adjacent cells as well as the serving cell (Pcell, PSCell, and/or S cell).

Alternatively, when only the 120 kHz SCS is applied to SS/PBCH blocks in the initial access in consideration of signaling complexity, it may be regulated that SS/PBCH blocks based on the 480 or 960 kHz SCS are applied only to the SCell (except for the PCell or PSCell).

Figure 23:
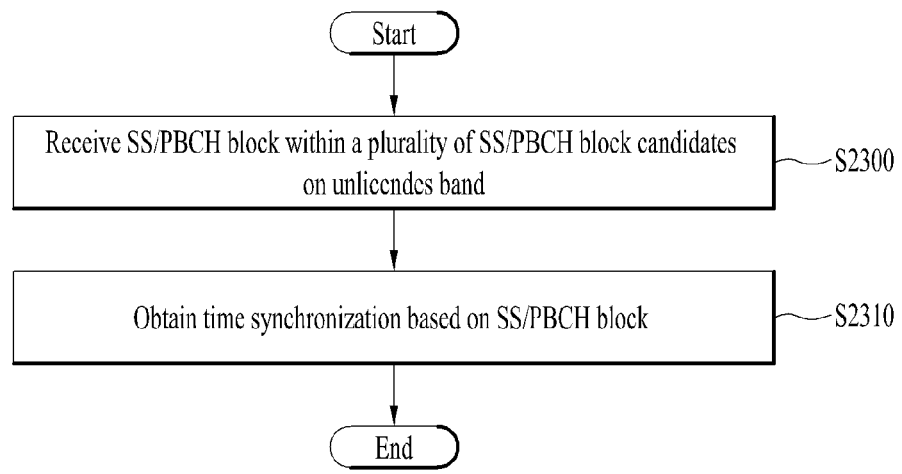
FIGS. 23 to 25 are flowcharts of a UE and a BS according to the proposed methods.

FIG. 23 is a flowchart illustrating operations of a UE according to the proposed methods.

Referring to FIG. 23, the UE may receive an SS/PBCH block on a plurality of SS/PBCH block candidates located and a second half period of 2.5 msec, respectively, and SS/PBCH block candidates defined within the 5 msec window may be located in both the first half 2.5 msec period and the second half 2.5 msec period. More specifically, in the first half, consecutive slots in which no SS/PBCH block candidates are defined may be located after consecutive slots in which SS/PBCH block candidates are defined. For example, when the SCS of the SS/PBCH block is set to 240 kHz and the time window is set to 5 msec, the first half may include 40 slots, and the consecutive slots in which SS/PBCH block candidates are defined may include: 1) 16 consecutive slots from slot #0 (or the first slot); and 2) 16 consecutive slots from slot #20 (or the 21st slot). In addition, the consecutive slots in which no SS/PBCH block candidates are defined may include four consecutive slots from slot #16 and four consecutive slots from slot #36. The positions of SS/PBCH block candidates defined in the first half may be similarly applied to the second half. Thus, according to the proposed methods, slots capable of transmitting SS/PBCH blocks may be extended by defining the positions of SS/PBCH block candidates not only in the first half of the time window but also in the second half, thereby compensating for CAP failure of the BS.

2) Transmitter (Entity B; For Example, BS)

[Method #1A] Method of Increasing SS/PBCH Block Transmission Opportunities

If SS/PBCH block transmission is allowed even in a slot in which the SS/PBCH block transmission is not allowed (see FIGS. 12(a) to 12(c)), SS/PBCH block transmission opportunities may increase. For example, for an SCS of 240 kHz, the following rule may be applied: transmission of an SS/PBCH block burst is allowed in 16 consecutive slots 1300, and the SS/PBCH block burst transmission is not allowed in next 4 consecutive slots 1301 as shown in FIG. 13(a). That is, transmission of additional SS/PBCH blocks may be allowed in slot indices #40 to #55 1302 and slot indices #60 to #75 1303. In this case, a method of transmitting SS/PBCH blocks at the slot level every 0.25 msec may be the same as in FIG. 11. In addition, SS/PBCH block (candidate) indices range from #0 to #127, and each SS/PBCH block (candidate) index may be linked to an SS/PBCH block at a single location.

As another example, for an SCS of 240 kHz, SS/PBCH block transmission may be allowed in all slots within a window of 5 msec without considering slot(s) in which transmission of an SS/PBCH block burst is not allowed, as shown in FIG. 13(b). In this case, a method of transmitting SS/PBCH blocks at the slot level every 0.25 msec may be the same as in FIG. 11. When the slot 1301 in which the SS/PBCH block transmission is not allowed is defined as shown in FIG. 13(a), the UE may be allowed to perform UL transmission such as a PRACH or a PUCCH in the slot 1301 in which the SS/PBCH block transmission is not allowed, thereby improving system performance. However, considering that for the U-band operation, a transmitting node needs to complete the CAP before actually performing transmission, it may be advantageous to allow SS/PBCH blocks to be transmitted in as many consecutive slots as possible. In this case, SS/PBCH block (candidate) indices range from #0 to #159, and each SS/PBCH block (candidate) index may be linked to an SS/PBCH block at a single location.

As another example, for the 120 kHz SCS, SS/PBCH block transmission may be allowed in all slots (within a window of 5 msec) without considering slot(s) in which transmission of an SS/PBCH block burst is not allowed as shown in FIG. 13(c). In this case, a method of transmitting SS/PBCH blocks at the slot level every 0.25 msec may be the same as in FIG. 11. Considering that for the U-band operation, a transmitting node needs to complete the CAP before actually performing transmission, it may be advantageous to allow SS/PBCH blocks to be transmitted in as many consecutive slots as possible as shown in FIG. 13(b). In this case, SS/PBCH block (candidate) indices range from 0 to 79, and each SS/PBCH block (candidate) index may be linked to an SS/PBCH block at a single location.

[Method #2A] Method of Obtaining Cell Timing Information by Applying [Method #1]

In the conventional 3GPP Rel-15 NR system, SS/PBCH block transmission may be allowed in a slot (or symbol) in which the SS/PBCH block transmission is not allowed as in [Method #1]. Hereinafter, there is provided a method by which the BS provides signaling of information on a cell timing (e.g., timing boundaries of a frame/subframe/slot/ symbol, etc.) related to a detected SS/PBCH block through signals and/or PBCH payloads in the SS/PBCH block when the UE attempts cell identification (e.g., cell identification for initial access, cell selection, RRM measurement, etc.) based on SS/PBCH block detection in a slot (or symbol) where transmission is newly allowed.

In 3GPP Rel-15 NR, up to 64 SS/PBCH blocks may be transmitted within a window of 5 msec as shown in FIGS. 12(a) to 12(c), and different combinations of {PBCH DMRS sequence index and PBCH payload information} may be defined for each of the 64 SS/PBCH block (candidate) indices. Specifically, 64 SS/PBCH blocks may be grouped in units of 8 consecutive SS/PBCH blocks in the time domain, 8 SS/PBCH blocks included in each group may be identified by 8 PBCH DMRS sequence indices, and 8 groups may be identified by three bits in the PBCH payload.

The UE may acquire cell timings related to additionally transmitted SS/PBCH blocks according to the following specific methods.

Option 1: Use of additional PBCH payload
Option 2: Use of additional PBCH DMRS sequences
Option 3: Use of information on phase shift of PBCH DMRS
Option 4: Use of information on location of RE to which PBCH DMRS is mapped
Option 5: Use of additional DL RS transmission Hereinafter, specific methods for applying each option to "CASE 1" defined in FIG. 13(a) will be described.

Option 1 (use of additional PBCH payload): 1-bit information in the PBCH payload may be used to distinguish the first 64 SS/PBCH block (candidate) indices and the latter 64 SS/PBCH block (candidate) indices in FIG. 13(a). For example, the 1-bit information may be a spare 1 bit of an MIB, or all or a part of a specific field (which is currently used) may be reinterpreted therefor.

Option 2 (use of additional PBCH DMRS sequences): To distinguish the first 64 SS/PBCH block (candidate) indices and the latter 64 SS/PBCH block (candidate) indices in FIG. 13(a), the number of PBCH DMRS sequences may increase to 16. That is, PBCH DMRS sequence indices #0 to #7 may be transmitted in the first half, and PBCH DMRS sequence indices #8 to #15 may be transmitted in the second half.

Option 3 (use of information on phase shift of PBCH DMRS): To distinguish the first 64 SS/PBCH block (candidate) indices and the latter 64 SS/PBCH block (candidate) indices in FIG. 13 (a), the phase offset between an SSS and a PBCH DMRS in the first half may be set different from the phase offset between an SSS and a PBCH DMRS in the second half. For example, transmission may be performed as follows: the phase offset between the SSS and PBCH DMRS in the first half is 0° (that is, the phases of the SSS and PBCH DMRS are set to be the same), and the phase offset between the SSS and PBCH DMRS in the second half is 180° (that is, the phases of the SSS and PBCH DMRS are set to be different from each other).

Option 4 (use of information on location of RE to which PBCH DMRS is mapped): To distinguish the first 64 SS/PBCH block (candidate) indices and the latter 64 SS/PBCH block (candidate) indices in FIG. 13(a), the RE position of a PBCH DMRS in the first half may be defined by the value of v-shift as in the prior art, and the RE position of a PBCH DMRS in the latter half may be defined by $v=(N_{ID}^{Cell}+a)$ mod 4, where the value of a may be predefined. For example, the value of a may be any integer (e.g., 2) except for a multiple of 4.

Option 5 (use of additional DL RS transmission): For example, to distinguish the first 64 SS/PBCH block (candidate) indices and the latter 64 SS/PBCH block (candidate) indices in FIG. 13(*a*), DL RS #1 may be transmitted in the first half, and DL RS #2 may be transmitted in the second half. It may be predefined that each of DL RS #1 and DL RS #2 has a resource location TDMed and/or FDMed with a linked SS/PBCH block, and different sequences may be defined for the two RSs.

[Method #3A] Method of Informing SS/PBCH Blocks in QCL Relationship

When the UE performs cell identification based on a plurality of SS/PBCH blocks which are received within the same S_window or different S_windows, a method of informing whether the corresponding SS/PBCH blocks are in the QCL relationship may be required. In this case, the BS may signal an interval at which the UE is capable of assuming the QCL relationship for SS/PBCH block (candidate) indices existing in the S_window, and the corresponding value (e.g., value indicating the interval between SS/PBCH blocks in the QCL relationship) may be defined as QCL_para. That is, when the SS/PBCH block (candidate) index detected in S_window #1 is N, and when the SS/PBCH block (candidate) index detected in S_window #2, which is next to S_window #1, is M, if (N mod QCL_para) and (M mod QCL_para) are the same, the UE may assume that the two SS/PBCH blocks are in the QCL relationship. As described above, a value obtained by performing the modulo operation of the SS/PBCH block candidate index and QCL_para may be defined as the SS/PBCH block index.

For the QCL_para value, candidate values are predefined for QCL_para, and a specific value to be actually applied by the UE among the candidate values may be signaled as the QCL_para value. In this case, the candidate values may have a divisor relationship with 64. For example, {64, 32, 16, 8} (or {64, 32}) may be predefined as candidate values, and a specific value among the candidate values may be configured by the BS as the QCL_para value.

When the BS configures the QCL_para value for the UE, the BS may transmit the QCL_para value according to at least one of the following methods. Accordingly, one or more SS/PBCH blocks having the same QCL relationship (e.g., up to 64/QCL_para SS/PBCH blocks) may be configured/transmitted in the S_window.

Option A (use of additional PBCH payload, cell-specific RRC signaling, or UE-dedicated RRC signaling): For example, candidate values for QCL_para may be predefined as {64, 32, 16, 8}, and a specific value among the candidate values may be signaled by two bits of a PBCH payload, cell-specific RRC signaling, or UE-dedicated RRC signaling.

Option B (use of additional PBCH DMRS sequences): For example, the number of PBCH DMRS sequences may increase to 16. For example, when the QCL_para value is 64, the BS may use PBCH DMRS sequences with indices #0 to #7. When the QCL para value is 32, the BS may use PBCH DMRS sequences with indices #8 to #15.

Option C (use of information on phase shift of PBCH DMRS): For example, when the QCL_para value is 64, the BS may set the phase offset between an SSS and a PBCH DMRS in the first half to 0°. When the QCL_para value is 32, the BS may set the phase offset between the SSS and PBCH DMRS to 180°.

Option D (use of information on location of RE to which PBCH DMRS is mapped): For example, when the QCL_para value is 64, the BS may map a PBCH DMRS to an RE of which the location is $v=N_{ID}^{Cell}$ mod 4. When the QCL_para value is 32, the BS may map the PBCH DMRS to an RE of which the location is $v=(N_{ID}^{Cell}+a)$ mod 4.

Option E (use of additional DL RS transmission): For example, when the QCL_para value is 64, the BS may additionally transmit DL RS #1 linked to an SS/PBCH block. When the QCL_para value is 32, the BS may additionally transmit DL RS #2 linked to with the SS/PBCH block.

[Method #4A] Method of Informing SS/PBCH Block that BS Actually Transmits when Number of SS/PBCH Blocks Capable of Being Transmitted is Less than 64

Hereinafter, is proposed a method of informing an SS/PBCH block index actually transmitted by the BS (e.g., the SS/PBCH block candidate index of an SS/PBCH block actually transmitted by the BS) when the number of SS/PBCH blocks capable of being transmitted is less than 64 (=K) as in [Method #3].

Specifically, when it is possible to inform the presence/absence of each group (each group is linked with 8 SS/PBCH block (candidate) indices) through an 8-bit bitmap, the UE may ignore information bits after a K/8-th bit of the 8-bit bitmap or expect that the information bits after the K/8-th bit are signaled as 0. Alternatively, when it is possible to inform the presence/absence of each SS/PBCH block index through a 64-bit bitmap, the UE may ignore information bits after a K-th bit of the 64-bit bitmap or expect to that the information bits after the K-th bit are signaled as 0.

When up to 64 SS/PBCH blocks are capable of being transmitted, which of the 64 SS/PBCH blocks is actually transmitted may be signaled based on a combination (16 bits in total) of an RRC parameter groupPresence (8-bit bitmap) and an RRC parameter inOneGroup (8-bit bitmap) on a ServingCellConfigCommonSIB IE (see FIG. 8). In this case, each bit in groupPresence may represent 8 consecutive SS/PBCH block indices. Specifically, the first bit of groupPresence may represent SS/PBCH block candidate indices #0 to #7, and the second bit of groupPresence may represent SS/PBCH block indices #8 to #15. In addition, an n-th bit of inOneGroup may represent an n-th SS/PBCH block index in each group. Specifically, the first bit of inOneGroup may represent index #0/8/16/24/32/40/48/56, which is the first SS/PBCH block index in each group. For example, if it is signaled that groupPresence is '11000000' and inOneGroup is '00110000', it may mean that among a total of 64 SS/PBCH block indices, SS/PBCH blocks with index #2/3/10/11 are actually transmitted.

However, if the number of SS/PBCH blocks capable of being transmitted is less than 64 (=K) (e.g., QCL_para) as in [Method #3], some information bits of groupPresence may become invalid. For example, if K is 32 (e.g., QCL_para=32), the number of SS/PBCH block indices included in each group may be maintained as 8. In this case, only four LSBs (first four bits or leftmost four bits) of groupPresence or four MSBs thereof may be valid. In addition, the remaining four bits may be invalid, or '0' may be signaled for the remaining four bits. Alternatively, the UE may ignore the remaining four bits or expect that the remaining four bits are signaled as '0'. This may be generalized as follows: for K less than 64, the number of SS/PBCH block indices included in each group may be maintained as 8, only (8/64*K) LSBs of groupPresence may be valid, and the remaining (8-8/64*K) bits may not be valid. Alternatively, the UE may ignore the remaining (8-8/64*K) bits or expect that the remaining (8-8/64*K) bits are signaled as '0'.

Alternatively, if K is less than 64, the number of SS/PBCH block indices included in each group may be set different from that when K is 64, and GroupPresence and/or inOneGroup may be interpreted based on the number of SS/PBCH block indices, which is differently configured. For example, if K is 32, the number of SS/PBCH block indices included in each group may be set to 2, and the presence or absence of each group may be signaled through a 16-bit bitmap obtained by combining groupPresence and inOneGroup. In this case, as a grouping method, two consecutive SS/PBCH block indices may be paired (e.g., SS/PBCH block indices #0 and #1 may be set as the first group), or SS/PBCH block indices with an interval of 16 may be paired (SS/PBCH block indices #0 and #16 may be set as the first group, and SS/PBCH block indices #1 and #17 may be set as the second group). In this case, the SS/PBCH block indices at the interval of 16 may mean that SS/PBCH block indices are spaced apart from each other at an interval of 16 SS/PBCH blocks. As another example, if K is 16, the number of SS/PBCH block indices included in each group may be set to 1, and the presence or absence of each SS/PBCH block index may be signaled through a 16-bit bitmap obtained by combining groupPresence and inOneGroup. As another example, if K is 8 (e.g., QCL_para=8), the presence or absence of each SS/PBCH block index may be signaled through the 8-bit bitmap of inOneGroup. In this case, groupPresence may not be signaled. Alternatively, the UE may ignore signaled groupPresence or expect groupPresence is signaled as a specific value (e.g., all '0' values).

Meanwhile, for UE-dedicated RRC signaling, if a maximum of 64 SS/PBCH blocks is capable of being transmitted (K=64), a 64-bit full bitmap may be transmitted without considering signaling overhead. However, when the number of SS/PBCH blocks capable of being transmitted is less than 64 (=K), the size (or bit width) of the corresponding bitmap may be set to K bits. Alternatively, only K LSBs (i.e. first K bits or leftmost K bits) or K MSBs of the corresponding bitmap may be valid, and the remaining (64-K) bits may not be valid. Alternatively, the UE may ignore the remaining (64-K) bits of the corresponding bitmap or expect that the remaining (64-K) bits of the corresponding bitmap are signaled as '0'.

[Method #5A] Method of Informing Whether [Method #1/1A] to [Method #4/4A] Proposed Above are Applied Even if the BS provides services in FR3, whether the proposed methods including [Method #1/1A], [Method #2/2A], [Method #3/3A], and/or [Method #4/4A] are applied may be determined depending on the BS or depending on whether the BS serves in a U-band (for example, whether SS/PBCH blocks are transmitted in the U-band). In this case, to inform whether the proposed methods are applied or not, a synchronization raster in which SS/PBCH blocks are capable of being transmitted may be defined differently. Specifically, the BS may inform the UE whether [Method #1/1A] to [Method #4/4A] described above are applied to SS/PBCH blocks based on the synchronization raster in which SS/PBCH blocks are capable of being transmitted.

For example, synchronization raster set #1 (e.g., a set related to licensed bands) and a synchronization raster set #2 (e.g., a set related to U-bands) may be defined in FR3. In this case, different frequency offsets and/or different intervals may be configured for synchronization raster set #1 and synchronization raster set #2. The BS may transmit an SS/PBCH block based on a synchronization raster belonging to synchronization raster set #1 in order to inform the UE that the SS/PBCH block is the same SS/PBCH block as FR2. If the UE detects the SS/PBCH block based on the synchronization raster belonging to synchronization raster set #1, the UE may recognize that the SS/PBCH block is the same SS/PBCH block as FR2 (see FIGS. 12(a) to 12(c)). In this case, the same SS/PBCH block as FR2 may mean an SS/PBCH block defined in FR2. For example, the same SS/PBCH block as FR2 may mean an SS/PBCH block transmitted as shown in FIGS. 12(a) to 12(c). On the other hand, the BS may transmit an SS/PBCH block based on a synchronization raster belonging to synchronization raster set #2 to inform the UE that the SS/PBCH block is an SS/PBCH block to which [Method #1/1A] to [Method #4/4A] are applied. If the UE detects the SS/PBCH block based on the synchronization raster included in synchronization raster set #2, the UE may recognize that the SS/PBCH block is an enhanced SS/PBCH block in FR3 (which is different from that in FR2) as in the proposed methods including [Method #1/1A], [Method #2/2A], [Method #3/3A], and/or [Method #4/4A]. In this case, the enhanced SS/PBCH block in FR3 may mean an SS/PBCH block to which at least one of [Method #1/1A] to [Method #4/4A] is applied. For example, the enhanced SS/PBCH block in FR3 may mean an SS/PBCH block transmitted as shown in FIGS. 13(a) to 13(c).

[Method #5A-1] Method of Configuring Different Synchronization Raster Depending on SCS If SS/PBCH blocks with a plurality of SCSs are capable of being in FR3, a different synchronization raster may be defined depending on the SCS in consideration of the complexity of a cell detection/identification process that the UE needs to perform in the corresponding frequency band. In addition, considering that the maximum frequency bandwidth varies depending on the SCS, the number of synchronization rasters may be defined differently depending on the SCS within a specific frequency band. For example, the number of synchronization rasters in which an SS/PBCH block with an SCS of 960 kHz is capable of being located within the channel bandwidth of WiGig (e.g., 2.16 GHz) may be 1, and the number synchronization rasters in which an SS/PBCH block with an SCS of 120 kHz is capable of being located therein may be 5. A total of 6 rasters may be located at different positions. For example, referring to FIG. 16, the SS/PBCH block with the 120 kHz SCS may be located in synchronization rasters {A, C, D, E, F}, and the SS/PBCH block with the 960 kHz SCS may be located in synchronization raster B. Each of the 6 synchronization raster {A, B, C, D, E, F} may have a different location. When the BS intends to transmit an SS/PBCH block in one of synchronization rasters {A, C, D, E, F}, the BS may transmit only the SS/PBCH block with the 120 kHz SCS. When the BS intends to transmit an SS/PBCH block in synchronization raster B, the BS may transmit only the SS/PBCH block with the 960 kHz SCS.

[Method #6A] Symbol Position of SS/PBCH Block with SCS of 480 and/or 960 kHz

As described above, an SS/PBCH block with an SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). Hereinafter, the (OFDM) symbol position of the SS/PBCH block with the 480 and/or 960 kHz SCS is proposed. That is, the BS may transmit the SS/PBCH block with the 480 and/or 960 kHz SCS at the proposed (OFDM) symbol position.

Hereinafter, a design based on the following three approaches is proposed regarding the symbol position of the SS/PBCH block with the 480 and/or 960 kHz SCS.

Approach 1: The symbol position of an SS/PBCH block with the 480/960 kHz SCS may be determined such that it is aligned with the predefined symbol position of an SS/PBCH block with the 120/240 kHz SCS. According to Approach 1, even if the SS/PBCH block is transmitted with the 480 or 960 kHz SCS and the SCS of a DL/UL control/data channel/signal transmitted/received on a carrier/BWP including the corresponding SS/PBCH block is 120 or 240 kHz, it has the advantage of easy multiplexing. For example, as shown in FIGS. 17(a) and 17(b), an SS/PBCH block may be configured with the 480/960 kHz SCS. FIG. 17(a) shows an SS/PBCH block configuration (or SS/PBCH block pattern) depending on each SCS within a p-th 1/16 msec time window, and FIG. 17(b) illustrates an SS/PBCH block pattern depending on each SCS within a (p+1)-th 1/16 msec time window next to that of FIG. 17(a). Specifically, referring to FIG. 11 and FIG. 17 (a), for an SS/PBCH block with the 240 kHz SCS 1700, SS/PBCH block (candidate) index 'n' may be defined/transmitted in symbol #8/9/10/11 of the first slot, and a part of SS/PBCH block (candidate) index 'n+1' may be defined/transmitted in symbol #12/13 of the first slot. In addition, referring to FIG. 17(a), for an SS/PBCH block with the 480 kHz SCS 1701, SS/PBCH block (candidate) index 'i' may be defined/transmitted in symbol #2/3/4/5 of the second slot, SS/PBCH block (candidate) index 'i+1' may be defined/transmitted in symbol #6/7/8/9 of the second slot, and SS/PBCH block (candidate) index 'i+2' may be defined/transmitted in symbol #10/11/12/13 of the second slot within the same 1/16 msec time window according to the symbol position of the SS/PBCH block with the 240 kHz SCS. In addition, for an SS/PBCH block with the 960 kHz SCS 1702, SS/PBCH block (candidate) index 'm' may be defined/transmitted in symbol #4/5/6/7 of the third slot, SS/PBCH block (candidate) index 'm+1' may be defined/transmitted in symbol #8/9/10/11 of the third slot, SS/PBCH block (candidate) index 'm+2' may be defined/transmitted in symbol #12/13 of the third slot and symbol #0/1 of the fourth slot, SS/PBCH block (candidate) index 'm+3' may be defined/transmitted in symbol #2/3/4/5 of the fourth slot, SS/PBCH block (candidate) index 'm+4' may be defined/transmitted in symbol #6/7/8/9 of the fourth slot, and SS/PBCH block (candidate) index 'm+5' may be defined/transmitted in symbol #10/11/12/13 of the fourth slot within the same 1/16 msec time window according to the symbol position of the SS/PBCH block with the 240 kHz SCS.

Approach 2: One of predefined SS/PBCH block patterns may be applied to the 480 and/or 960 kHz SCS. In Approach 2, it may be assumed that an SS/PBCH block, CORESET #0, and an initial active DL/UL BWP at least have the same SCS. In this case, since a plurality of DL signals/channels have the same SCS, Approach 2 has the advantage of easily implementing a UE that simultaneously receives the plurality of DL signals/channels.

Approach 2-1: For the 480 kHz SCS, one of predefined SS/PBCH block patterns may be applied as shown in FIG. 18(a). For the 960 kHz SCS, it may be determined that only one SS/PBCH block with the 960 kHz SCS is located within the transmission period of the SS/PBCH block with the 480 kHz SCS in consideration of a scalable design. For example, for the 480 kHz SCS, an existing SS/PBCH block pattern such as Case A or Case C may be applied. Referring to FIG. 18(b), an SS/PBCH block may be located in four specific consecutive symbols (e.g., symbols #4/5/6/7) 1820 among symbols #4/5/6/7/8/9/10/11 1810 in a slot of the 960 kHz SCS, which correspond to symbols #2/3/4/5 1800 in a slot of the 480 kHz SCS. Similarly, referring to FIG. 18(b), an SS/PBCH block may be located in four specific consecutive symbols (e.g., symbols #2/3/4/5) 1821 among symbols #2/3/4/5/6/7/8/9 1811 in a slot of the 960 kHz SCS, which correspond to symbols #8/9/10/11 1801 in a slot of the 480 kHz SCS.

Approach 3: To define an SS/PBCH block pattern for the 120/240 kHz SCS, a method of configuring an SCS of 60 kHz as a reference SCS in consideration of coexistence between different SCSs and defining an SS/PBCH block pattern for the 120/240 kHz SCS based on the reference SCS may be similarly applied. For example, for the 480/960 kHz SCS, the symbol position of a 480/960 kHz SS/PBCH block may be determined based on a separate reference SCS rather than the 60 kHz SCS. According to Approach 3, an SS/PBCH block may not coexist with a DL/UL control/data channel/signal that is based on an SCS smaller than (or equal to) the reference SCS and transmitted/received on a carrier/BWP including the SS/PBCH block. Approach 3 has the advantage of reusing an existing SS/PBCH block pattern.

[Method #7A] Slot in which SS/PBCH Block with 480 and/or 960 kHz SCS is Transmitted An SS/PBCH block with an SCS of 480 and/or 960 kHz may be introduced in consideration of coexistence with the WiGig system with a bandwidth of 2 GHz (approximately, 2.16 GHz) and a 4096 FFT size (assumed in the Rel-15 NR system). Hereinafter, the slot position of the SS/PBCH block with the 480 and/or 960 kHz SCS is proposed. The BS may transmit the SS/PBCH block with the 480 kHz and/or 960 kHz SCS at the proposed slot position.

For the SS/PBCH block with the 480 kHz SCS, if the location of the SS/PBCH block in each slot (or slot group) based on the three approaches proposed in [Method #6] is applied to adjacent slots (or slot groups), a maximum of 64 SS/PBCH blocks may be transmitted for 1 msec (e.g., in 32 slots) as shown in FIG. 20(a).

For the SS/PBCH block with the 480 kHz SCS, if the location of the SS/PBCH block in each slot (or slot group) based on the three approaches proposed in [Method #6] is applied to adjacent slots (or slot groups), a maximum of 64 SS/PBCH blocks may be transmitted for 1 msec (e.g., in 32 slots) as shown in FIG. 20(a). That is, referring to FIG. 20(a), 64 SS/PBCH block candidates (or SSB candidates) may exist within 1 msec, and the SS/PBCH block candidates may be indexed from #0 to #63 in order of time (SS/PBCH block candidate indexing).

In this case, a slot in which the SS/PBCH block is transmitted may be extended by applying [Method #1] as shown in FIG. 20(b) or FIG. 20(c) (hereinafter, for convenience, such a slot is referred to as a slot for the SS/PBCH block). For example, as shown in FIG. the slot position of an additional SS/PBCH block may be determined by equally applying slot gaps considered for SS/PBCH blocks with the 120/240 kHz SCS. Alternatively, the slot position of an additional SS/PBCH block may be determined without any slot gaps as shown in FIG. 20(c) in consideration of a structure capable of perform transmission without an additional CAP in U-bands.

In addition, the BS may define 64 or more SS/PBCH block candidate indices and transmit (or signal) the 64 or more SS/PBCH block candidate indices to the UE by applying [Method #2A]. The BS may define and signal the QCL relationship between the SS/PBCH block candidate indices by applying [Method #3A]. The BS may transmit information on actually transmitted SS/PBCH blocks to the UE by applying [Method #4A].

For the SS/PBCH block with the 960 kHz SCS, if the location of the SS/PBCH block in each slot (or slot group) based on the three approaches proposed in [Method #6A] is applied to adjacent slots (or slot groups), a maximum of 64 SS/PBCH blocks may be transmitted for 0.5 msec (e.g., in 32 slots) 2100 as shown in FIG. 21(a). Alternatively, according to Approach 2-1 proposed in [Method #6A], since one SS/PBCH block is transmitted in one slot, a maximum of 64 SS/PBCH blocks may be transmitted for 1 msec (e.g., in 64 slots).

In this case, a slot in which the SS/PBCH block is transmitted may be extended by applying [Method CA] as shown in FIG. 21(b) or FIG. 21(c). For example, as shown in FIG. 21(b), the slot position of an additional SS/PBCH block may be determined by equally applying slot gaps considered for SS/PBCH blocks with the 120/240 kHz SCS. Alternatively, the slot position of an additional SS/PBCH block may be determined without any slot gaps as shown in FIG. 21(c) in consideration of a structure capable of transmitting without an additional CAP in U-bands.

The slot position of the block may be determined.

In addition, the BS may define 64 or more SS/PBCH block candidate indices and transmit the 64 or more SS/PBCH block candidate indices to the UE by applying [Method #2A]. The BS may define the QCL relationship between the SS/PBCH block candidate indices and transmit the QCL relationship to the UE by applying [Method #3A]. In addition, the BS may transmit information on actually transmitted SS/PBCH blocks to the UE by applying [Method #4A].

In the above proposed methods, SS/PBCH blocks with different SS/PBCH block (candidate) indices may have the QCL relationship. In particular, it may be preconfigured/predefined that SS/PBCH blocks with N consecutive SS/PBCH block (candidate) indices (with no symbol gap) are in the QCL relationship. For example, for the 960 kHz SCS SS/PBCH block in FIG. 19, if N is 4, it may be defined or configured that SS/PBCH blocks with four consecutive SS/PBCH block candidate indices from symbol #8 of the first slot are in the QCL relationship. Alternatively, if N is 2, it may be defined or configured that SS/PBCH blocks with the first or last two indices among four consecutive SS/PBCH block candidate indices from symbol #8 of the first slot are in the QCL relationship. In this case, consecutive SS/PBCH blocks in the QCL relationship may be configured by cell-common RRC signaling such as an MIB, an SIB, etc.

For the 960 kHz SCS (or higher), considering a BST, which is about 100 ns, the BST may be greater than the CP length. Therefore, for the 960 kHz SCS (or when the CP length is shorter than the BST for an SCS of 960 kHz or higher), it may be configured/defined that SS/PBCH blocks with N consecutive SS/PBCH block (candidate) indices without a symbol gap are in the QCL relationship. Similarly, even for the SS/PBCH block with the 480 kHz SCS, it may be configured/defined that SS/PBCH blocks with N consecutive SS/PBCH block (candidate) indices (without a symbol gap) are in the QCL relationship.

For the 960 kHz SCS (or when the CP length is shorter than the BST for an SCS of 960 kHz or higher), at least one symbol gap may be expected between SS/PBCH block (candidate) indices in different QCL relationships. For example, if SS/PBCH block (candidate) index 'm+1', SS/PBCH block (candidate) index 'm+2', and SS/PBCH block (candidate) index 'm+3' are capable of being transmitted in symbol #8/9/10/11 of the first slot, symbol #12/13 of the first slot and symbol #0/1 of the second slot, and symbol #2/3/4/5 of the second slot, respectively, SS/PBCH block (candidate) index 'm+1' and SS/PBCH block (candidate) index 'm+3' may not be in the QCL relationship. If N is 1, transmission of an SS/PBCH block corresponding to SS/PBCH block (candidate) index 'm+2' may be dropped. On the other hand, for the 480 kHz SCS (or when the CP length is longer than the BST for an SCS of 480 kHz or lower), the BS may transmit the SS/PBCH block corresponding to SS/PBCH block (candidate) index 'm+2' in the same situation.

[Method #8A] Method of Signaling LBT Scheme Performed by BS

The BS may transmit (or signal) to the UE an LBT scheme performed by the BS for DL signal/channel transmission (during a specific period). As described above, the LBT may be interchanged with the CAP. When the LBT scheme signaled to the UE is a scheme in which transmission is allowed without determination of whether the channel is idle or busy, if the BS transmits SS/PBCH blocks (during the corresponding period), the BS may transmit SS/PBCH blocks in the QCL relationship only once within the S_window.

For example, for an SCS of 240 kHz, if SS/PBCH block (candidate) indices #0 to #127 are defined within a window of 5 msec as shown in FIG. 13(a) and if the value of QCL_para is 64, SS/PBCH block (candidate) index #N (e.g., N<64) and SS/PBCH block (candidate) index #(N+64) may have the QCL relationship within the 5 msec window. By providing an opportunity for transmitting SS/PBCH blocks with the same beam twice within the 5 msec window, it is possible to compensate for the LBT failure of the BS.

The BS (operating in a specific U-band of FR3) may be allowed to perform transmission without determining whether the channel is idle or busy in a specific situation (for example, in the following cases: when the interference level is low, when the frequency of collisions is determined to be low because the probability of success of DL transmission is high, when the transmission frequency is low, and when the transmission power is low). For convenience, an LBT scheme that allows transmission without determining whether the channel is idle/busy is named LBT scheme A, and an LBT scheme that allows transmission only when the channel is determined to be idle is named LBT scheme B. In this case, the BS may indicate to the UE whether the LBT scheme performed by the BS is LBT scheme A or LBT scheme B through higher layer signaling or (UE-specific or group-common) DCI. For example, the higher layer signaling may include cell-specific RRC signaling, UE-specific RRC signaling, or a MAC CE. Alternatively, as in [Method #5A], the BS may inform the UE whether the LBT scheme performed by the BS is LBT scheme A or LBT scheme B based on a synchronization raster in which an SS/PBCH block is capable of being transmitted. For example, by transmitting an SS/PBCH block based on a synchronization raster belonging to synchronization raster set #1, the BS may inform the UE that the LBT scheme performed by the BS is LBT scheme A. On the other hand, by transmitting an SS/PBCH block based on a synchronization raster belonging to synchronization raster set #2, the BS may inform the UE that the LBT scheme performed by the BS is LBT scheme B. In the following, indication of a specific LBT scheme may mean that the specific LBT scheme is explicitly configured/indicated by higher layer signaling or that the UE implicitly knows the specific LBT scheme based on the synchronization raster.

For example, if LBT scheme B is indicated, a plurality of transmission opportunities may be given to SS/PBCH blocks in the QCL relationship within the S_window as in FIG. 13(a) and the proposed methods. The BS may transmit some of the SS/PBCH blocks in the QCL relationship depending on the LBT success/failure. Accordingly, when the UE performs measurement such as RLM/RRM on SS/PBCH blocks (in the S_window), the UE may perform the measurement in the entire period of the S_window. For example, to perform RLM for a specific SS/PBCH block (candidate) index, the UE may use all SS/PBCH block (candidate) indices having the QCL relationship with the specific SS/PBCH block (candidate) index. In this case, the specific SS/PBCH block (candidate) may include an SS/PBCH block from which an MIB is obtained. In addition, the RLM may include estimation of PL of a PUSCH/SRS based on the SS/PBCH block. In this case, the UE may calculate the PL based on RS resources obtained from SS/PBCH (candidate) block(s) having the same SS/PBCH block index as that used for obtaining the MIB.

On the other hand, if LBT scheme A is indicated, the BS may transmit only a specific number (QCL_para) of SS/PBCH blocks to the UE (within the S_window). For example, in FIG. 13(a), if QCL_para is 64, the BS may transmit only SS/PBCH blocks corresponding to SS/PBCH block (candidate) indices #0 to #63. Since the BS uses LBT scheme A, the BS may always transmit a DL signal such as an SS/PBCH block regardless of whether the channel is idle. For this reason, when the UE performs measurement such as RLM/RRM on SS/PBCH blocks (in the S_window), the UE may perform the measurement only in a specific (compressed) period within the S_window and may not perform the measurement in the remaining period, thereby reducing the power consumption. For example, the UE may calculate PL based on only RS resources obtained from an SS/PBCH block used to obtain an MIB.

If LBT scheme A is indicated, LBT scheme A may be valid for a specific period, and the specific period may be predefined or preconfigured. For example, the corresponding specific period may be defined or configured as a period (e.g., 1 sec) in which SIB information is capable of varying. In addition, the BS may indicate the LBT scheme through higher layer signaling (e.g., RRC signaling such as a MeasObjectNR IE) not only for a serving cell but also for a neighbor cell. For example, if the BS indicates LBT scheme A for a neighbor cell, the UE may perform RRM measurement for the neighbor cell only in QCL_para SS/PBCH blocks within the S_window (e.g., starting from the start of the S_window) and may not perform RRM measurement in other periods.

In addition, a method for the UE to monitor a Type0-PDCCH CSS set may vary according to the indicated LBT scheme. When the BS indicates LBT scheme B, the BS may transmit to the UE some of Type0-PDCCH CSS sets corresponding to all SS/PBCH block (candidate) indices in the QCL relationship with a specific SS/PBCH block (candidate) index (within the S_window). On the other hand, when the BS indicates LBT scheme A, the BS may transmit to the UE only a Type0-PDCCH CSS set corresponding to one of a plurality of SS/PBCH block (candidate) indices in the QCL relationship with the specific SS/PBCH block (candidate) index (within the S_window) (for example, the one SS/PBCH block (candidate) index may be the first SS/PBCH block (candidate) index in the QCL relationship with the specific SS/PBCH block (candidate) index within the S_window). The first SS/PBCH block (candidate) index in the QCL relationship with the specific SS/PBCH block (candidate) index in the S_window may mean first QCL_para SS/PBCH blocks in the S_window.

In addition, a PDSCH mapping method may vary according to the LBT scheme indicated by the BS. When the BS indicates LBT scheme B, the BS may map no PDSCH to resources (e.g., RBs) for all SS/PBCH block (candidate) indices in the QCL relationship with a specific SS/PBCH block (candidate) index (in the S_window). For example, although a codeword carried on a PDSCH is generated in consideration of the amount of all resources (e.g., RBs) allocated for PDSCH transmission, if resources (e.g., RBs) allocated for the PDSCH transmission overlap with resources (e.g., RBs) for an SS/PBCH block (candidate) in the QCL relationship with the specific SS/PBCH block (candidate), the BS may map no PDSCH to the overlapping resources. In this case, the specific SS/PBCH block (candidate) index may include an SS/PBCH block (candidate) index, which is actually transmitted and such a notification is provided by the BS to the UE (see FIG. 9).

On the other hand, when the BS indicates LBT scheme A, the BS may map a PDSCH to resources (e.g., RBs) for one of a plurality of SS/PBCH block (candidate) indices in the QCL relationship with the specific SS/PBCH block (candidate) index (in the S_window) (for example, the one SS/PBCH block (candidate) index may be the first SS/PBCH block (candidate) index in the QCL relationship with the specific SS/PBCH block (candidate) index within the S_window). In addition, the BS may a PDSCH to resources (e.g., RBs) for the remaining SS/PBCH block (candidate) indices in the QCL relationship. Accordingly, when PDSCH resources (e.g., RBs) overlap with the resources (e.g., RBs) for the remaining SS/PBCH block (candidate) indices in the QCL relationship, the BS may map the PDSCH to all resources (e.g., RBs) allocated for the PDSCH.

In addition, a PDSCH TDRA method may vary according to the indicated LBT scheme. Before configuring a specific TDRA table to the UE, the BS may schedule a PDSCH based on a default TDRA table and transmit the scheduled PDSCH to the UE. In this case, the default TDRA table may be defined differently depending on whether shared spectrum access operation is performed. For example, when the BS indicates LBT scheme B, the BS may schedule the PDSCH based on the default TDRA table defined for the shared spectrum access operation before configuring the specific TDRA table to the UE. On the other hand, when the BS indicates LBT scheme A, the BS may schedule the PDSCH based on a default TDRA table defined for other operations rather than shared spectrum access before configuring the specific TDRA table to the UE. Each TDRA table may include a plurality of columns, and each column may include at least one of the following: (1) a DMRS symbol index in a slot, (2) a PDSCH mapping type, (3) a PDCCH-to-PDSCH slot offset, (4) a PDSCH starting symbol in a slot, and (5) the number of PDSCH symbols.

[Method #9A] SS/PBCH Blocks with Multiple Numerologies in One Cell

The BS may configure SS/PBCH blocks having different numerologies in one cell (for each BWP). For example, the BS may configure reception of an SS/PBCH block with an SCS of 120 kHz in initial BWP #0 and configure reception of an SS/PBCH block with an SCS of 480 kHz (or 960 kHz) in BWP #1. When the UE switches to BWP #0 while performing RRM measurement based on the SS/PBCH block with the 480 kHz SCS (or 960 kHz SCS) configured in BWP #1, the BS may establish the QCL relationship between SS/PBCH block indices with the 120 kHz SCS and SS/PBCH block indices with the 480 kHz SCS (or 960 kHz SCS) so that the UE is allowed to continue to perform the RRM measurement. That is, the BS may configure that SS/PBCH block (candidate) index n with the 120 kHz SCS and SS/PBCH block (candidate) index m with the 480 kHz SCS (or 960 kHz SCS) are in the QCL relationship. Alternatively, the BS may regulate that the QCL relationship is capable of being assumed for the same SS/PBCH block (candidate) index.

Considering the implementation complexity when the UE assumes a plurality of SCSs in initial access, the number of SCSs to be applied to SS/PBCH blocks in the initial access may be minimized. For example, the BS may impose restrictions such that only the 120 kHz SCS is applied to SS/PBCH blocks in the initial access. On the other hand, after the initial access, the BS may configure the 480 or 960 kHz SCS for a dedicated BWP other than the initial BWP (depending on whether UE supports the dedicated BWP). If the UE needs to receive the SS/PBCH block with the 120 kHz SCS for RRM measurement in the dedicated BWP other than the initial BWP, there is a disadvantage that the UE needs to frequently change the numerology to perform the RRM measurement. Considering this disadvantage, the BS may define the SS/PBCH block with the 480 and/or 960 kHz SCS for other purposes other than the initial access (e.g., RRM measurement, RLM, candidate beam detection, beam failure detection, beam management, etc.). In this case, the BS may configure an SS/PBCH block having a different SCS for each BWP in the same cell. For example, the BS may configure reception of the SS/PBCH block based on the 120 kHz SCS for BWP #0, and configure reception of the SS/PBCH block based on the 480 kHz SCS (or 960 kHz SCS) for BWP #1, which is the same as the numerology configured for BWP #1.

The UE may perform the RRM measurement, RLM, candidate beam detection, beam failure detection, beam management, etc. based on SS/PBCH block reception. During BWP switching, the UE needs to continuously perform the RRM measurement, RLM, candidate beam detection, beam failure detection, beam management, etc., which are performed based on a specific SS/PBCH block (candidate) index, in order to maintain the performance. To support this operation, it may be necessary to establish the QCL relationship between SS/PBCH block (candidate) indices based on different numerologies, which are configured in the same cell. Based on a predefined rule, the BS may configure that SS/PBCH block (candidate) index n with the 120 kHz SCS and SS/PBCH block (candidate) index n with the 480 kHz SCS (or 960 kHz SCS) are in the QCL relationship and different indices are not in the QCL relationship. Alternatively, the BS may configure the QCL relationship between the SS/PBCH block (candidate) index n with 120 kHz SCS and SS/PBCH block (candidate) index m with the 480 kHz SCS (or 960 kHz SCS) and transmit the QCL relationship configuration to the UE through RRC signaling.

In addition, the UE may assume that the value of ssb-PositionsInBurst (see Table 8) obtained from RRC signaling such as SIB1 in the initial access is equally applied the SS/PBCH block (candidate) index with the 120 kHz SCS and the SS/PBCH block (candidate) index with 480 kHz SCS (or 960 kHz SCS).

For example, when only SS/PBCH blocks corresponding to indices #0 to #31 among 64 SS/PBCH block (candidate) indices are actually transmitted and SS/PBCH blocks corresponding to indices #32 to #63 are not transmitted, the BS may equally apply the above configuration to SS/PBCH blocks with the 120 kHz SCS configured in the (initial) BWP and SS/PBCH blocks with the 480 kHz SCS (or 960 kHz SCS) configured in the (dedicated) BWP. Alternatively, the BS may separately configure the parameter ssb-PositionsInBurst indicating which SS/PBCH block (candidate) index is transmitted among the 64 SS/PBCH block (candidate) indices depending on the BWP (or the SCS of the SS/PBCH block).

In the proposed methods, RRM measurement may be extended to RLM, candidate beam detection, beam failure detection, and beam management, and the same methods may be applied to measurement of adjacent cells as well as the serving cell (Pcell, PSCell, and/or Scell).

Alternatively, when only the 120 kHz SCS is applied to SS/PBCH blocks in the initial access in consideration of signaling complexity, it may be regulated that SS/PBCH blocks based on the 480 or 960 kHz SCS are applied only to the SCell (except for the PCell or PSCell).

Figure 24:
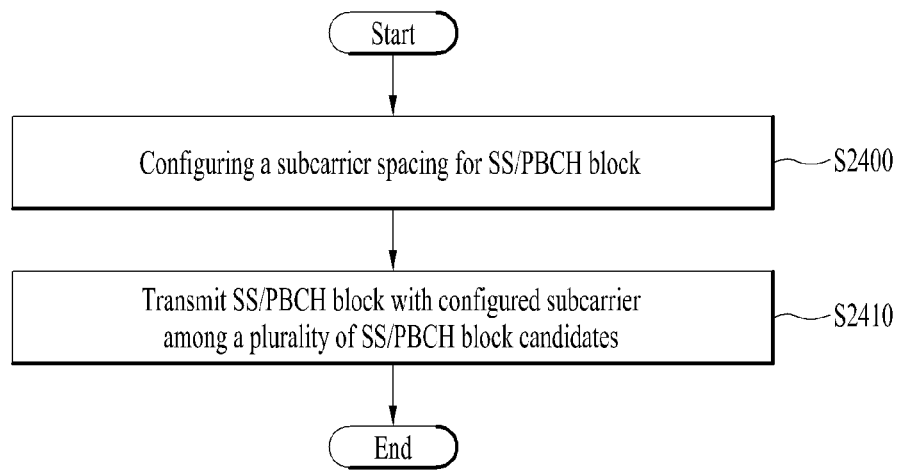

FIG. 24 is a flowchart illustrating operations of a BS according to the proposed methods.

Referring to FIG. 24, the BS may configure the SCS of an SS/PBCH block (S2400). In this case, the SCS of the SS/PBCH block may be explicitly provided to the UE through higher layer signaling (e.g., RRC signaling) or implicitly provided to the UE depending on embodiments. The BS may transmit the SS/PBCH block among a plurality of SS/PBCH block candidates to the UE based on the configured SCS (S2410). In this case, the positions of the plurality of SS/PBCH block candidates may be defined differently according to the SCS of the SS/PBCH block. For example, when the SCS of the SS/PBCH block is set to 240 kHz, the plurality of SS/PBCH block candidates may be determined according to 'CASE 1' of [Method #1] described above. Specifically, the plurality of SS/PBCH block candidates may be defined within a time window configured to transmit the SS/PBCH block. Based on the SCS of the SS/PBCH block is set to 240 kHz, the plurality of SS/PBCH block candidates may be located in both the first half and the second half of the time window. Accordingly, the transmission opportunity of the SS/PBCH block may increase within the time window, and the SS/PBCH block may be effectively transmitted in consideration of CAP failure of the BS.

3) Receiver & Transmitter (Between Receiver and Transmitter)

Figure 25:
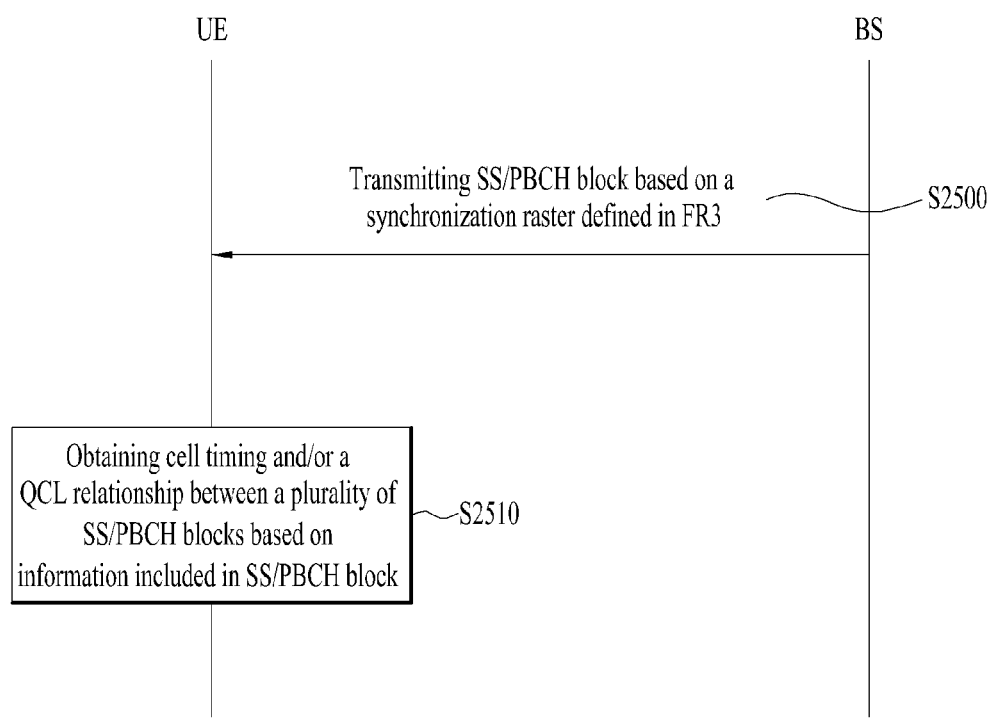

FIG. 25 is a flowchart illustrating operations of a UE and a BS according to the present disclosure. Referring to FIG.

Figure 15:
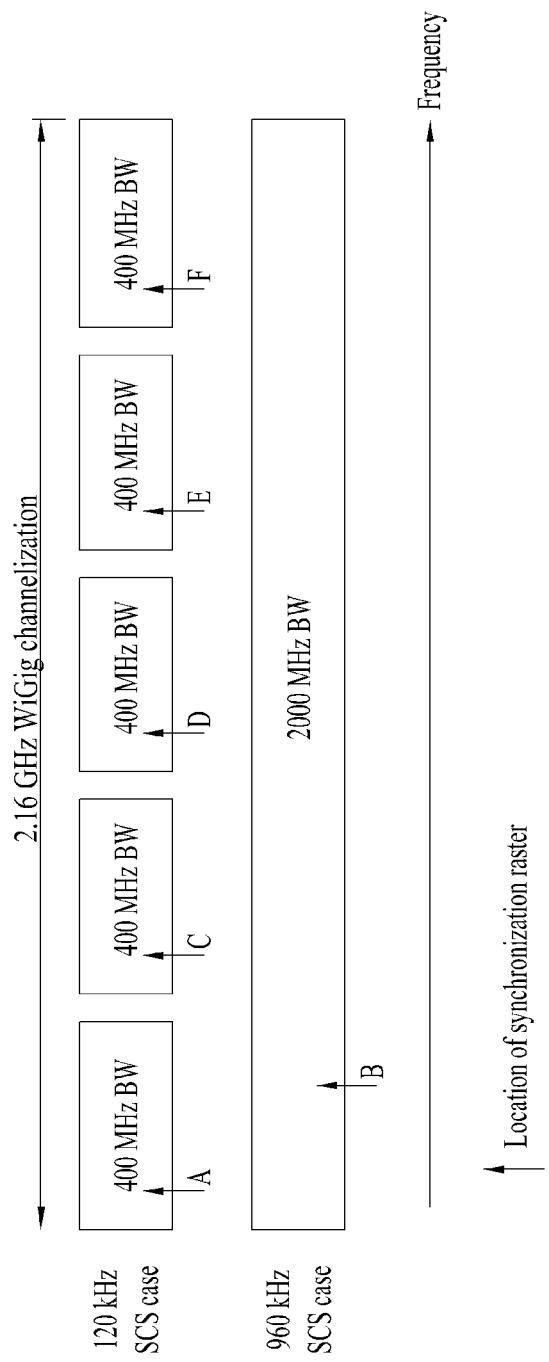
FIG. 15 illustrate examples of synchronization rasters defined differently depending on SCSs.

25, the BS may transmit an SS/PBCH block to the UE based on a synchronization raster defined in FR3 (S2400). Specifically, the BS may transmit the SS/PBCH block to the UE by regarding the synchronization raster defined in FR3 as the center frequency, and the synchronization raster may be defined as shown in FIG. 15. In this case, if [Method #1] is applied, a position capable of transmitting the SS/PBCH block may also be defined in FR3 within a window of 5 msec, in addition to that defined in FR2. The position capable of transmitting the SS/PBCH block may mean a position at which the SS/PBCH block is capable of being transmitted within the 5 msec window, which corresponds to the aforementioned SS/PBCH block candidate position. The BS may transmit to the UE SS/PBCH block candidate indices related to the actually transmitted SS/PBCH block by applying [Method #4] and [Method #4A].

The UE may obtain a cell timing or a QCL relationship between a plurality of SS/PBCH blocks based on the SS/PBCH block received from the BS (S2410). Specifically, the UE may obtain the cell timing from a detected SS/PBCH block by applying [Method #2]. The UE may obtain the QCL relationship between a plurality of detected SS/PBCH blocks by applying [Method #3]. According to the methods proposed in the present disclosure, when the transmission opportunity of an SS/PBCH block in a U-band of FR3 increases, it is possible to reduce the probability of transmission failure of the SS/PBCH block due to the CAP failure of the BS.

The various descriptions, functions, procedures, proposals, methods, and/or operational flowcharts proposals of the present disclosure described above in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
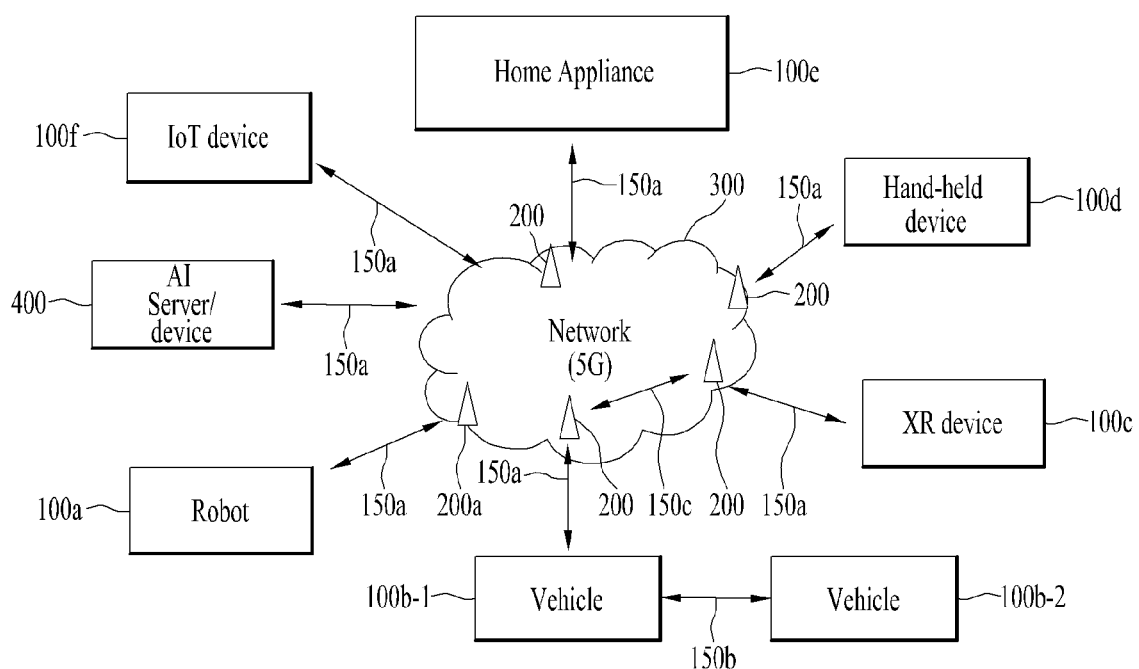
FIGS. 26 to 29 illustrate a communication system and wireless devices, which are applied to the present disclosure.

FIG. 26 illustrates a communication system 1 applied to the present disclosure.

Referring to FIG. 26, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 27:
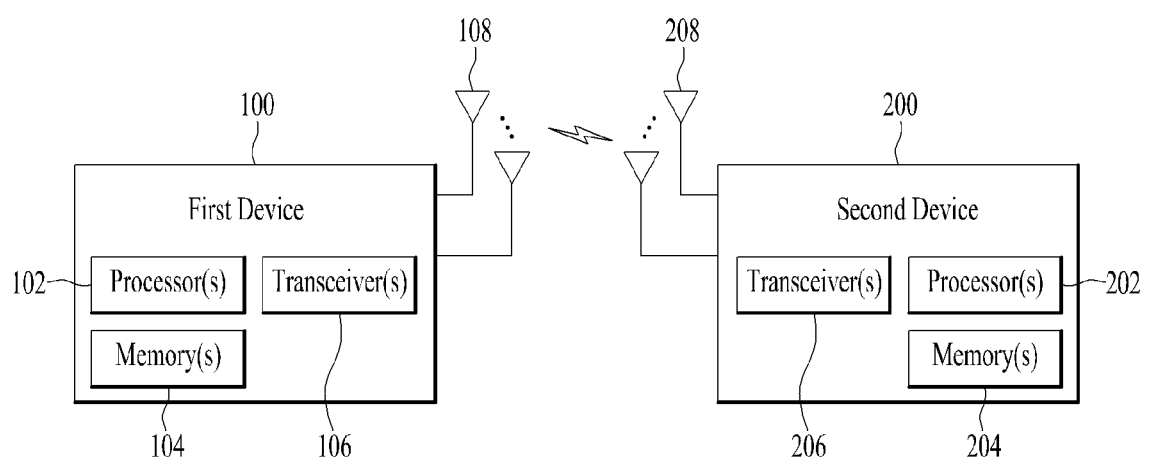

FIG. 27 illustrates wireless devices applicable to the present disclosure.

Referring to FIG. 27, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 26.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

In the present disclosure, at least one memory (e.g., 104 or 204) may store instructions or programs which, when executed, cause at least one processor operably coupled to the at least one memory to perform operations according to some embodiments or implementations of the present disclosure.

In the present disclosure, a computer-readable storage medium may store at least one instruction or computer program which, when executed by at least one processor, causes the at least one processor to perform operations according to some embodiments or implementations of the present disclosure.

In the present disclosure, a processing device or apparatus may include at least one processor and at least one computer memory coupled to the at least one processor. The at least one computer memory may store instructions or programs which, when executed, cause the at least one processor operably coupled to the at least one memory to perform operations according to some embodiments or implementations of the present disclosure.

Figure 28:
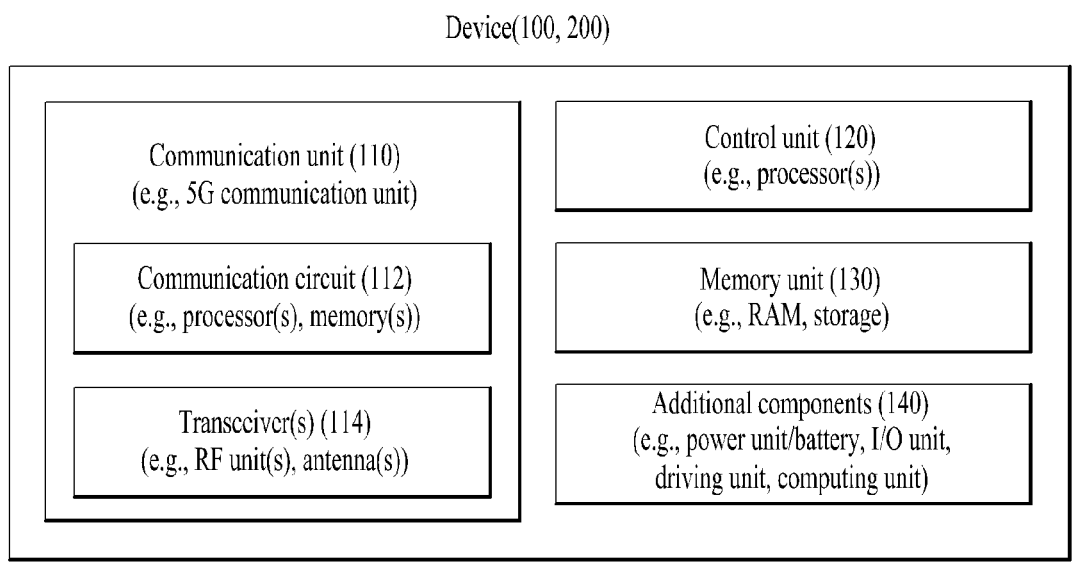

FIG. 28 illustrates another example of a wireless device applied to the present disclosure. The wireless device may be implemented in various forms according to a use-case/service (refer to FIG. 26).

Referring to FIG. 28, wireless devices 100 and 200 may correspond to the wireless devices 100 and 200 of FIG. 27 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 27. For example, the transceiver(s) 114 may include the one or more transceivers 106 and 206 and/or the one or more antennas 108 and 208 of FIG. 27. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

The wireless communication technology implemented in the wireless devices 100 and 200 of the present specification may include narrowband Internet of Things (NB-IoT) for low-power communication as well as LTE, NR, and 6G. For example, NB-IoT technology may be an example of low power wide area network (LPWAN) and implemented by standards such as LTE Cat NB1 and/or LTE Cat NB2, not limited to the above-mentioned names. Additionally or alternatively, the wireless communication technology implemented in the wireless devices 100 and 200 of the present disclosure may perform communication based on LTE-M. For example, LTE-M may be an example of LPWAN and called by various names such as enhanced machine type communication (eMTC). For example, LTE-M may be implemented by at least one of various standards such as 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M, not limited to these names. Additionally or alternatively, the wireless communication technology implemented in the wireless devices 100 and 200 of the present disclosure may include at least one of ZigBee, Bluetooth, and low power wide area network (LPWAN) in consideration of low power communication, not limited to these names. For example, ZigBee may create a personal area network (PAN) related to small/low-power digital communication based on various standards such as IEEE 802.15.4, and may be called by various names.

Figure 29:
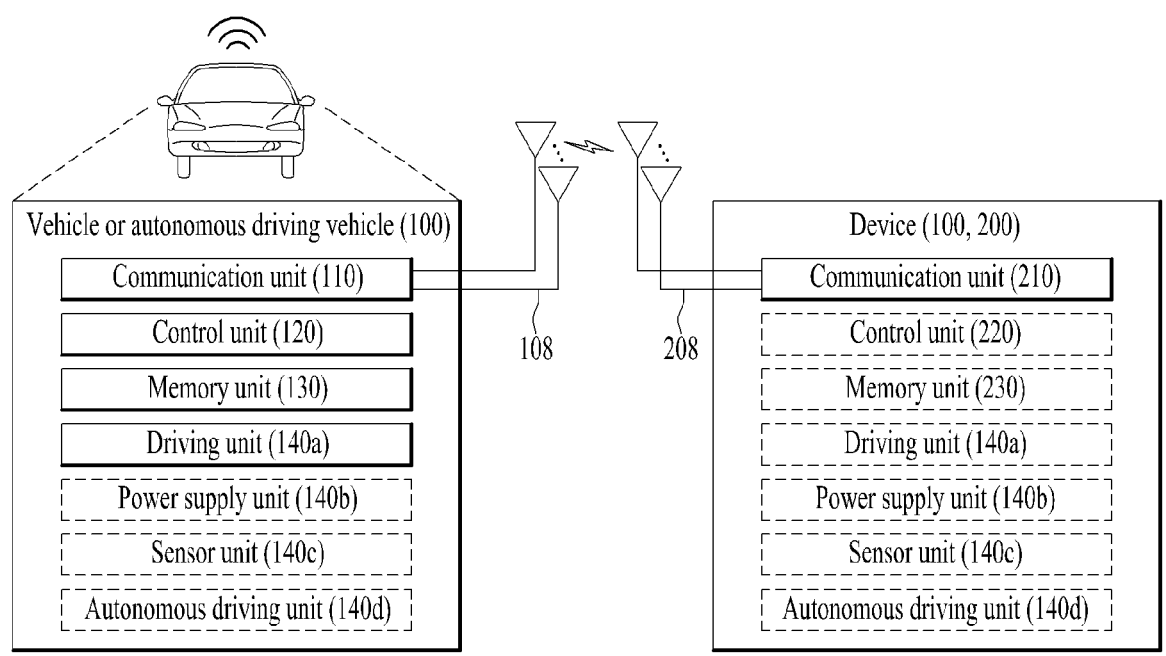

FIG. 29 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 28, respectively.

The communication unit 110 may transmit and receive signals (e.g., data and control signals) to and from external devices such as other vehicles, BS s (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The above-described embodiments correspond to combinations of elements and features of the present disclosure in prescribed forms. In addition, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. In addition, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to a user equipment (UE), a base station (BS), or other devices in a wireless mobile communication system.

The invention claimed is:
1. A method of receiving downlink signal by a user equipment (UE) in a wireless communication system supporting an unlicensed band, the method comprising:
  receiving information on a QCL relationship between SS/PBCH block candidates,
  receiving information representing a position in which a SS/PBCH block is transmitted within a predetermined time duration,
  wherein the information includes a first 8-bit bitmap representing groups in which each of the groups includes a plurality of SS/PBCH block candidates within the predetermined time duration and a second 8-bit bitmap representing the plurality of SS/PBCH block candidates included in each of the group,
  receiving, through the unlicensed band, the SS/PBCH block in the position determined based on a combination of the first 8-bit bitmap and the second 8-bit bitmap,
  wherein, based on that a value determined based on the information on the QCL relationship is 32, bits other than 4 leftmost bits in the first 8-bit bitmap is set to zero.
2. The method of claim 1,
  wherein the predetermined time duration includes 8 groups and each of the groups includes 8 SS/PBCH block candidates.

3. The method of claim 1,
wherein the 4 leftmost bits in the first bitmap are valid.

4. The method of claim 1,
wherein the SS/PBCH block is received through the unlicensed band within a specific frequency range including 60 GHz frequency band.

5. The method of claim 1,
wherein the information on the QCL relationship is received through a higher layer signaling.

6. The method of claim 1,
wherein the predetermined time duration is a half frame.

7. A user equipment (UE) configured to receive a downlink signal in a wireless communication system supporting an unlicensed band, the UE comprising:
at least one radio frequency (RF) unit;
at least one processor; and
at least one computer memory operably connected to the at least one processor and configured to, when executed, cause the at least one processor to perform operations comprising:
receiving information on a QCL relationship between SS/PBCH block candidates,
receiving information representing a position in which a SS/PBCH block is transmitted within a predetermined time duration,
wherein the information includes a first 8-bit bitmap representing groups in which each of the groups includes a plurality of SS/PBCH block candidates within the predetermined time duration and a second 8-bit bitmap representing the plurality of SS/PBCH block candidates included in each of the group,
receiving, through the unlicensed band, the SS/PBCH block in the position determined based on a combination of the first 8-bit bitmap and the second 8-bit bitmap,
wherein, based on that a value determined based on the information on the QCL relationship is 32, bits other than 4 leftmost bits in the first 8-bit bitmap is set to zero.

8. The UE of claim 7,
wherein the predetermined time duration includes 8 groups and each of the groups includes 8 SS/PBCH block candidates.

9. The UE of claim 7,
wherein the 4 leftmost bits in the first bitmap are valid.

10. The UE of claim 7,
wherein the SS/PBCH block is received through the unlicensed band within a specific frequency range including 60 GHz frequency band.

11. The UE of claim 7,
wherein the information on the QCL relationship is received through a higher layer signaling.

12. The UE of claim 7,
wherein the predetermined time duration is a half frame.

13. A method of transmitting a downlink signal by a base station (BS) in a wireless communication system supporting an unlicensed band, the method comprising:
transmitting information on a QCL relationship between SS/PBCH block candidates,
transmitting information representing a position in which a SS/PBCH block is transmitted within a predetermined time duration,
wherein the information includes a first 8-bit bitmap representing groups in which each of the groups includes a plurality of SS/PBCH block candidates within the predetermined time duration and a second 8-bit bitmap representing the plurality of SS/PBCH block candidates included in each of the group,
transmitting, through the unlicensed band, the SS/PBCH block in the position determined based on a combination of the first 8-bit bitmap and the second 8-bit bitmap,
wherein, based on that a value determined based on the information on the QCL relationship is 32, bits other than 4 leftmost bits in the first 8-bit bitmap is set to zero.

14. A base station (BS) configured to transmit a downlink signal in a wireless communication system supporting an unlicensed band, the UE comprising:
at least one radio frequency (RF) unit;
at least one processor; and
at least one computer memory operably connected to the at least one processor and configured to, when executed, cause the at least one processor to perform operations comprising:
transmitting information on a QCL relationship between SS/PBCH block candidates,
transmitting information representing a position in which a SS/PBCH block is transmitted within a predetermined time duration,
wherein the information includes a first 8-bit bitmap representing groups in which each of the groups includes a plurality of SS/PBCH block candidates within the predetermined time duration and a second 8-bit bitmap representing the plurality of SS/PBCH block candidates included in each of the group,
transmitting, through the unlicensed band, the SS/PBCH block in the position determined based on a combination of the first 8-bit bitmap and the second 8-bit bitmap,
wherein, based on that a value determined based on the information on the QCL relationship is 32, bits other than 4 leftmost bits in the first 8-bit bitmap is set to zero.

* * * * *